US012585944B2

(12) United States Patent
Ying et al.

(10) Patent No.: US 12,585,944 B2
(45) Date of Patent: Mar. 24, 2026

(54) DATA PROCESSING SYSTEM, OBJECT DETECTION METHOD, AND APPARATUS THEREOF

(71) Applicant: HUAWEI TECHNOLOGIES CO., LTD., Guangdong (CN)

(72) Inventors: Jiangyong Ying, Shenzhen (CN); Xiongwei Zhu, Shenzhen (CN); Jing Gao, Beijing (CN); Lei Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 656 days.

(21) Appl. No.: 18/050,051

(22) Filed: Oct. 27, 2022

(65) Prior Publication Data

US 2023/0076266 A1     Mar. 9, 2023

Related U.S. Application Data

(63) Continuation of application No. PCT/CN2021/089118, filed on Apr. 23, 2021.

(30) Foreign Application Priority Data

Apr. 30, 2020     (CN) .......................... 202010362601.2

(51) Int. Cl.
*G06N 3/08*          (2023.01)
*G06V 10/40*       (2022.01)
(Continued)

(52) U.S. Cl.
CPC .............. *G06N 3/08* (2013.01); *G06V 10/40* (2022.01); *G06V 10/82* (2022.01); *G06V 20/40* (2022.01)

(58) Field of Classification Search
CPC .......... G06N 3/08; G06N 3/042; G06N 3/045; G06N 3/0464; G06N 3/084; G06V 10/40;
(Continued)

(56) References Cited

U.S. PATENT DOCUMENTS 9,866,820 B1     1/2018  Agrawal et al.
10,229,503 B2    3/2019  Chen et al.
(Continued)

FOREIGN PATENT DOCUMENTS

CN          102479174 A      5/2012
CN          106056647 A      10/2016
(Continued)

OTHER PUBLICATIONS

Guangpei Sun, Outlier Detection and Correction for Monitoring Data of Water Quality Based on Improved VMD and LSSVM, Feb. 3, 2019, 13 pages.
(Continued)

*Primary Examiner* — Fayyaz Alam

(57) ABSTRACT

This application discloses a data processing system, an object detection method, and an apparatus thereof, and is applied to the artificial intelligence field. In this application, a second feature map generation unit introduces shallow texture detail information of an original feature map (a plurality of first feature maps generated by a convolutional processing unit) into a deep feature map (a plurality of second feature maps generated by a first feature map generation unit), to generate a plurality of third feature maps, and the third feature map including the shallow rich texture detail information is used as entered data on which a detection unit is to perform target detection.

4 Claims, 25 Drawing Sheets

(51) Int. Cl.
    *G06V 10/82*     (2022.01)
    *G06V 20/40*     (2022.01)

(58) Field of Classification Search
    CPC ...... G06V 10/82; G06V 20/40; G06V 10/764;
                      G06V 20/56; G06F 18/241
    See application file for complete search history.

(56) References Cited

U.S. PATENT DOCUMENTS

| | | | |
|---|---|---|---|
| 2017/0178332 A1 | 6/2017 | Lindner et al. | |
| 2019/0325243 A1 | 10/2019 | Sikka et al. | |
| 2020/0167586 A1* | 5/2020 | Gao ....................... | G06V 10/82 |
| 2021/0209785 A1* | 7/2021 | Unnikrishnan ...... | G06V 10/764 |

FOREIGN PATENT DOCUMENTS

| | | |
|---|---|---|
| CN | 109344821 A | 2/2019 |
| CN | 109472298 A | 3/2019 |
| CN | 109614985 A | 4/2019 |
| CN | 109815886 A | 5/2019 |
| CN | 110516732 A | 11/2019 |
| CN | 110717427 A | 1/2020 |
| CN | 111062413 A | 4/2020 |
| EP | 3447721 A1 | 2/2019 |
| WO | 2018200493 A1 | 11/2018 |
| WO | 2018224355 A1 | 12/2018 |

OTHER PUBLICATIONS

Zhou Su, A Convolutional Neural Network-Based Method for Small Traffic Sign Detection, 2019 ,7 pages.
Feng-Ke Tsai, Sensor Abnormal Detection and Recovery Using Machine Learning for IoT Sensing Systems, 2019, 5 pages.
Yihui He, Bounding Box Regression with Uncertainty for Accurate Object Detection, Apr. 2019, 10 pages.
Hamid Rezatofighi, Generalized Intersection over Union: A Metric and A Loss for Bounding Box Regression, 2019, 9 pages.
Hua Xia, Multi-Objective Detection of Traffic Scenes Based on Improved SSD, 2018, 11 pages.
Alex Krizhevsky, ImageNet Classification with Deep ConvolutionalNeural Networks, 2012 ,9 pages.
Vighnesh Birodkar, Semantic Redundancies in Image-Classification Datasets: The 10% You Don't Need, Jan. 29, 2019, 11 pages.
Li B, Liu Y, Wang X. Gradient harmonized single-stage detector[C]// Proceedings of the AAAI Conference on Artificial Intelligence. 2018, 33: 8577-8584.(AAAI2019).
Li A, Yang X, Zhang C. Rethinking Classification and Localization for Cascade R-CNN[J]. arXiv preprint arXiv:1907.11914, 2019. (BMVC2019).
Ghiasi G, Lin TY, Le Q V. Nas-fpn: Learning scalable feature pyramid architecture for object detection[C]//Proceedings of the IEEE Conference on Computer Vision and Pattern Recognition. 2019: 7036-7045.(CVPR2019).
Cai Z, Vasconcelos N. Cascade r-cnn: High quality object detection and instance segmentation[J]. IEEE Transactions on Pattern Analysis and Machine Intelligence, 2019.(TPAMI 2019).
Peng C, Xiao T, Li Z, et al. Megdet: A large mini-batch object detector[C]/Proceedings of the IEEE Conference on Computer Vision and Pattern Recognition. 2018: 6181-6189.(CVPR2018).
Girshick R. Fast r-cnn[C]//Proceedings of the IEEE international conference on computer vision. 2015: 1440-1448.
Redmon J, Divvala S, Girshick R, et al. You only look once: Unified, real-time object detection[C]/Proceedings of the IEEE conference on computer vision and pattern recognition. 2016: 779-788.
Dim P. Papadopoulos, Extreme Clicking for Efficient Object Annotation, Aug. 9, 2017, 11 pages.
Michael Gygli, Efficient Object Annotation via Speaking and Pointing, Dec. 2019, 17 pages.

* cited by examiner

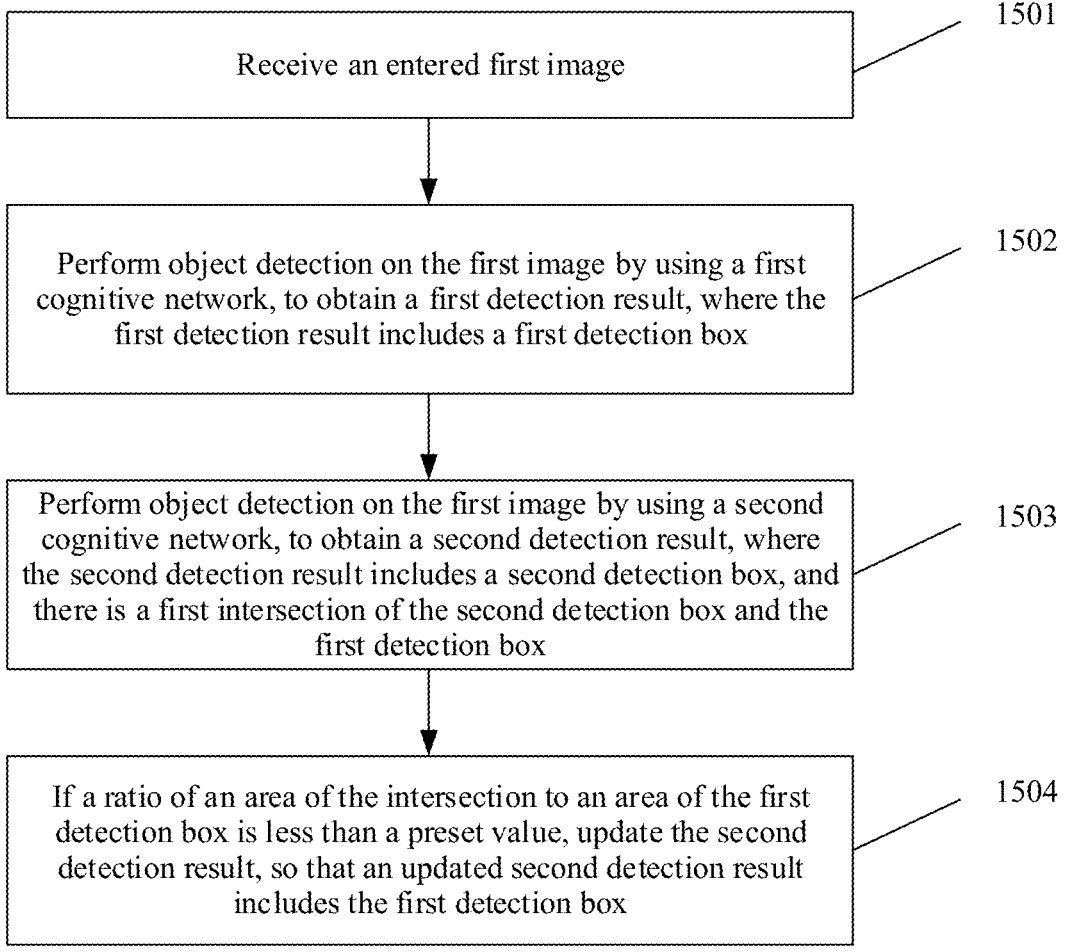

1501

Receive an entered first image

1502

Perform object detection on the first image by using a first cognitive network, to obtain a first detection result, where the first detection result includes a first detection box

1503

Perform object detection on the first image by using a second cognitive network, to obtain a second detection result, where the second detection result includes a second detection box, and there is a first intersection of the second detection box and the first detection box

1504

If a ratio of an area of the intersection to an area of the first detection box is less than a preset value, update the second detection result, so that an updated second detection result includes the first detection box

FIG. 15

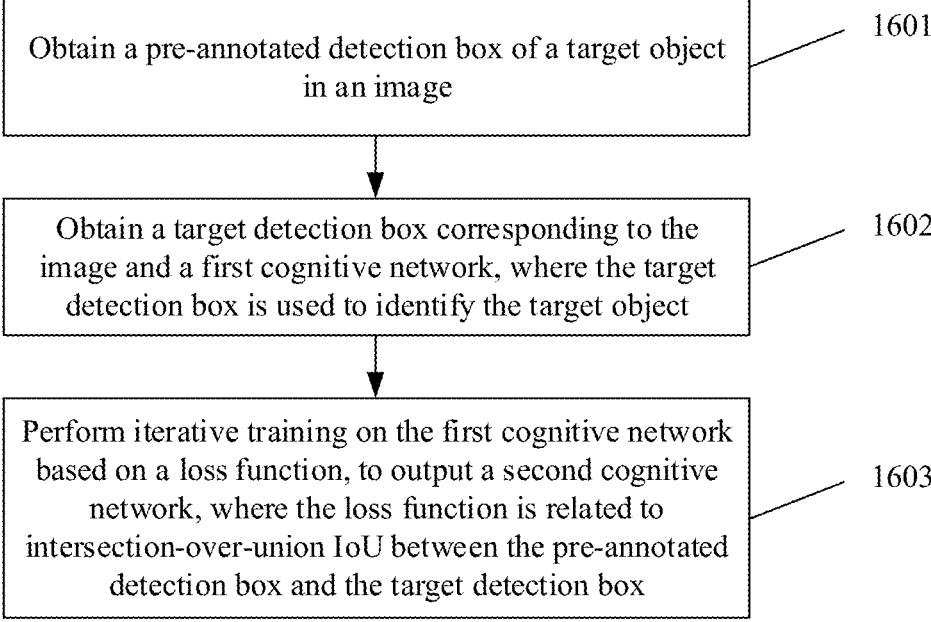

Obtain a pre-annotated detection box of a target object in an image — 1601

Obtain a target detection box corresponding to the image and a first cognitive network, where the target detection box is used to identify the target object — 1602

Perform iterative training on the first cognitive network based on a loss function, to output a second cognitive network, where the loss function is related to intersection-over-union IoU between the pre-annotated detection box and the target detection box — 1603

FIG. 16

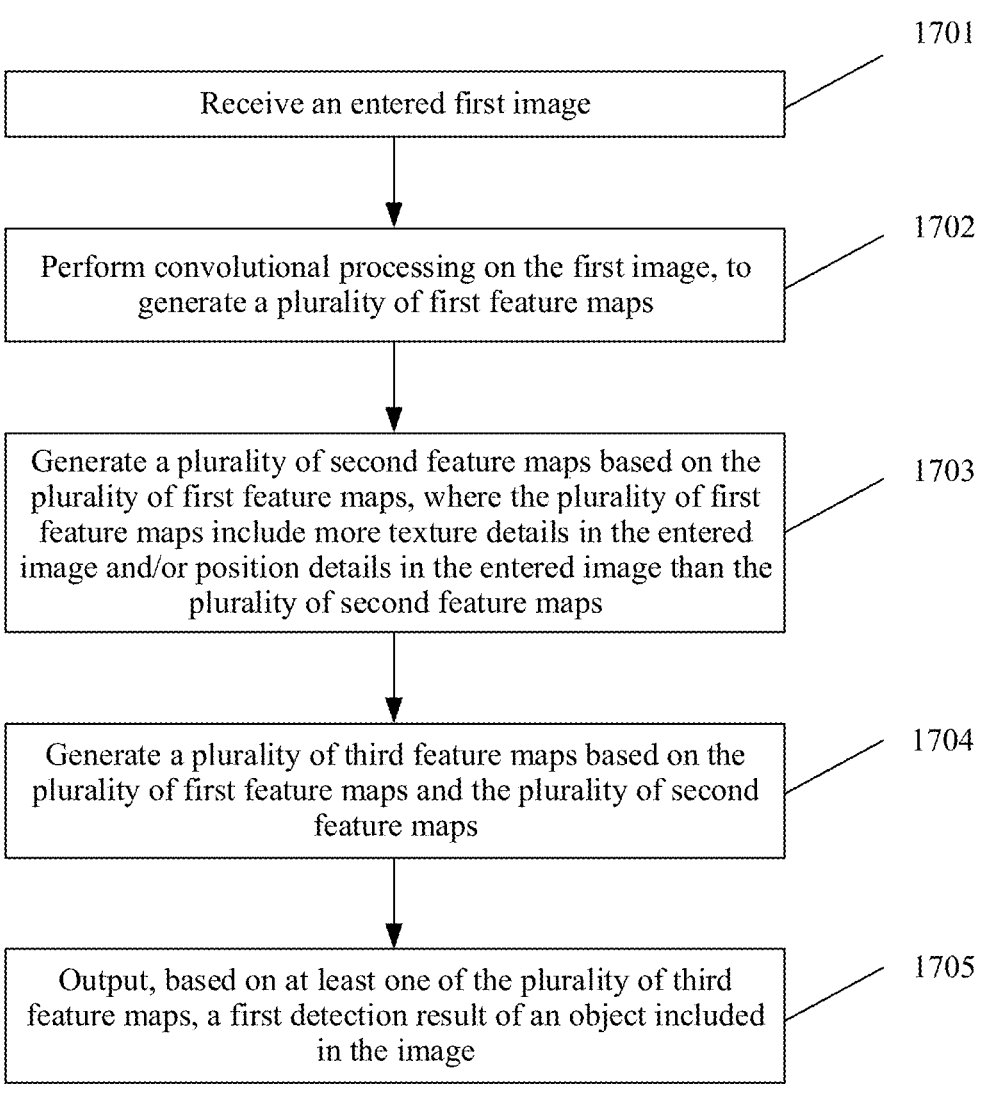

Receive an entered first image — 1701

Perform convolutional processing on the first image, to generate a plurality of first feature maps — 1702

Generate a plurality of second feature maps based on the plurality of first feature maps, where the plurality of first feature maps include more texture details in the entered image and/or position details in the entered image than the plurality of second feature maps — 1703

Generate a plurality of third feature maps based on the plurality of first feature maps and the plurality of second feature maps — 1704

Output, based on at least one of the plurality of third feature maps, a first detection result of an object included in the image — 1705

FIG. 17

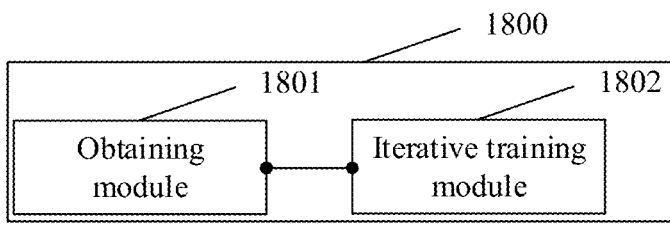

1800

Obtaining module — 1801

Iterative training module — 1802

FIG. 18

DATA PROCESSING SYSTEM, OBJECT DETECTION METHOD, AND APPARATUS THEREOF

CROSS-REFERENCE TO RELATED APPLICATIONS

This application is a continuation of International Application No. PCT/CN2021/089118, filed on Apr. 23, 2021, which claims priority to Chinese Patent Application No. 202010362601.2, filed on Apr. 30, 2020. The disclosures of the aforementioned applications are hereby incorporated by reference in their entireties.

TECHNICAL FIELD

This application relates to the artificial intelligence field, and in particular, to a data processing system, an object detection method, and an apparatus thereof.

BACKGROUND

As an inseparable part of various intelligent/autonomous systems in various application fields, for example, fields such as manufacturing, testing, document analysis, medical diagnosis, and military, computer vision is a learning about how to use a camera/video camera and a computer to obtain required data and information about a photographed object. To be vivid, eyes (the camera or the video camera) and a brain (an algorithm) are mounted on the computer to replace human eyes to recognize, track, and measure a target, so that the computer can perceive an environment. Because perceiving may be considered as extracting information from a perceptual signal, the computer vision may also be considered as a science of studying how to make an artificial system perform "perceiving" from an image or multi-dimensional data. In general, the computer vision is to obtain input information by various imaging systems in replacement of a visual organ, and then process and interpret the input information by a computer in replacement of a brain. An ultimate research goal of computer vision is to enable a computer to observe and understand the world like a human being, and be able to autonomously adapt to an environment.

A cognitive network may be a neural network model that processes and analyzes an image and obtains a processing result. Currently, a cognitive network can perform functions such as image classification, 2D detection, semantic segmentation, key point detection, linear object detection (for example, lane line or limit line detection in an automated driving technology), and drivable region detection. In addition, a visual perception system is desired to be cost-effective, non-contact, small-in-size, and information-heavy. As precision of a visual perception algorithm is continuously increased, the visual perception algorithm has become a key technology of many existing artificial intelligence systems, and is widely used, for example, to recognize a dynamic obstacle (a person or a vehicle) or a static object (a traffic light, a traffic sign, or a traffic cone) on a road surface in an advanced driver assistant system (ADAS) and an automated driving system (ADS). A visual perception algorithm can be used to recognize a human body mask and a key point in a photographing and beautification function in terminal vision, to realize a slimming effect.

The cognitive network usually includes a feature pyramid network (FPN). In the feature pyramid network, a top-down network structure is introduced, and a laterally connected branch derived from an original feature extraction network is introduced. A feature map with resolution corresponding to the original feature extraction network and a deep feature map obtained after upsampling are fused. The top-down network structure introduced in the FPN has a wide receptive field, but has low detection precision in detecting a small object.

SUMMARY

According to a first aspect, this application provides an object detection method. The method is applied to a first cognitive network, and The method comprises:

receiving an entered first image, and performing convolutional processing on the first image, to generate a plurality of first feature maps.

It should be noted that the "performing convolutional processing on the entered image" herein should not be understood as only performing convolutional processing on the entered image. In some embodiments, convolutional processing, a pooling operation, and the like may be performed on the entered image.

It should be noted that the "performing convolutional processing on the first image, to generate a plurality of first feature maps" herein should not be only understood as performing convolutional processing on the first image for a plurality of times, to generate one first feature map in each time of convolutional processing. In other words, it should not be understood that each first feature map is obtained by performing convolutional processing on the first image. Instead, from an overall perspective, the first image is a source of the plurality of first feature maps. In an embodiment, convolutional processing may be performed on the first image, to obtain one first feature map, and then convolutional processing may be performed on the generated first feature map, to obtain another first feature map. By analogy, the plurality of first feature maps may be obtained.

It should be noted that, a series of convolutional processing may be performed on the entered image. During each time of convolutional processing, convolutional processing may be performed on a first feature map obtained after a previous time of convolutional processing, to further obtain one first feature map. In the foregoing manner, the plurality of first feature maps may be obtained.

It should be noted that, the plurality of first feature maps may be feature maps with resolution on a plurality of scales. In other words, the plurality of first feature maps are not feature maps with same resolution. In an optional embodiment, the plurality of first feature maps may form one feature pyramid.

The entered image may be received, and convolutional processing is performed on the entered image, to generate the plurality of first feature maps with resolution on a plurality of scales. A convolutional processing unit may perform a series of convolutional processing on the entered image, to obtain feature maps on different scales (with different resolution). The convolutional processing unit may be in a plurality of forms, for example, a visual geometry group (VGG), a residual neural network (resnet), and a core structure (Inception-net) of GoogLeNet.

The method comprises: generating a plurality of second feature maps based on the plurality of first feature maps. The plurality of first feature maps include more texture details in the entered image and/or position details in the entered image than the plurality of second feature maps.

It should be noted that the "generating a plurality of second feature maps based on the plurality of first feature maps" herein should not be understood as that a source of each of the plurality of second feature maps is the plurality of first feature maps. In an embodiment, some of the plurality of second feature maps are directly generated based on one or more of the plurality of first feature maps. In an embodiment, some of the plurality of second feature maps are directly generated based on one or more of the plurality of first feature maps and a second feature map other than the some second feature maps. In an embodiment, some of the plurality of second feature maps are directly generated based on a second feature map other than the some second feature maps. In this case, because "the second feature map other than the some second feature maps is generated based on one or more of the plurality of first feature maps", it may be understood that the plurality of second feature maps are generated based on the plurality of first feature maps.

It should be noted that, the plurality of second feature maps may be feature maps with resolution on a plurality of scales. In other words, the plurality of second feature maps are not feature maps with same resolution. In an optional embodiment, the plurality of second feature maps may form one feature pyramid.

A convolution operation may be performed on a topmost-layer feature map C4 in the plurality of first feature maps generated by the convolutional processing unit. For example, a quantity of channels of the topmost-layer feature map C4 may be reduced to 256 through dilated convolution and 1×1 convolution, and an obtained feature map is used as a topmost-layer feature map P4 of the feature pyramid. After an output result of a feature map C3 at a next layer of a topmost layer is laterally connected, and a quantity of channels is reduced to 256 through 1×1 convolution, an obtained feature map and the feature map P4 are overlapped channel by channel and pixel by pixel, to obtain a feature map P3. By analogy, a first feature pyramid is constructed from top to bottom. The first feature pyramid may include a plurality of second feature maps.

The texture detail may be used to indicate detail information of a small target and an edge feature, and the first feature map includes more texture detail information than the second feature map, so that detection precision of a detection result of detecting a small target in the first feature map is higher. The position detail may be information used to indicate a position of an object in the image and relative positions of objects.

The plurality of second feature maps may include more deep features than the first feature map. The deep feature includes rich semantic information, which exerts a very good effect on a classification task. In addition, the deep feature has a wide receptive field, to exert a good detection effect on a large target. In an embodiment, the plurality of second feature maps are generated by introducing a top-down path, so that the rich semantic information included in the deep feature can be naturally propagated downwards. In this way, a second feature map on each scale includes rich semantic information.

The method comprises: generating a plurality of third feature maps based on the plurality of first feature maps and the plurality of second feature maps.

It should be noted that the "generating a plurality of third feature maps based on the plurality of first feature maps and the plurality of second feature maps" herein should not be understood as that a source of each of the plurality of second feature maps is the plurality of first feature maps and the plurality of second feature maps. Instead, from an overall perspective, the plurality of first feature maps and the plurality of second feature maps are sources of the plurality of third feature maps. In an embodiment, some of the plurality of third feature maps are generated based on one or more of the plurality of first feature maps and one or more of the plurality of second feature maps. In an embodiment, some of the plurality of third feature maps are generated based on one or more of the plurality of first feature maps, one or more of the plurality of second feature maps, and a third feature map other than the some third feature maps. In an embodiment, some of the plurality of third feature maps are generated based on a third feature map other than the some third feature maps.

It should be noted that, the plurality of third feature maps may be feature maps with resolution on a plurality of scales. In other words, the plurality of third feature maps are not feature maps with same resolution. In an optional embodiment, the plurality of third feature maps may form one feature pyramid.

The method comprises: outputting, based on at least one of the plurality of third feature maps, a first detection result of an object included in the image.

In an embodiment, the object may be a person, an animal, a plant, goods, or the like.

In an embodiment, object detection may be performed on the image based on at least one of the plurality of third feature maps. Object detection is to identify a category of the object included in the image, a position of the object, and the like.

In an embodiment, a second feature map generation unit (for example, a feature pyramid network) propagates the rich semantic information included in the deep feature downwards by introducing a top-down path, so that a second feature map on each scale includes rich semantic information. In addition, the deep feature has a wide receptive field, to exert a good detection effect on a large target. However, in the existing embodiment, finer position detail information and texture detail information included in a shallower feature map are ignored. This greatly affects detection precision of large and small targets. In this embodiment of this application, the second feature map generation unit introduces shallow texture detail information of an original feature map (the plurality of first feature maps generated by the convolutional processing unit) into a deep feature map (a plurality of second feature maps generated by a first feature map generation unit), to generate a plurality of third feature maps, and the third feature map including the shallow rich texture detail information is used as entered data on which a detection unit is to perform target detection, to improve detection precision of subsequent object detection.

It should be noted that, in this embodiment, there is no higher detection precision in object detection of all images including a small target, but for a large quantity of samples, there may be higher comprehensive detection precision in this embodiment.

It should be noted that the object detection method may be implemented by a data processing system, for example, a trained cognitive network. The cognitive network may include a convolutional processing unit, a first feature map generation unit, a second feature map generation unit, and a detection unit. The convolutional processing unit is separately connected to the first feature map generation unit and the second feature map generation unit, the first feature map generation unit is connected to the second feature map generation unit, and the second feature map generation unit is connected to the detection unit. The convolutional processing unit is configured to: receive an entered image; and perform convolutional processing on the entered image, to generate a plurality of first feature maps. The first feature map generation unit is configured to generate a plurality of second feature maps based on the plurality of first feature maps. The plurality of first feature maps include more texture details in the entered image and/or position details in the entered image than the plurality of second feature maps. The second feature map generation unit is configured to generate a plurality of third feature maps based on the plurality of first feature maps and the plurality of second feature maps. The detection unit is configured to output, based on at least one of the plurality of third feature maps, a detection result of the object included in the image.

In an embodiment, the cognitive network may include a trunk network, a first feature pyramid network FPN, a second FPN, and a header, the trunk network is separately connected to the first FPN and the second FPN, the first FPN is connected to the second FPN, and the second FPN is connected to the head (the convolutional processing unit is a trunk network, the first feature map generation unit is a first feature pyramid network FPN, the second feature map generation unit is a second feature pyramid network FPN, and the detection unit is a header).

The trunk network may be configured to: receive the entered image, and perform convolutional processing on the entered image, to generate the plurality of first feature maps with resolution on a plurality of scales. The trunk network may perform a series of convolutional processing on the entered image, to obtain feature maps on different scales (with different resolution). The trunk network may be in a plurality of forms, for example, a visual geometry group (VGG), a residual neural network (resnet), and a core structure (Inception-net) of GoogLeNet.

The first FPN may be configured to generate the first feature pyramid based on the plurality of first feature maps. The first feature pyramid includes a plurality of second feature maps with resolution on a plurality of scales. A convolution operation is performed on a topmost-layer feature map C4 generated by the trunk network. For example, a quantity of channels of the topmost-layer feature map C4 may be reduced to 256 through dilated convolution and 1×1 convolution, and an obtained feature map is used as a topmost-layer feature map P4 of the feature pyramid. After an output result of a feature map C3 at a next layer of a topmost layer is laterally connected, and a quantity of channels is reduced to 256 through 1×1 convolution, an obtained feature map and the feature map P4 are overlapped channel by channel and pixel by pixel, to obtain a feature map P3. By analogy, the first feature pyramid is constructed from top to bottom.

The second FPN may be configured to generate a second feature pyramid based on the plurality of first feature maps and the plurality of second feature maps. The second feature pyramid includes a plurality of third feature maps with resolution on a plurality of scales.

The head is configured to: detect a target object in the image based on the at least one of the plurality of third feature maps, and output the detection result.

In this embodiment of this application, the second FPN introduces detail information such as a shallow rich edge and a texture of the original feature map (a plurality of first feature maps generated by the trunk network) into the deep feature map (the plurality of second feature maps generated by the first FPN), to generate the second feature pyramid, and the third feature map with the detail information such as the shallow rich edge and texture is used as entered data on which the head is to perform target detection, to improve detection precision of subsequent object detection.

In an optional implementation, the plurality of first feature maps include a first target feature map, the plurality of second feature maps include a second target feature map, the plurality of third feature maps include a third target feature map and a fourth target feature map, resolution of the third target feature map is lower than resolution of the fourth target feature map, and the generating a plurality of third feature maps based on the plurality of first feature maps and the plurality of second feature maps includes:

performing downsampling on the third target feature map, to obtain a fifth target feature map, where the fifth target feature map and the second target feature map have a same quantity of channels and same resolution; performing downsampling and convolutional processing on the first target feature map, to obtain a sixth target feature map, where the sixth target feature map and the second target feature map have a same quantity of channels and same resolution; and performing channel overlapping on the fifth target feature map, the second target feature map, and the sixth target feature map, to generate the fourth target feature map.

In this embodiment of this application, downsampling and convolutional processing may be performed on the third target feature map, to obtain the fifth target feature map. Downsampling is performed, so that resolution of a feature map of each channel in the fifth target feature map is the same as that of the second target feature map. Convolutional processing is performed, so that a quantity of channels of the fifth target feature map is the same as a quantity of channels of the second target feature map. In the foregoing manner, the fifth target feature map and the second target feature map have same resolution and a same quantity of channels, and further, the fifth target feature map, the sixth target feature map, and the second target feature map may be overlapped channel by channel, to obtain the fourth target feature map.

Alternatively, the generating a plurality of third feature maps based on the plurality of first feature maps and the plurality of second feature maps includes: performing downsampling on the third target feature map, to obtain a fifth target feature map, where the fifth target feature map and the second target feature map have a same quantity of channels and same resolution; performing downsampling on the first target feature map, to obtain a sixth target feature map, where the sixth target feature map and the second target feature map have same resolution; and performing channel overlapping and convolutional processing on the fifth target feature map, the second target feature map, and the sixth target feature map, to generate the fourth target feature map, where the fourth target feature map and the second target feature map have a same quantity of channels.

In this embodiment of this application, the expression "channel overlapping" may be understood as performing overlapping (for example, an addition operation) on corresponding elements (corresponding elements may be understood as elements located at a same position on feature maps) in feature maps of corresponding channels (namely, channels with same semantic information).

In this embodiment of this application, the second target feature map may be a feature map including a plurality of channels, and a feature map corresponding to each channel may be a feature map including one type of semantic information.

In this embodiment of this application, downsampling may be performed on the third target feature map, to obtain the fifth target feature map. Downsampling is performed, so that resolution of a feature map of each channel in the fifth target feature map is the same as that of the second target feature map. In the foregoing manner, the fifth target feature map and the second target feature map have same resolution, and further, the fifth target feature map and the second target feature may be overlapped channel by channel. Downsampling may be performed on the first target feature map, to obtain the sixth target feature map. Downsampling is performed, so that resolution of a feature map of each channel in the sixth target feature map is the same as that of the second target feature map. In the foregoing manner, the fifth target feature map, the sixth target feature map, and the second target feature map have same resolution, and further, the fifth target feature map, the sixth target feature map, and the second target feature map may be overlapped channel by channel. Then, convolutional processing is performed, so that the obtained fourth target feature map and the second target feature map have a same quantity of channels. Convolutional processing may be a concatenation operation.

In this embodiment, the third target feature map and the fourth target feature map with different resolution may be generated, and resolution of the third target feature map is lower than resolution of the fourth target feature map. The fourth target feature map with higher resolution is generated based on one of the plurality of first feature maps, one of the plurality of second feature maps, and the third target feature map. In this case, the plurality of third feature maps generated by the second feature map generation unit retains an advantage of the feature pyramid network. The second feature map generation unit introduces rich texture detail information and/or position detail information of a shallow neural network into a deep convolutional layer from bottom to top (feature maps are sequentially generated in ascending order of resolution), and detection precision of a detection result that is of a small target in the plurality of third feature maps generated in this manner and that is of a detection network is higher.

In an embodiment, the method further includes: convoluting at least one of the plurality of third feature maps by using a first convolutional layer, to obtain at least one fourth feature map; and convoluting at least one of the plurality of third feature maps, to obtain at least one fifth feature map, where a receptive field corresponding to the fourth feature map is wider than a receptive field corresponding to the fifth feature map.

Correspondingly, the outputting, based on at least one of the plurality of third feature maps, a first detection result of an object included in the image includes:
  outputting, based on the at least one fourth feature map and the at least one fifth feature map, the first detection result of the object included in the image.

In this embodiment, the fourth feature map and the fifth feature map that are obtained after the third feature map is processed have different receptive fields. Because the fourth feature map and the fifth feature map have different receptive fields, targets of different sizes may be adaptively detected. For example, the third feature map may be processed by using convolutional layers with different dilation rates, and an obtained processing result may include both information about a large target and information about a small target, so that both the large target and the small target can be detected in a subsequent target detection process.

In an embodiment, the method further includes:
  processing the fourth feature map based on a first weight value, to obtain a processed fourth feature map.

It should be noted that, a channel-based multiplication operation or other numerical processing may be performed on the fourth feature map based on the first weight value, so that an element in the fourth feature map obtains a gain of a corresponding magnitude.

The method comprises: processing the fifth feature map based on a second weight value, to obtain a processed fifth feature map. It should be noted that, a channel-based multiplication operation or other numerical processing may be performed on the fifth feature map based on the second weight value, so that an element in the fifth feature map obtains a gain of a corresponding magnitude.

The first weight value is greater than the second weight value when a to-be-detected object included in the fourth feature map is greater than a to-be-detected object included in the fifth feature map.

Correspondingly, the outputting, based on at least one of the plurality of third feature maps, a first detection result of an object included in the image includes:
  outputting, based on the processed fourth feature map and the processed fifth feature map, the first detection result of the object included in the image.

In this embodiment, the first weight value is correspondingly greater than the second weight value if the to-be-detected object included in the fourth feature map is greater than the to-be-detected object included in the fifth feature map. Therefore, the processed fourth feature map obtains a higher gain than the processed fifth feature map. Because the receptive field corresponding to the fourth feature map is wider than the receptive field corresponding to the fifth feature map, a feature map with a wider receptive field includes more information about a large target, and correspondingly, detection precision of the large target in target detection performed by using the feature map with a wider receptive field is higher. In this embodiment, when the image includes a large target, the fourth feature map correspondingly obtains a higher gain than the fifth feature map. When the detection unit performs target detection on the image based on the processed fourth feature map and the processed fifth feature map, an overall receptive field is wider, and correspondingly, detection precision is higher.

In this embodiment, a middle feature extraction layer may learn of a weight value recognition rule through training: For a feature map including a large target, a first weight value of a first convolutional layer determined by the middle feature extraction layer is large, and a second weight value of a second convolutional layer determined by the middle feature extraction layer is small. For a feature map including a small target, a first weight value of a first convolutional layer determined by the middle feature extraction layer is small, and a second weight value of a second convolutional layer determined by the middle feature extraction layer is large.

In an embodiment, the method further includes:
  performing dilated convolution processing on at least one of the plurality of third feature maps; and
  detecting a target object in the image based on the at least one third feature map on which dilated convolution processing is performed, and outputting the first detection result.

In this embodiment of this application, one time of 3×3 convolution may be performed in a region proposal network (RPN), to perform a function of a sliding window. A convolution kernel is moved on at least one third feature map, and whether an object exists in each anchor bounding box and a difference between a predicted bounding box and a ground truth bounding box may be obtained by using a subsequent intermediate layer and a bounding box regression layer and through category determining. The region proposal network is trained, to obtain a good bounding box extraction result. In this embodiment, a 3×3 sliding window convolution kernel is replaced with a 3×3 dilated convolution kernel, dilated convolution processing is performed on at least one of the plurality of third feature maps, the target object in the image is detected based on the at least one third feature map on which dilated convolution processing is performed, and a detection result is output, to widen a receptive field and reduce an amount of missing detection of a large target and some obstructed targets without increasing a calculation amount.

In an embodiment, the first detection result includes a first detection box, and the method further includes: obtaining a second detection result of the first image, where the second detection result is obtained by performing object detection on the first image by using a second cognitive network, object detection precision of the first cognitive network is higher than object detection precision of the second cognitive network, the second detection result includes a second detection box, and there is an intersection of a region in which the second detection box is located and a region in which the first detection box is located; and if a ratio of an area of the intersection to an area of the first detection box is less than a preset value, updating the second detection result, so that an updated second detection result includes the first detection box.

In this embodiment of this application, if a ratio of an area of a first intersection to the area of the first detection box is less than a preset value, it may be considered that the first detection box is omitted in the second detection result, and the second detection result may be updated, so that the updated second detection result includes the first detection box. A time sequence feature is introduced into a model, to help determine whether a suspected missing detection result is a real missing detection result, and determine a category of the missing detection result, so as to improve verification efficiency.

In an embodiment, the second detection result includes a plurality of detection boxes, there is an intersection of a region in which each of the plurality of detection boxes is located and the region in which the first detection box is located, the plurality of detection boxes include the second detection box, and the area of the intersection of the region in which the second detection box is located and the region in which the first detection box is located is the smallest in an area of the intersection of the region in which each of the plurality of detection boxes is located and the region in which the first detection box is located.

In an embodiment, the first image is an image frame in a video, a second image is an image frame in the video, a frame spacing between the first image and the second image in the video is less than a preset value, and the method further includes: obtaining a third detection result of the second image, where the third detection result includes a fourth detection box and an object category corresponding to the fourth detection box.

When a shape difference and a position difference between the fourth detection box and the first detection box fall within a preset range, the first detection box corresponds to the object category corresponding to the fourth detection box.

In an embodiment, a detection confidence level of the fourth detection box is greater than a preset threshold.

According to a second aspect, this application provides a data processing system. The data processing system includes a convolutional processing unit, a first feature map generation unit, a second feature map generation unit, and a detection unit, the convolutional processing unit is separately connected to the first feature map generation unit and the second feature map generation unit, the first feature map generation unit is connected to the second feature map generation unit, and the second feature map generation unit is connected to the detection unit.

The convolutional processing unit is configured to: receive an entered image, and perform convolutional processing on the entered image, to generate a plurality of first feature maps.

The first feature map generation unit is configured to generate a plurality of second feature maps based on the plurality of first feature maps. The plurality of first feature maps include more texture details in the entered image and/or position details in the entered image than the plurality of second feature maps.

The second feature map generation unit is configured to generate a plurality of third feature maps based on the plurality of first feature maps and the plurality of second feature maps.

The detection unit is configured to output, based on at least one of the plurality of third feature maps, a detection result of an object included in the image.

For example, the data processing system may be a cognitive network system, and is configured to implement a function of a cognitive network.

In an existing embodiment, the second feature map generation unit (for example, a feature pyramid network) propagates rich semantic information included in a deep feature downwards by introducing a top-down path, so that a second feature map on each scale includes rich semantic information. In addition, the deep feature has a wide receptive field, to exert a good detection effect on a large target. However, in an existing embodiment, finer position detail information and texture detail information included in a shallower feature map are ignored. This greatly affects detection precision of large and small targets. In this embodiment of this application, the second feature map generation unit introduces shallow texture detail information of an original feature map (the plurality of first feature maps generated by the convolutional processing unit) into a deep feature map (the plurality of second feature maps generated by the first feature map generation unit), to generate a plurality of third feature maps, and the third feature map including the shallow rich texture detail information is used as entered data on which the detection unit is to perform target detection, to improve detection precision of subsequent object detection.

It should be noted that, in this embodiment, there is no higher detection precision in object detection of all images including a small target, but for a large quantity of samples, there may be higher comprehensive detection precision in this embodiment.

Because the third aspect provides an apparatus corresponding to the first aspect, for various embodiments, explanations and descriptions, and corresponding technical effects, refer to the descriptions in the first aspect. Details are not described herein again.

According to a third aspect, this application provides a cognitive network training method. The method comprises:
    obtaining a pre-annotated detection box of a target object in an image; and
    obtaining a target detection box corresponding to the image and a first cognitive network, where the target detection box is used to identify the target object.

In a design, a detection result of the image may be obtained. The detection result is obtained by performing object detection on the image by using the first cognitive network, and the detection result includes a target detection box corresponding to a first object.

The method comprises: performing iterative training on the first cognitive network based on a loss function, to output a second cognitive network, where the loss function is related to intersection-over-union (IoU) between the pre-annotated detection box and the target detection box.

In one design, iterative training may be performed on the first cognitive network based on the loss function, to update a parameter included in the first cognitive network, so as to obtain the second cognitive network. The loss function is related to the intersection-over-union IoU between the pre-annotated detection box and the target detection box.

In one design, the second cognitive network may be output.

In this embodiment of this application, a newly designed bounding box regression loss function comprises an IoU loss term that has scale invariance and is applied to a target detection measurement method, a loss term in which a length-width ratio of a predicted bounding box and a length-width ratio of a ground truth bounding box are considered, and a loss term of a ratio of a distance between center coordinates of the predicted bounding box and center coordinates of the ground truth bounding box to a distance between lower right corner coordinates of the predicted bounding box and upper left corner coordinates of the ground truth bounding box. A scale-invariant bounding box prediction quality evaluation index is naturally introduced into the IoU loss term. The loss term of the length-width ratios of the two bounding boxes measures a shape fitting degree between the two bounding boxes. The third term for measuring a distance ratio is used to resolve a problem that when IoU=0, a relative position relationship between the predicted bounding box and the ground truth bounding box cannot be learned of, it is difficult to perform back propagation, and the loss function is minimized.

In an embodiment, a preset loss function is further related to a shape difference between the target detection box and the pre-annotated detection box, and the shape difference is negatively related to an area of the pre-annotated detection box.

In an embodiment, the preset loss function is further related to a position difference between the target detection box and the pre-annotated detection box in the image, and the position difference is negatively related to the area of the pre-annotated detection box; or the position difference is negatively related to an area of a minimum bounding rectangle of a convex hull of the pre-annotated detection box and the target detection box.

In an embodiment, the target detection box includes a first corner point and a first center point, the pre-annotated detection box includes a second corner point and a second center point, the first corner point and the second corner point are two endpoints of a diagonal of the rectangular, and the position difference is further positively related to a position difference between the first center point and the second center point in the image and is negatively related to a length between the first corner point and the second corner point.

In an embodiment, the preset loss function includes a target loss term related to the position difference, and the target loss term changes with the position difference; and a change rate of the target loss term is greater than a first preset change rate when the position difference is greater than a preset value; and/or the change rate of the target loss term is less than a second preset change rate when the position difference is less than the preset value. The change rate of the target loss term is greater than the first preset change rate when the position difference is greater than the preset value; and/or the change rate of the target loss term is less than the second preset change rate when the position difference is less than the preset value, so that a fast convergence effect may be achieved in a training process.

According to a fourth aspect, this application provides a cognitive network training apparatus. The apparatus comprises: an obtaining module, configured to: obtain a pre-annotated detection box of a target object in an image, and obtain a target detection box corresponding to the image and a first cognitive network, where the target detection box is used to identify the target object; and an iterative training module, configured to perform iterative training on the first cognitive network based on a loss function, to output a second cognitive network, where the loss function is related to intersection-over-union IoU between the pre-annotated detection box and the target detection box.

In an embodiment, a preset loss function is further related to a shape difference between the target detection box and the pre-annotated detection box, and the shape difference is negatively related to an area of the pre-annotated detection box.

In an embodiment, the preset loss function is further related to a position difference between the target detection box and the pre-annotated detection box in the image, and the position difference is negatively related to the area of the pre-annotated detection box; or the position difference is negatively related to an area of a minimum bounding rectangle of a convex hull of the pre-annotated detection box and the target detection box.

In an embodiment, the target detection box includes a first corner point and a first center point, the pre-annotated detection box includes a second corner point and a second center point, the first corner point and the second corner point are two endpoints of a diagonal of the rectangular, and the position difference is further positively related to a position difference between the first center point and the second center point in the image and is negatively related to a length between the first corner point and the second corner point.

In an embodiment, the preset loss function includes a target loss term related to the position difference, and the target loss term changes with the position difference; and a change rate of the target loss term is greater than a first preset change rate when the position difference is greater than a preset value; and/or the change rate of the target loss term is less than a second preset change rate when the position difference is less than the preset value.

Because the fourth aspect provides an apparatus corresponding to the second aspect, for various embodiments, explanations and descriptions, and corresponding technical effects, refer to the descriptions in the first aspect. Details are not described herein again.

According to a fifth aspect, an embodiment of this application provides an object detection apparatus. The object detection apparatus may include a memory, a processor, and a bus system. The memory is configured to store a program, and the processor is configured to execute the program in the memory, to perform the second aspect and any optional method in the second aspect.

According to a sixth aspect, an embodiment of this application provides an object detection apparatus. The object detection apparatus may include a memory, a processor, and a bus system. The memory is configured to store a program, and the processor is configured to execute the program in the memory, to perform the third aspect and any optional method in the third aspect.

According to a seventh aspect, an embodiment of the present disclosure further provides a cognitive network application system. The cognitive network application system includes at least one processor, at least one memory, at least one communications interface, and at least one display device. The processor, the memory, the display device, and the communications interface are connected and communicate with each other through a communications bus.

The communications interface is configured to communicate with another device or a communications network.

The memory is configured to store application program code for executing the foregoing solutions, and the processor controls execution. The processor is configured to execute the application program code stored in the memory.

The code stored in the memory may be used to execute the foregoing provided object detection method, or may be the cognitive network training method provided in the foregoing embodiments.

The display device is configured to display a to-be-recognized image and 2D, 3D, mask, and key point information of an object of interest in the to-be-recognized image.

According to an eighth aspect, an embodiment of this application provides a computer-readable storage medium. The computer-readable storage medium stores a computer program. When the computer program runs on a computer, the computer is enabled to perform the second aspect and any optional method in the second aspect or the first aspect and any optional method in the first aspect.

According to a ninth aspect, an embodiment of this application provides a computer-readable storage medium. The computer-readable storage medium stores a computer program. When the computer program runs on a computer, the computer is enabled to perform the third aspect and any optional method in the third aspect.

According to a tenth aspect, an embodiment of this application provides a computer program. When the computer program runs on a computer, the computer is enabled to perform the first aspect and any optional method in the first aspect.

According to an eleventh aspect, an embodiment of this application provides a computer program. When the computer program runs on a computer, the computer is enabled to perform the third aspect and any optional method in the third aspect.

According to a twelfth aspect, this application provides a chip system. The chip system includes a processor, configured to support an execution device or a training device to implement a function in the foregoing aspects, for example, sending or processing data or information in the foregoing methods. In an embodiment, the chip system further includes a memory, and the memory is configured to store program instructions and data that are necessary for the execution device or the training device. The chip system may include a chip, or may include a chip and another discrete device.

This application provides the data processing system. The second feature map generation unit introduces the shallow texture detail information of the original feature map (the plurality of first feature maps generated by the convolutional processing unit) into the deep feature map (the plurality of second feature maps generated by the first feature map generation unit), to generate a plurality of third feature maps, and the third feature map including the shallow rich texture detail information is used as the entered data on which the detection unit is to perform target detection, to improve detection precision of subsequent object detection.

BRIEF DESCRIPTION OF DRAWINGS

FIG. 15 is a flowchart of an object detection method according to an embodiment of this application;

FIG. 16 is a flowchart of a cognitive network training method according to an embodiment of this application;

FIG. 17 is a flowchart of an object detection method according to an embodiment of this application;

FIG. 18 is a diagram of a cognitive network training apparatus according to an embodiment of this application;

DESCRIPTION OF EMBODIMENTS

The following describes embodiments of the present disclosure with reference to the accompanying drawings. Terms used in embodiments of the present disclosure are merely intended to explain embodiments and are not intended to limit the present disclosure.

The following describes embodiments of this application with reference to the accompanying drawings. A person of ordinary skill in the art may learn that the technical solutions provided in embodiments of this application are also applicable to a similar technical problem as a technology evolves and a new scenario emerges.

In the specification, claims, and the accompanying drawings of this application, terms "first", "second", and the like are intended to distinguish similar objects but do not necessarily indicate an order or sequence. It should be understood that the terms used in such a way are interchangeable in proper circumstances, and this is merely a distinguishing manner for describing objects having a same attribute in embodiments of this application. In addition, terms "include", "have", and any other variants thereof are intended to cover the non-exclusive inclusion, so that a process, method, system, product, or device that includes a series of units is not necessarily limited to those units, but may include other units not expressly listed or inherent to such a process, method, product, or device.

Figure 1:
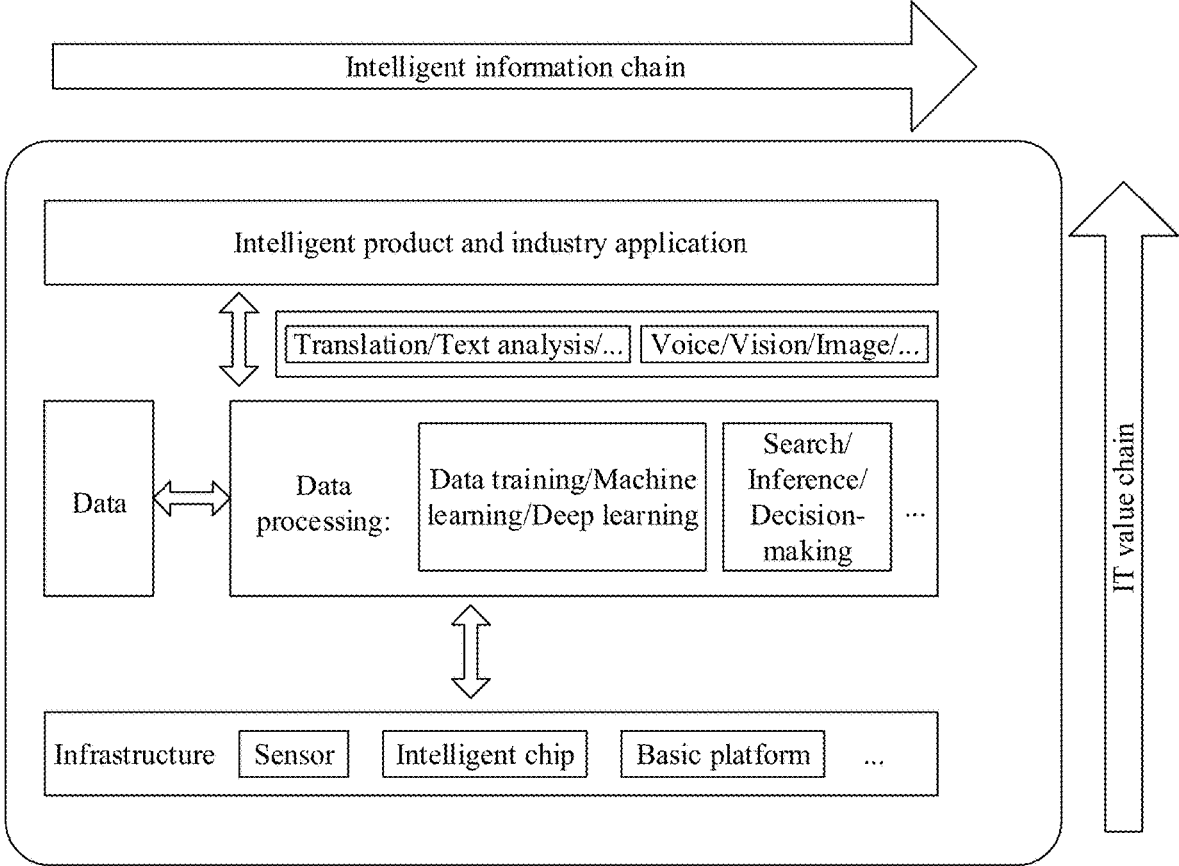
FIG. 1 is a diagram of a structure of an artificial intelligence main framework.

An overall working procedure of an artificial intelligence system is first described. FIG. 1 is a diagram of a structure of an artificial intelligence main framework. The following describes the foregoing artificial intelligence main framework from two dimensions: an "intelligent information chain" (a horizontal axis) and an "IT value chain" (a vertical axis). The "intelligent information chain" reflects a general process from data obtaining to data processing. For example, the process may be a general process of intelligent information perception, intelligent information representation and formation, intelligent reasoning, intelligent decision-making, and intelligent execution and output. In this process, data undergoes a condensation process of "data-information-knowledge-wisdom". The "IT value chain" reflects a value brought by artificial intelligence to the information technology industry from an underlying infrastructure and information (technology providing and processing embodiment) of human intelligence to an industrial ecological process of a system.

(1) Infrastructure

The infrastructure provides calculation capability support for the artificial intelligence system, communicates with an external world, and implements supporting by using a base platform. The infrastructure communicates with the outside by using a sensor. A computing capability is provided by an intelligent chip (a hardware acceleration chip such as a CPU, an NPU, a GPU, an ASIC, or an FPGA). The base platform includes related platform assurance and support such as a distributed computing framework and a network, and may include cloud storage and computing, an interconnection and interworking network, and the like. For example, the sensor communicates with the outside to obtain data, and the data is provided, for computation, to an intelligent chip in a distributed computing system provided by the base platform.

(2) Data

Data from a higher layer of the infrastructure is used to indicate a data source in the artificial intelligence field. The data relates to a graph, an image, a voice, and text, further relates to internet of things data of a conventional device, and includes service data of an existing system and perception data such as force, displacement, a liquid level, a temperature, and humidity.

(3) Data Processing

The data processing usually includes manners such as data training, machine learning, deep learning, searching, inference, and decision-making.

The machine learning and the deep learning may mean performing symbolic and formalized intelligent information modeling, extraction, preprocessing, training, and the like on data.

The inference refers to a process in which a human intelligent inferring manner is simulated in a computer or an intelligent system, and machine thinking and problem solving are performed by using formal information according to an inferring control policy. A typical function is searching and matching.

The decision-making refers to a process in which a decision is made after intelligent information inference, and usually provides functions such as classification, ranking, and prediction.

(4) General Capability

After data processing mentioned above is performed on data, some general capabilities may be further formed based on a data processing result, for example, an algorithm or a general system, such as translation, text analysis, computer vision processing, speech recognition, and image recognition.

(5) Intelligent Product and Industry Application

The intelligent product and industry application are a product and application of an artificial intelligence system in various fields. An overall artificial intelligence solution is encapsulated, and an intelligent information decision is productized, to implement application. Application fields mainly include an intelligent terminal, intelligent transportation, intelligent healthcare, automated driving, safe city, and the like.

Figure 2:
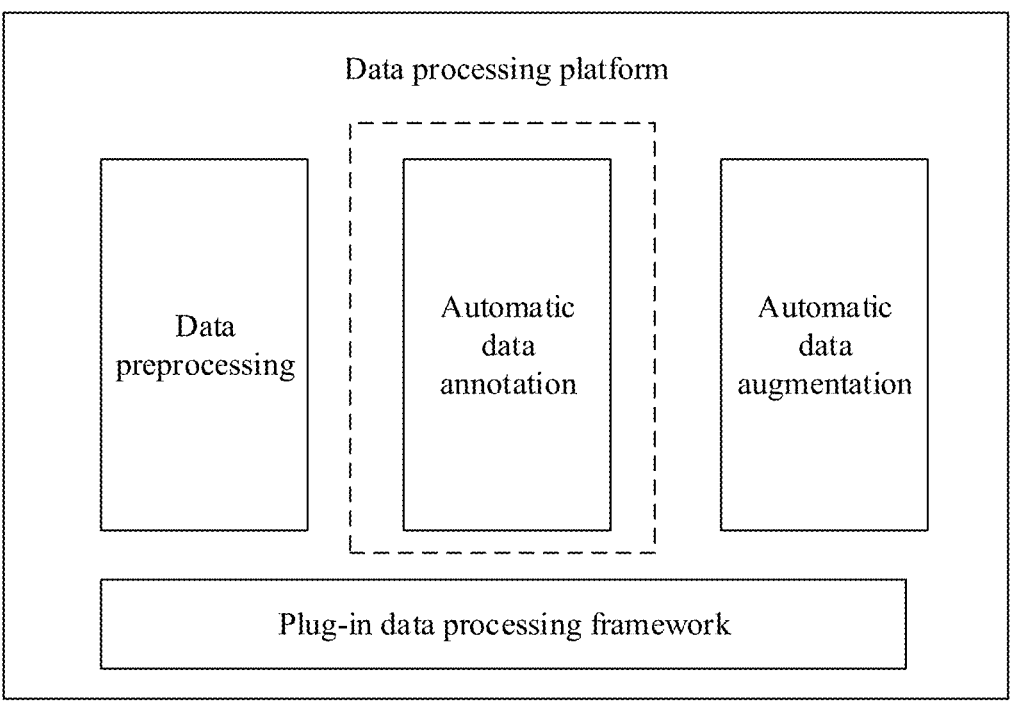
FIG. 2 shows an application scenario according to an embodiment of this application.
Figure 3:
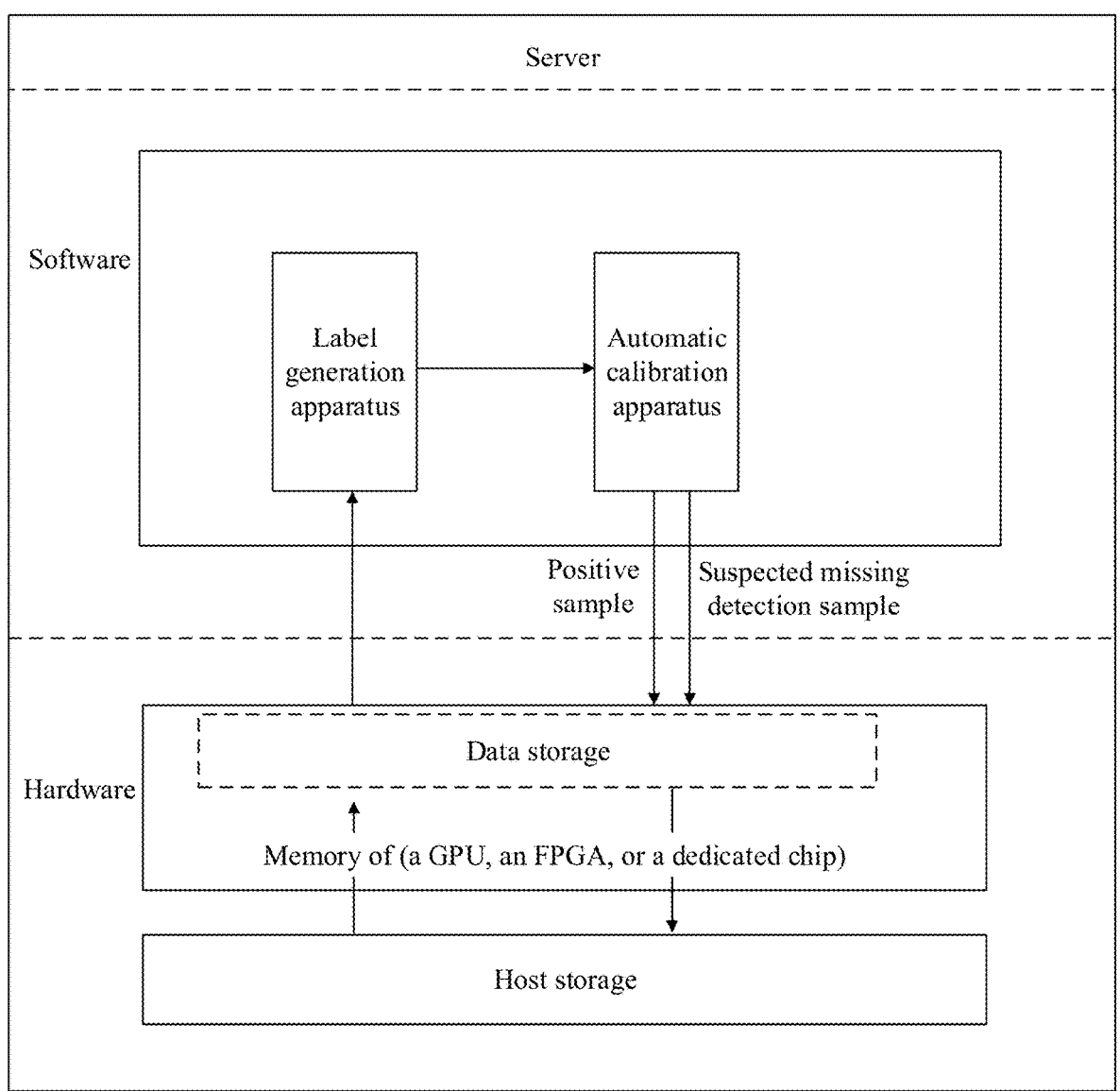
FIG. 3 shows an application scenario according to an embodiment of this application.

Embodiments of this application are mainly applied to fields in which a plurality of perception tasks need to be completed, such as driver assistance, automated driving, and a mobile phone terminal. An application system framework of the present disclosure is shown in FIG. 2 and FIG. 3. FIG. 2 shows an application scenario according to an embodiment of this application. Embodiments of this application are located in an automatic data annotation module on a data processing platform, and a dashed-line box indicates a position of the embodiment. The system is an intelligent data platform on which man-machine collaboration is performed, and is designed to build artificial intelligence capabilities such as higher efficiency, faster training, and a stronger model. The automatic data annotation module is an intelligent annotation system framework for resolving a problem of high manual annotation costs and few manual annotation sets.

A product embodiment form in embodiments of this application is program code that is included in an intelligent data storage system and that is deployed on server hardware. A network element whose function is enhanced or reconstructed due to this solution belongs to soft reconstruction and is a relatively independent module. An application scenario shown in FIG. 3 is used as an example. The program code in embodiments of this application is stored in a runtime training module of an intelligent data system. When a program runs, the program code in embodiments of this application runs in a host storage and an acceleration hardware (GPU/FPGA/dedicated chip) memory of a server. In the future, impact may be exerted: Data may be read from an FTP, a file, a database, or a memory before the data is read into a module. After embodiments of this application are used, only a data source may need to be updated to an interface of a function module in this solution.

FIG. 3 shows an embodiment in a server and platform software. A label generation apparatus and an automatic calibration apparatus are modules that are newly added, based on existing platform software.

The following briefly describes two application scenarios: an ADAS/ADS visual perception system and a beautification function of a mobile phone.

Application Scenario 1: The ADAS/ADS Visual Perception System

Figure 4:
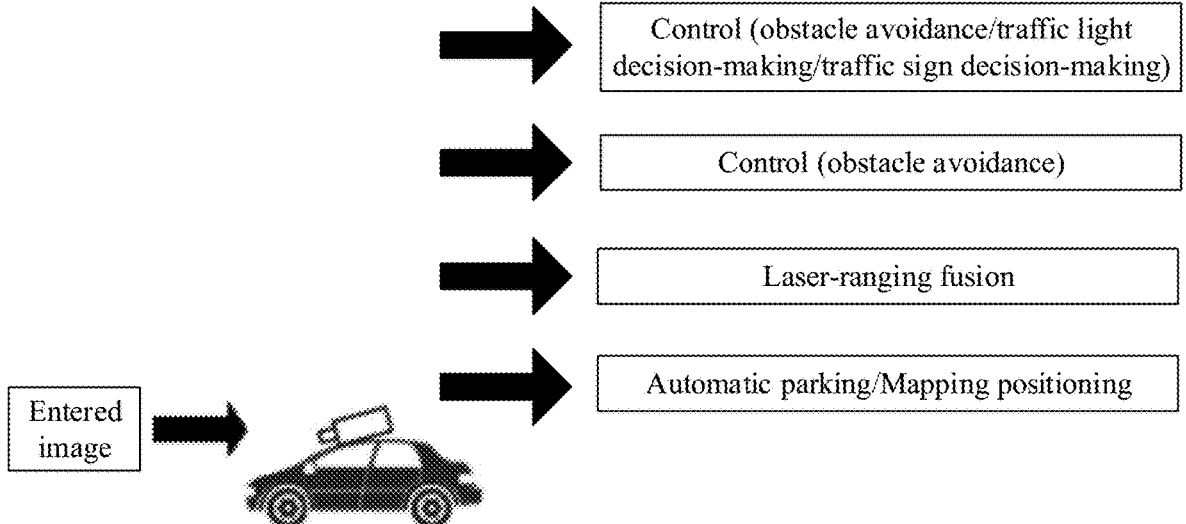
FIG. 4 shows an application scenario according to an embodiment of this application.

As shown in FIG. 4, in the ADAS and the ADS, a plurality of types of 2D targets need to be detected in real time, and include a dynamic obstacle (a pedestrian, a cyclist, a tricycle, a car, a truck, or a bus), a static obstacle (a traffic cone, a traffic stick, a fire hydrant, a motorcycle, or a bicycle), or a traffic sign (a guide sign, a billboard, a red traffic light/yellow traffic light/green traffic light/black traffic light, or a road sign). In addition, to accurately obtain a region occupied by the dynamic obstacle in 3D space, 3D estimation further needs to be performed on the dynamic obstacle, to output a 3D box. To integrate with data of laser radar, a mask of the dynamic obstacle needs to be obtained to filter out laser point clouds that hit the dynamic obstacle. To accurately locate a parking space, four key points of the parking space need to be detected at the same time. To locate a composition, key points of static objects need to be detected. All or some of the foregoing functions may be completed in the cognitive network by using the technical solutions provided in embodiments of this application.

Application Scenario 2: The Beautification Function of the Mobile Phone

In the mobile phone, a mask and a key point of a human body are detected by using the cognitive network provided in embodiments of this application, and a corresponding part of the human body may be scaled up or scaled down. For example, a waist slimming operation and a buttock enhancement operation are performed, to output a beautified image.

Application Scenario 3: Image Classification Scenario

After obtaining a to-be-categorized image, an object recognition apparatus obtains a category of an object in the to-be-categorized image according to an object recognition method in this application, and then may categorize the to-be-categorized image based on the category of the object in the to-be-categorized image. A photographer takes many photos every day, such as photos of animals, photos of people, and photos of plants. According to the method in this application, the photos can be quickly categorized based on content in the photos, and may be categorized into photos including animals, photos including people, and photos including plants.

When there are a relatively large quantity of images, efficiency of manual categorization is relatively low, and a person is prone to be tired when processing a same thing for a long time. In this case, a categorization result has a great error. However, according to the method in this application, the images can be quickly categorized without an error.

Application Scenario 4: Commodity Classification

After obtaining a commodity image, the object recognition apparatus obtains a category of a commodity in the commodity image according to the object recognition method in this application, and then categorizes the commodity based on the category of the commodity. For a variety of commodities in a large shopping mall or a supermarket, the commodities can be quickly categorized according to the object recognition method in this application, to reduce time overheads and labor costs.

The following describes, from a model training side and a model application side, the methods provided in this application.

A cognitive network training method provided in embodiments of this application relates to processing of a computer vision, and may be applied to a data processing method such as data training, machine learning, or deep learning. Symbolized and formalized intelligent information modeling, extraction, preprocessing, training, and the like are performed on training data (for example, an image or an image block of an object in this application and a category of the object), to finally obtain a trained cognitive network. In addition, in embodiments of this application, entered data (for example, the image of the object in this application) is entered into the trained cognitive network, to obtain output data (for example, 2D, 3D, mask, or key point information of an object of interest in the image is obtained in this application).

Because embodiments of this application relate to applications of a large quantity of neural networks, for ease of understanding, the following first describes related terms and related concepts such as a neural network in embodiments of this application.

(1) Object detection: By using a related method such as image processing, machine learning, or computer graphics, object detection may be performed to determine a category of an object in an image and determine a detection box for locating the object.

(2) A convolutional neural network (CNN) is a deep neural network with a convolutional structure. The convolutional neural network includes a feature extractor including a convolutional layer and a sub sampling layer. The feature extractor may be considered as a filter. A cognitive network in embodiments may include the convolutional neural network, configured to perform convolutional processing on an image or perform convolutional processing on a feature map, to generate a feature map.

(3) Back Propagation Algorithm

The convolutional neural network may correct a value of a parameter in an initial super-resolution model in a training process according to an error back propagation (BP) algorithm, so that an error loss of reconstructing the super-resolution model becomes smaller. An input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model. In embodiments, during training of a cognitive network, the cognitive network may be updated based on the back propagation algorithm.

Figure 5:
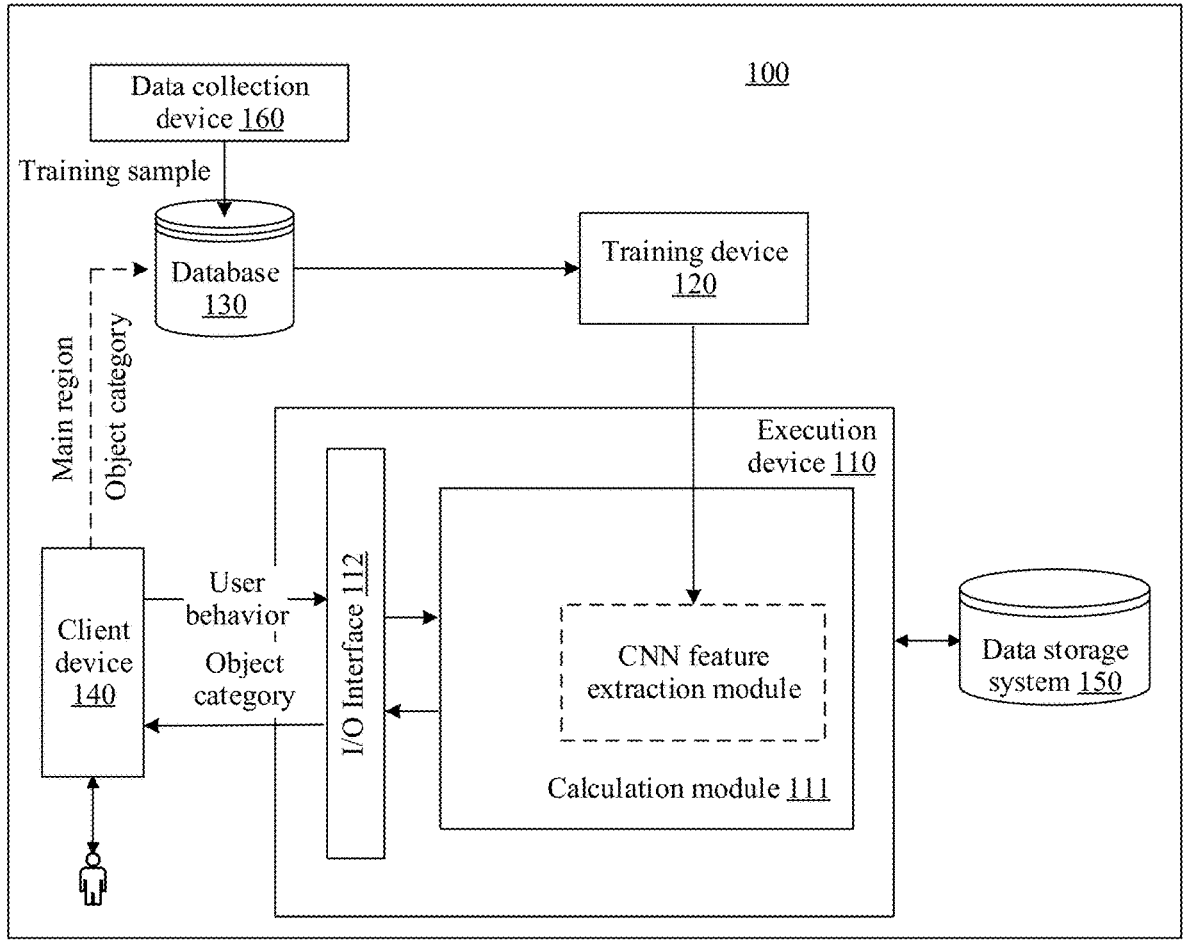
FIG. 5 is a diagram of a system architecture according to an embodiment of this application.

FIG. 5 is a diagram of a system architecture according to an embodiment of this application. In FIG. 5, an execution device 110 is provided with an input/output (input/output, I/O) interface 112, configured to change data with an external device. A user may enter data into the I/O interface 112 by using a client device 140. In this embodiment of this application, the entered data may include a to-be-recognized image, an image block, or an image.

In a process in which an execution device 110 preprocesses the entered data, or a calculation module 111 of an execution device 110 performs processing related to calculation, or the like (for example, implements a function of a neural network in this application), the execution device 110 may invoke data, code, or the like in a data storage system 150, to perform corresponding processing, and may further store, in the data storage system 150, data, instructions, or the like obtained through corresponding processing.

Finally, the I/O interface 112 returns, to the client device 140, a processing result, for example, at least one of the foregoing obtained image or image block, or 2D, 3D, mask, and key point information of an object of interest in the image, to provide the processing result to the user.

Optionally, the client device 140 may be a control unit in an automated driving system or a functional algorithm module in a mobile phone terminal. For example, the functional algorithm module may be configured to implement a perception-related task.

It should be noted that the training device 120 may generate corresponding target models/rules for different purposes, or referred to as different tasks, based on different training data, and the corresponding target models/rules may be used to implement the targets or complete the tasks, to provide required results for the user. The target model/rule may be a cognitive network described in subsequent embodiments, and a result provided to the user may be an object detection result in the subsequent embodiments.

In a case shown in FIG. 5, the user may manually give input data, and the manual giving may be operated by using an interface provided by the I/O interface 112. In another case, the client device 140 may automatically send input data to the I/O interface 112. If the client device 140 is required to automatically send the input data, the client device 140 needs to be authorized by the user, and the user may set a corresponding permission in the client device 140. The user may view, on the client device 140, the result output by the execution device 110. A presentation form may be a manner such as display, sound, or an action. The client device 140 may also serve as a data collection end to collect, as new sample data, the input data that is input into the I/O interface 112 and the output result that is output from the I/O interface 112 that are shown in the figure, and store the new sample data into a database 130. Certainly, the client device 140 may alternatively not perform collection, but the I/O interface 112 directly stores, as the new sample data into the database 130, the input data that is input into the I/O interface 112 and the output result that is output from the I/O interface 112 that are shown in the figure.

It should be noted that FIG. 5 is merely a diagram of a system architecture according to an embodiment of this application. A position relationship between a device, a component, a module, and the like shown in the figure constitutes no limitation. For example, in FIG. 5, the data storage system 150 is an external memory relative to the execution device 110. In another case, the data storage system 150 may alternatively be disposed in the execution device 110.

As shown in FIG. 5, the cognitive network may be obtained through training based on the training device 120.

Figure 6:
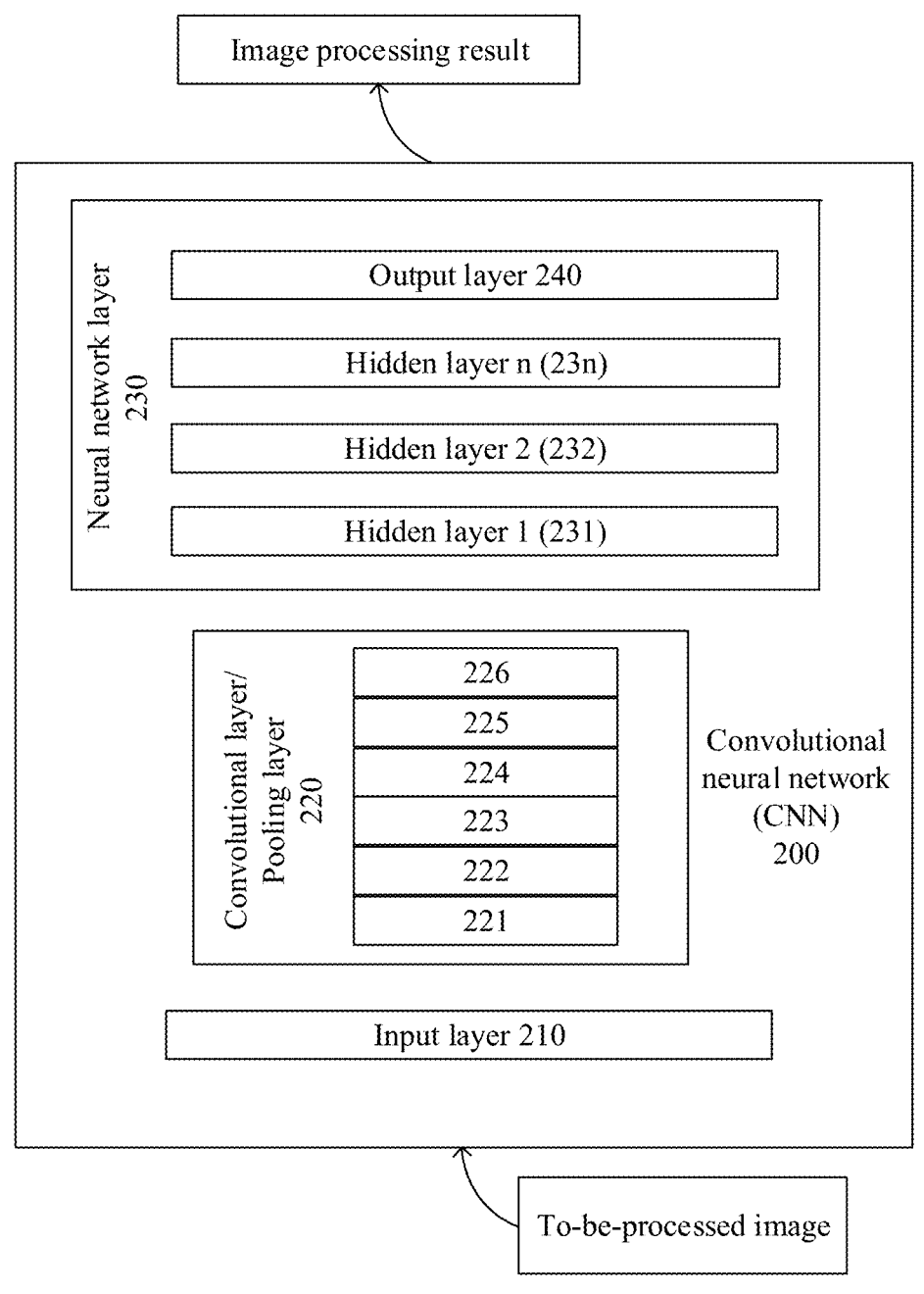
FIG. 6 is a diagram of a structure of a convolutional neural network used in an embodiment of this application.

The cognitive network may include a deep neural network with a convolutional structure. A structure of a convolutional neural network in this embodiment of this application may be shown in FIG. 6. In FIG. 6, a convolutional neural network (CNN) 200 may include an input layer 210, a convolutional layer/pooling layer 220 (the pooling layer is optional), and a neural network layer 230. The input layer 210 may obtain a to-be-processed image, and send the obtained to-be-processed image to the convolutional layer/pooling layer 220 and the subsequent neural network layer 230 for processing, to obtain a processing result of the image. The following describes in detail an architecture of the layer in the CNN 200 in FIG. 6.

Convolutional Layer/Pooling Layer 220:

Convolutional Layer:

As shown in FIG. 6, the convolutional layer/pooling layer 220 may include, for example, layers 221 to 226. For example, in an embodiment, the layer 221 is a convolutional layer, the layer 222 is a pooling layer, the layer 223 is a convolutional layer, the layer 224 is a pooling layer, the layer 225 is a convolutional layer, and the layer 226 is a pooling layer; and in another embodiment, the layers 221 and 222 are convolutional layers, the layer 223 is a pooling layer, the layers 224 and 225 are convolutional layers, and the layer 226 is a pooling layer. In other words, an output of a convolutional layer may be used as an input for a subsequent pooling layer, or may be used as an input for another convolutional layer, to continue to perform a convolution operation.

The following describes an internal working principle of a convolutional layer by using the convolutional layer 221 as an example.

The convolutional layer 221 may include a plurality of convolution operators. The convolution operator is also referred to as a kernel. In image processing, the convolution operator functions as a filter that extracts information from an entered image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction on an entered image, to extract a feature from the image.

Weight values in these weight matrices need to be obtained through a lot of training in actual application. Each weight matrix formed by using the weight values obtained through training may be used to extract information from an entered image, to enable the convolutional neural network 200 to perform correct prediction.

When the convolutional neural network 200 has a plurality of convolutional layers, an initial convolutional layer (for example, the layer 221) usually extracts more general features, where the general features may also be referred to as low-level features. As a depth of the convolutional neural network 200 increases, a deeper convolutional layer (for example, the layer 226) extracts more complex features, such as high-level semantic features. Higher-level semantic features are more applicable to a problem to be resolved.

Pooling Layer:

A quantity of training parameters often needs to be reduced. Therefore, a pooling layer often needs to be periodically introduced after a convolutional layer. For the layers 221 to 226 in the layer 220 shown in FIG. 6, one convolutional layer may be followed by one pooling layer, or a plurality of convolutional layers may be followed by one or more pooling layers.

Neural Network Layer 230:

After processing is performed by the convolutional layer/pooling layer 220, the convolutional neural network 200 still cannot output required output information, as described above, at the convolutional layer/pooling layer 220, only a feature is extracted, and parameters resulting from an entered image are reduced.

It should be noted that the convolutional neural network 200 shown in FIG. 6 is merely used as an example of the convolutional neural network. The convolutional neural network may alternatively exist in a form of another network model in application.

Figure 7:
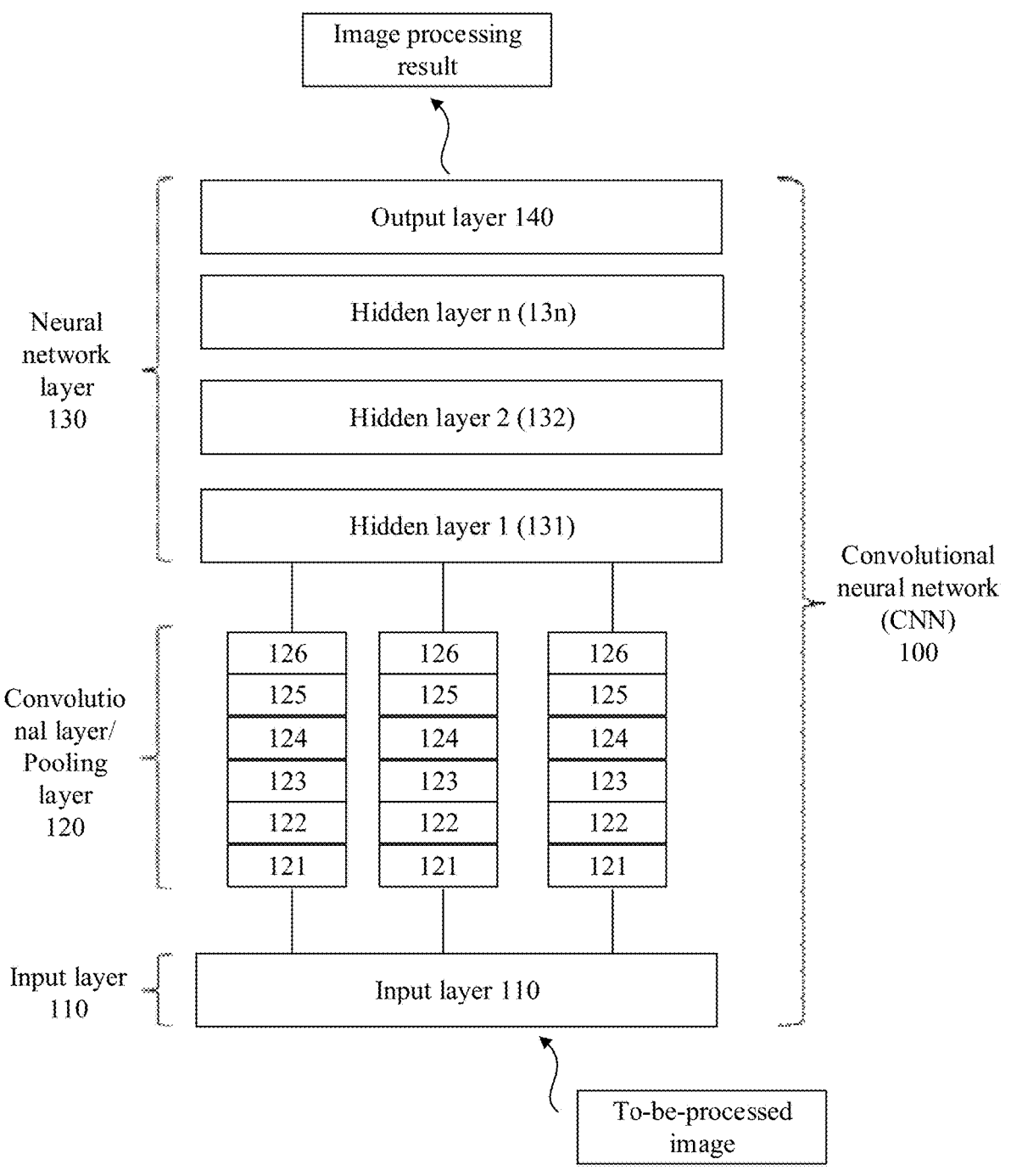
FIG. 7 is a diagram of a structure of a convolutional neural network used in an embodiment of this application.

The cognitive network in this embodiment of this application may include a deep neural network with a convolutional structure, and a structure of the convolutional neural network may be shown in FIG. 7. In FIG. 7, a convolutional neural network (CNN) 200 may include an input layer 110, a convolutional layer/pooling layer 120 (the pooling layer is optional), and a neural network layer 130. Compared with FIG. 6, in FIG. 7, at the convolutional layer/pooling layer 120, a plurality of convolutional layers/pooling layers are in parallel, and extracted features are input to the neural network layer 130 for processing.

Figure 8:
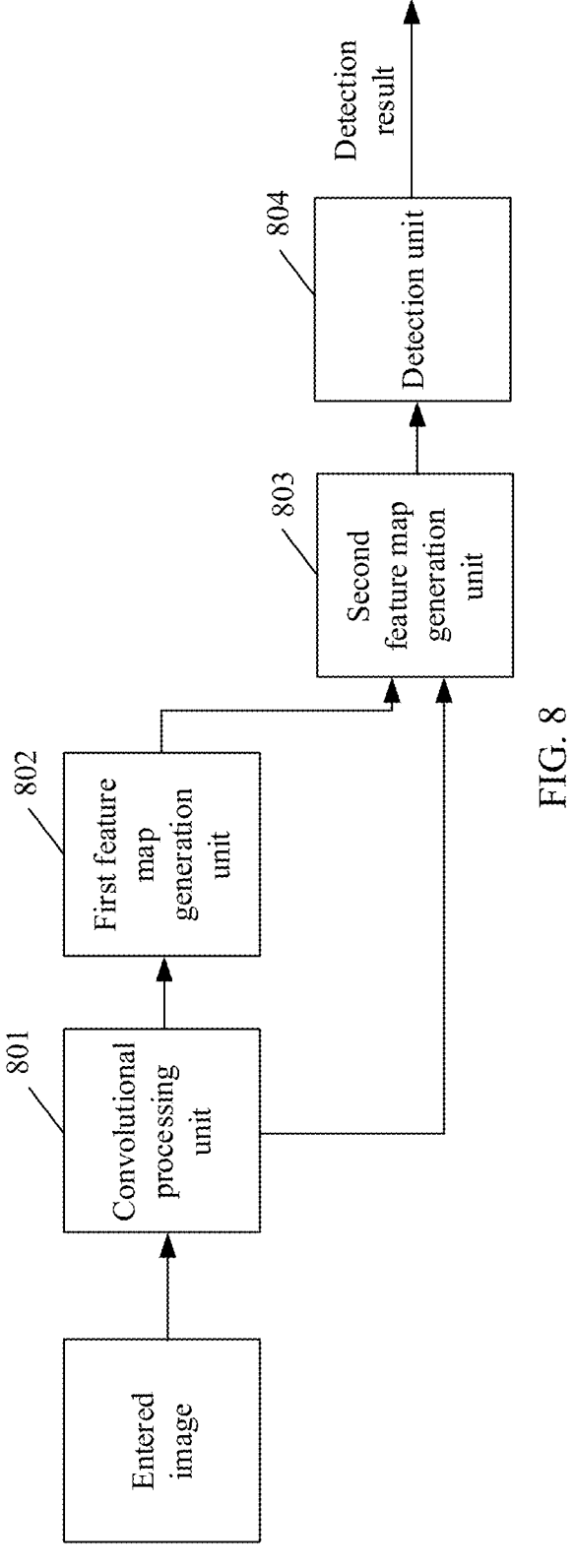
FIG. 8 shows a hardware structure of a chip according to an embodiment of this application.

FIG. 8 is a diagram of a structure of a data processing system according to an embodiment of this application. As shown in FIG. 8, the data processing system may include:

a convolutional processing unit 801, a first feature map generation unit 802, a second feature map generation unit 803, and a detection unit 804, where the convolutional processing unit 801 is separately connected to the first feature map generation unit 802 and the second feature map generation unit 803, the first feature map generation unit 802 is connected to the second feature map generation unit 803, and the second feature map generation unit 803 is connected to the detection unit 804.

In an embodiment, the data processing system may implement a function of a cognitive network. The convolutional processing unit 801 is a trunk network, the first feature map generation unit 802 and the second feature map generation unit 803 are feature pyramid networks, and the detection unit 804 is a header.

Figure 9:
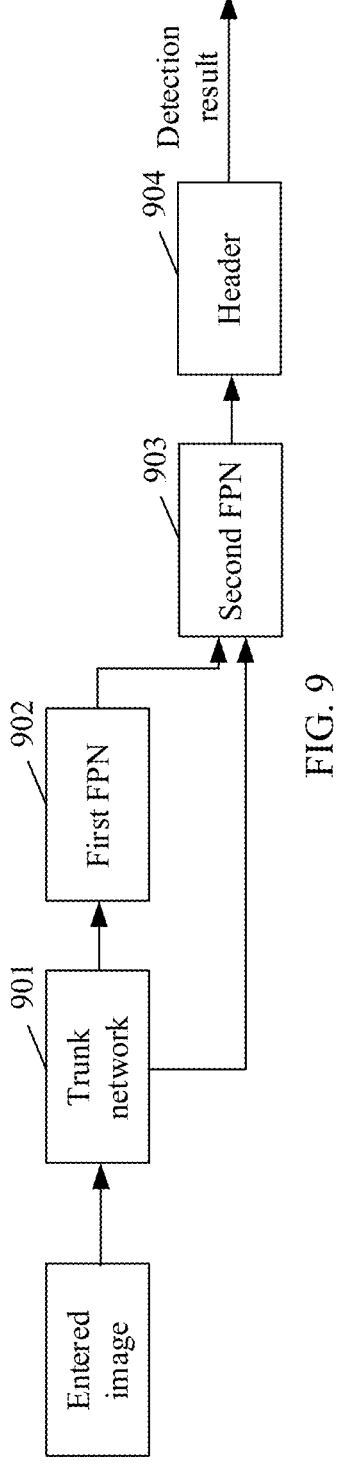
FIG. 9 is a diagram of a structure of a cognitive network according to an embodiment of this application.

FIG. 9 is a diagram of a structure of a cognitive network according to an embodiment of this application. As shown in FIG. 9, the cognitive network includes:

a trunk network 901, a first feature pyramid network FPN 902, a second FPN 903, and a header 904, where the trunk network 901 is separately connected to the first FPN 902 and the second FPN 903, the first FPN 902 is connected to the second FPN 903, and the second FPN 903 is connected to the head 904.

In this embodiment of this application, an architecture of the cognitive network may be an architecture shown in FIG. 9, and the architecture mainly includes the trunk network 901, the first FPN 902, the second FPN 903, and the header 904.

In an embodiment, the convolutional processing unit 801 is a trunk network, and the convolutional processing unit 801 is configured to: receive an entered image, and perform convolutional processing on the entered image, to generate a plurality of first feature maps.

It should be noted that the "performing convolutional processing on the entered image" herein should not be understood as only performing convolutional processing on the entered image. In some embodiments, convolutional processing and other processing may be performed on the entered image.

It should be noted that the "performing convolutional processing on the first image, to generate a plurality of first feature maps" herein should not be only understood as performing convolutional processing on the first image for a plurality of times, to generate one first feature map in each time of convolutional processing. In other words, it should not be understood that each first feature map is obtained by performing convolutional processing on the first image. Instead, from an overall perspective, the first image is a source of the plurality of first feature maps. In an embodiment, convolutional processing may be performed on the first image, to obtain one first feature map, and then convolutional processing may be performed on the generated first feature map, to obtain another first feature map. By analogy, the plurality of first feature maps may be obtained.

It should be noted that, a series of convolutional processing may be performed on the entered image. During each time of convolutional processing, convolutional processing may be performed on a first feature map obtained after a previous time of convolutional processing, to further obtain one first feature map. In the foregoing manner, the plurality of first feature maps may be obtained.

It should be noted that, the plurality of first feature maps may be feature maps with resolution on a plurality of scales. In other words, the plurality of first feature maps are not feature maps with same resolution. In an optional embodiment, the plurality of first feature maps may form one feature pyramid.

The convolutional processing unit may be configured to: receive the entered image, and perform convolutional processing on the entered image, to generate a plurality of first feature maps with resolution on a plurality of scales. The convolutional processing unit may perform a series of convolutional processing on the entered image, to obtain feature maps on different scales (with different resolution). The convolutional processing unit may be in a plurality of forms, for example, a visual geometry group (VGG), a residual neural network (resnet), and a core structure (Inception-net) of GoogLeNet.

In this embodiment of this application, the convolutional processing unit may be a trunk network, and the trunk network 901 is configured to: receive the entered image, and perform convolutional processing on the entered image, to generate a plurality of first feature maps with resolution on a plurality of scales.

Figure 10:
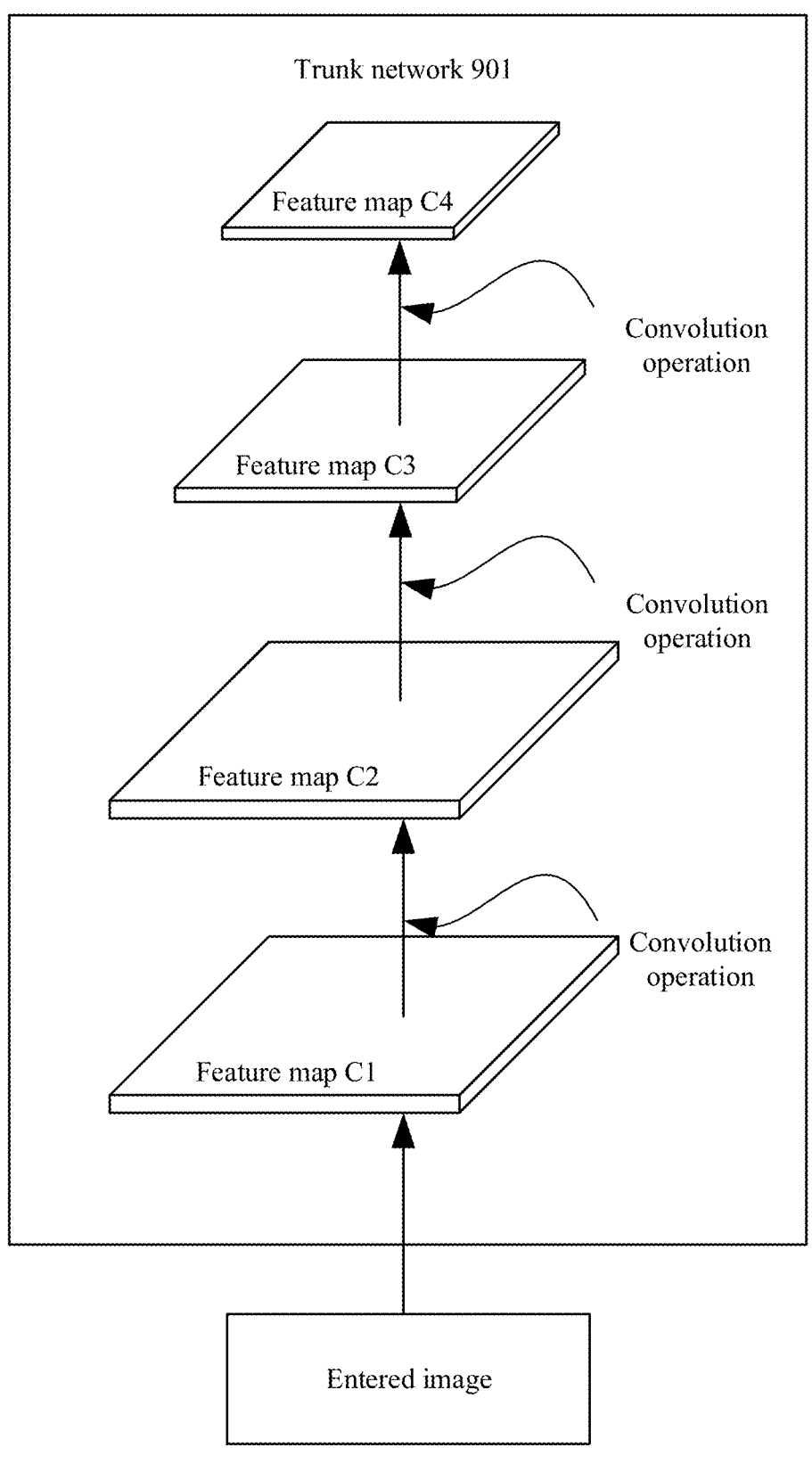
FIG. 10 is a diagram of a structure of a trunk network.

FIG. 10 is a diagram of a structure of a trunk network according to an embodiment of this application. As shown in FIG. 10, the trunk network is configured to: receive the entered image, perform convolutional processing on the entered image, and output feature maps (a feature map C1, a feature map C2, a feature map C3, and a feature map C4) that have different resolution and that correspond to the image, in other words, output feature maps that have different sizes and that correspond to the image. The trunk network completes extraction of a basic feature, to provide a corresponding feature for subsequent detection.

The trunk network may perform a series of convolutional processing operations on the entered image, to obtain feature maps on different scales (with different resolution). These feature maps provide a basic feature for a subsequent detection module. The trunk network may be in a plurality of forms, for example, a visual geometry group (VGG), a residual neural network (resnet), and a core structure (Inception-net) of GoogLeNet.

The trunk network may perform convolutional processing on the entered image, to generate several convolutional feature maps on different scales. Each feature map is an $H \times W \times C$ matrix. Herein, H is a height of the feature map, W is a width of the feature map, and C is a quantity of channels of the feature map.

A trunk network may have a plurality of existing convolutional network frameworks such as VGG16, Resnet50, and Inception-Net. That the trunk network is Resnet18 is used as an example for description below.

It is assumed that a resolution of the entered image is $H*W*3$ (a height is H, a width is W, and a quantity of channels is 3, in other words, there are R, B, and G channels). A convolutional layer Res18-Conv1 of Resnet 18 may perform a convolution operation on the entered image, to generate a feature map C1. The feature map is obtained by performing two times of downsampling on the entered image, and the quantity of channels is extended to 64. Therefore, resolution of C1 is $H/4 \times W/4 \times 64$. Res18-Conv2 of Resnet18 may perform a convolution operation on C1, to obtain a feature map C2. Resolution of this feature map is the same as the resolution of C1. Res18-Conv3 continues to perform a convolution operation on C2, to generate a feature map C3. This feature map is obtained by further downsampling C2, the quantity of channels is multiplied, and resolution of C3 is $H/8 \times W/8 \times 128$. Finally, Res18-Conv4 performs a convolution operation on C3, to generate a feature map C4. Resolution of C4 is $H/16 \times W/16 \times 256$.

It should be noted that the trunk network in this embodiment of this application may also be referred to as a backbone network. This is not limited herein.

It should be noted that the trunk network shown in FIG. 10 is merely an embodiment, and does not constitute a limitation on this application.

The first feature map generation unit 802 is configured to generate a plurality of second feature maps based on the plurality of first feature maps. The plurality of first feature maps include more texture detail information and/or position detail information than the plurality of second feature maps.

It should be noted that the "generating a plurality of second feature maps based on the plurality of first feature maps" herein should not be understood as that a source of each of the plurality of second feature maps is the plurality of first feature maps. In an embodiment, some of the plurality of second feature maps are directly generated based on one or more of the plurality of first feature maps. In an embodiment, some of the plurality of second feature maps are directly generated based on one or more of the plurality of first feature maps and a second feature map other than the some second feature maps. In an embodiment, some of the plurality of second feature maps are directly generated based on a second feature map other than the some second feature maps. In this case, because "the second feature map other than the some second feature maps is generated based on one or more of the plurality of first feature maps", it may be understood that the plurality of second feature maps are generated based on the plurality of first feature maps.

It should be noted that, the plurality of second feature maps may be feature maps with resolution on a plurality of scales. In other words, the plurality of second feature maps are not feature maps with same resolution. In an optional embodiment, the plurality of second feature maps may form one feature pyramid.

A convolution operation may be performed on a topmost-layer feature map C4 in the plurality of first feature maps generated by the convolutional processing unit. For example, a quantity of channels of the topmost-layer feature map C4 may be reduced to 256 through dilated convolution and 1×1 convolution, and an obtained feature map is used as a topmost-layer feature map P4 of the feature pyramid. After an output result of a feature map C3 at a next layer of a topmost layer is laterally connected, and a quantity of channels is reduced to 256 through 1×1 convolution, an obtained feature map and the feature map P4 are overlapped channel by channel and pixel by pixel, to obtain a feature map P3. By analogy, a first feature pyramid is constructed from top to bottom. The first feature pyramid may include a plurality of second feature maps.

It should be noted that, the texture detail information herein may be shallow detail information used to indicate a small target and an edge feature. The first feature map includes more texture detail information than the second feature map, so that detection precision of a detection result of detecting a small target in the first feature map is higher. A position detail may be information used to indicate a position of an object in the image and relative positions of objects.

It should be noted that the plurality of second feature maps may include more deep features than the first feature map. The deep feature includes rich semantic information, which exerts a very good effect on a classification task. In addition, the deep feature has a wide receptive field, to exert a good detection effect on a large target. In an embodiment, the plurality of second feature maps are generated by introducing a top-down path, so that the rich semantic information included in the deep feature can be naturally propagated downwards. In this way, a second feature map on each scale includes rich semantic information.

In this embodiment of this application, the first feature map generation unit 802 may be the first FPN 902.

In this embodiment of this application, the first FPN 902 is configured to generate a first feature pyramid based on the plurality of first feature maps. The first feature pyramid includes a plurality of second feature maps with resolution on a plurality of scales. In this embodiment of this application, the first FPN is connected to the trunk network, and the first FPN may perform convolutional processing and combination processing on the plurality of feature maps that have different resolution and that are generated by the trunk network, to construct the first feature pyramid.

Figure 11:
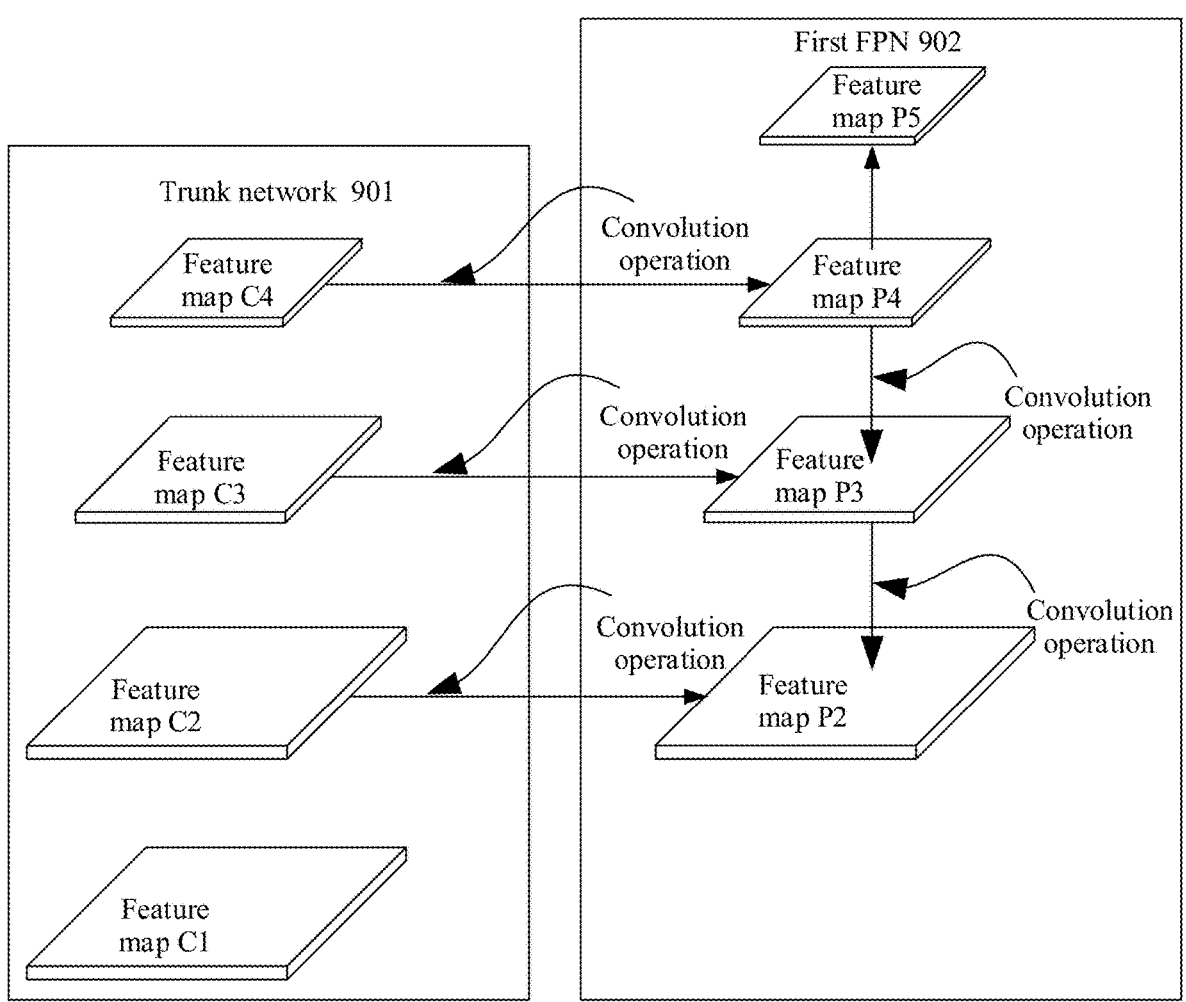
FIG. 11 is a diagram of a structure of a first FPN.

FIG. 11 is a diagram of a structure of a first FPN. The first FPN 902 may generate the first feature pyramid based on the plurality of first feature maps. The first feature pyramid includes the plurality of second feature maps (a feature map P2, a feature map P3, a feature map P4, and a feature map P5) with resolution on a plurality of scales. A convolution operation is performed on the topmost-layer feature map C4 generated by the trunk network 901. For example, a quantity of channels of the topmost-layer feature map C4 may be reduced to 256 through dilated convolution and 1×1 convolution, and an obtained feature map is used as a topmost-layer feature map P4 of a feature pyramid. After an output result of a feature map C3 at a next layer of a topmost layer is laterally connected, and a quantity of channels is reduced to 256 through 1×1 convolution, an obtained feature map and the feature map P4 are overlapped channel by channel and pixel by pixel, to obtain the feature map P3. By analogy, the first feature pyramid $\Phi P=\{$feature map P2, feature map P3, feature map P4, feature map P5$\}$ is constructed from top to bottom.

In this embodiment of this application, to obtain a wider receptive field, the first feature pyramid may further include the feature map P5, and the feature map P5 may be generated by directly performing a convolution operation on the feature map P4. A feature map in the middle of the first feature pyramid may be used to introduce rich semantic information included in the deep feature into each feature layer, layer-by-layer using a top-down structure, so that feature maps on different scales each include rich semantic information and can provide better semantic information for a small target, to improve classification performance of small targets.

It should be noted that the first FPN shown in FIG. 11 is merely an embodiment, and does not constitute a limitation on this application.

The second feature map generation unit 803 is configured to generate a plurality of third feature maps based on the plurality of first feature maps and the plurality of second feature maps.

It should be noted that the "generating a plurality of third feature maps based on the plurality of first feature maps and the plurality of second feature maps" herein should not be understood as that a source of each of the plurality of second feature maps is the plurality of first feature maps and the plurality of second feature maps. Instead, from an overall perspective, the plurality of first feature maps and the plurality of second feature maps are sources of the plurality of third feature maps. In an embodiment, some of the plurality of third feature maps are generated based on one or more of the plurality of first feature maps and one or more of the plurality of second feature maps. In an embodiment, some of the plurality of third feature maps are generated based on one or more of the plurality of first feature maps, one or more of the plurality of second feature maps, and a third feature map other than the some third feature maps. In an embodiment, some of the plurality of third feature maps are generated based on a third feature map other than the some third feature maps.

It should be noted that, the plurality of third feature maps may be feature maps with resolution on a plurality of scales. In other words, the plurality of third feature maps are not feature maps with same resolution. In an optional embodiment, the plurality of third feature maps may form one feature pyramid.

In this embodiment of this application, the second feature map generation unit 803 may be the second FPN 903.

In this embodiment of this application, the second FPN 903 is configured to generate a second feature pyramid based on the plurality of first feature maps and the plurality of second feature maps. The second feature pyramid includes a plurality of third feature maps with resolution on a plurality of scales.

Figure 12A:
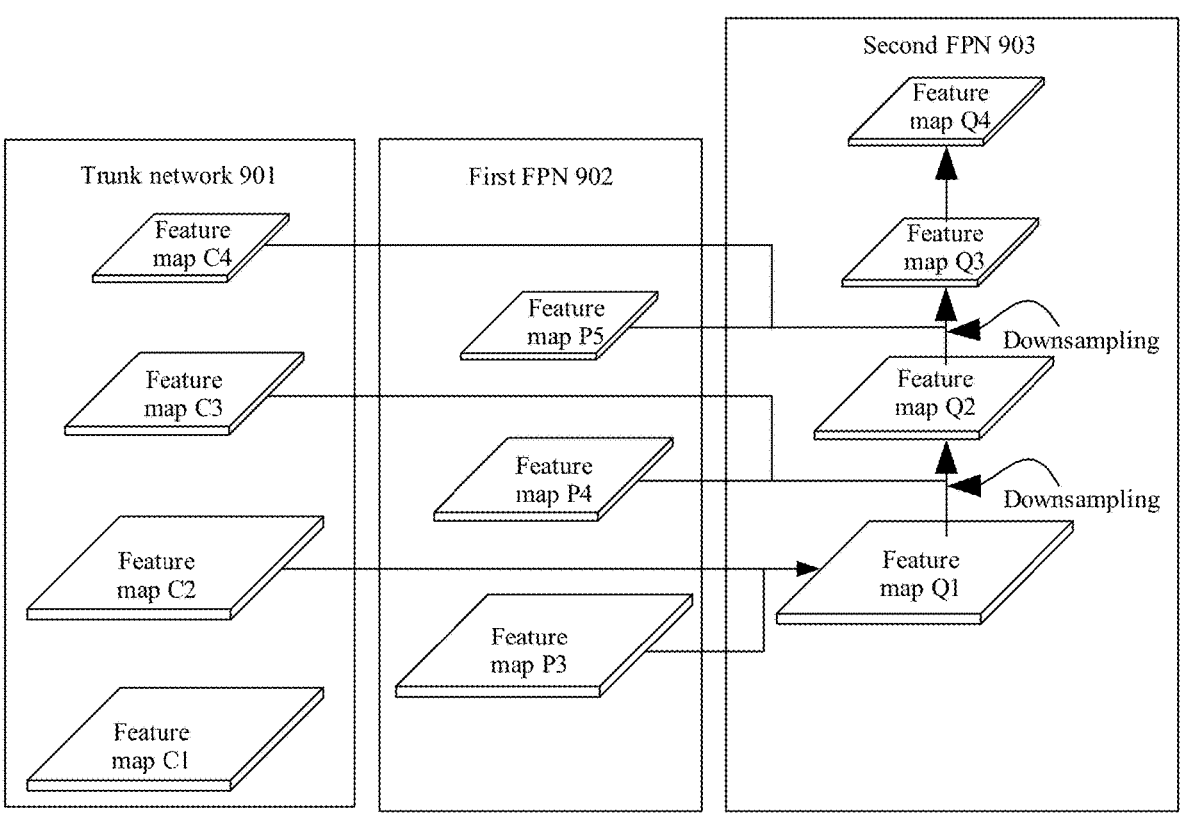
FIG. 12a is a diagram of a structure of a second FPN.

FIG. 12*a* is a diagram of a structure of a second FPN. The second FPN 903 may generate the second feature pyramid based on the plurality of first feature maps generated by the trunk network 901 and the plurality of second feature maps generated by the first FPN 902. The second feature pyramid may include a plurality of third feature maps (for example, a feature map Q1, a feature map Q2, a feature map Q3, and a feature map Q4 shown in FIG. 12*a*).

In this embodiment of this application, the second feature pyramid includes the plurality of third feature maps with resolution on a plurality of scales, and a bottom-most feature map (namely, a feature map with lowest resolution) in the plurality of third feature maps may be generated based on one first feature map generated by the trunk network and one second feature map generated by the first FPN.

In an embodiment, the plurality of first feature maps include a first target feature map, the plurality of second feature maps include a second target feature map, the plurality of third feature maps include a third target feature map, the third target feature map is a feature map with lowest resolution in the plurality of third feature maps, and the second FPN is configured to generate the third target feature map by performing the following step:

performing downsampling and convolutional processing on the first target feature map, to obtain a fourth target feature map, where the fourth target feature map and the second target feature map have a same quantity of channels and same resolution; and performing channel-by-channel overlapping on the fourth target feature map and the second target feature map, to generate the third target feature map.

Figure 12B:
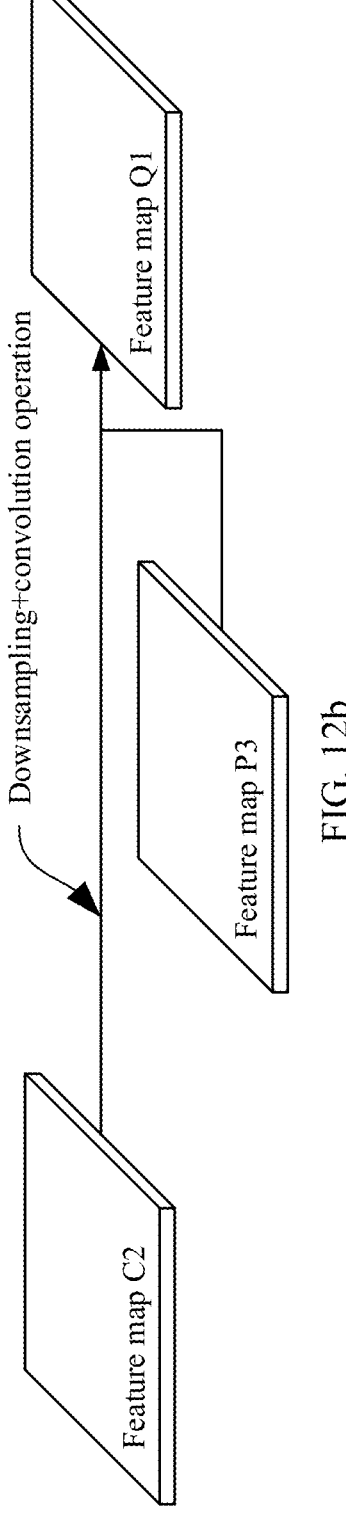
FIG. 12b is a diagram of a structure of a second FPN.

Refer to FIG. 12*b*. The plurality of first feature maps include the first target feature map, and the first target feature map may be a feature map C2 in FIG. 12*b*; the plurality of second feature maps include the second target feature map, and the second target feature map may be a feature map P3 in FIG. 12*b*; and the plurality of third feature maps include the third target feature map, and the third target feature map may be a feature map Q1 in FIG. 12*b*.

In this embodiment of this application, downsampling and convolutional processing may be performed on the first target feature map, to obtain the fourth target feature map. As shown in FIG. 12*b*, downsampling and convolutional processing may be performed on the feature map C2. Downsampling is performed, so that resolution of a feature map of each channel in the fourth target feature map is the same as resolution of the feature map P3, and convolutional processing is performed, so that a quantity of channels in the fourth target feature map is the same as a quantity of channels in the feature map P3. In the foregoing manner, the fourth target feature map and the second target feature map have a same quantity of channels and same resolution, and further, the fourth target feature map and the second target feature map may be overlapped channel by channel. As shown in FIG. 12*b*, the feature map Q1 may be obtained after the fourth target feature map and the second target feature are overlapped channel by channel.

In another embodiment, the plurality of first feature maps include a first target feature map, the plurality of second feature maps include a second target feature map, the plurality of third feature maps include a third target feature map, the third target feature map is a feature map with lowest resolution in the plurality of third feature maps, and the second FPN is configured to generate the third target feature map by performing the following step:

performing downsampling on the first target feature map, to obtain a fourth target feature map, where the fourth target feature map and the second target feature map have same resolution; and performing channel-by-channel overlapping and convolutional processing on the fourth target feature map and the second target feature map, to generate the third target feature map, where the third target feature map and the second target feature map have a same quantity of channels.

Figure 12C:
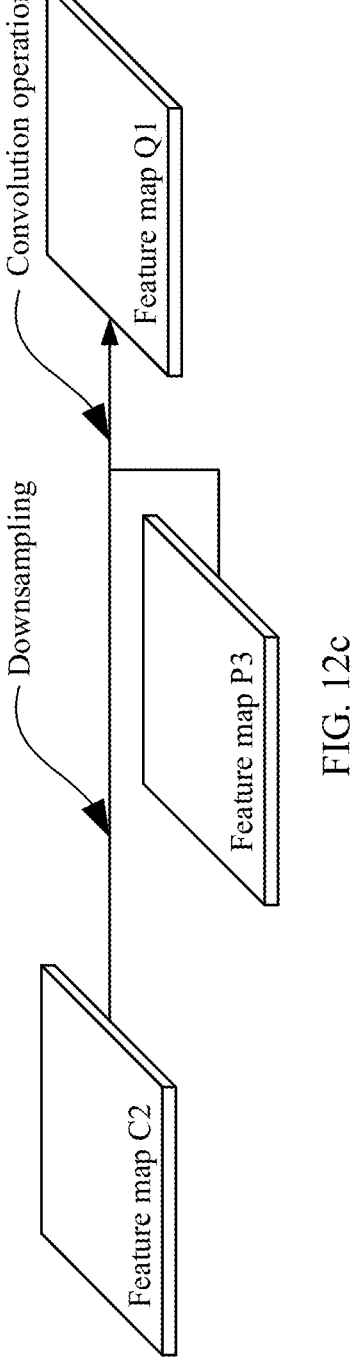
FIG. 12c is a diagram of a structure of a second FPN.

Refer to FIG. 12*c*. The plurality of first feature maps include the first target feature map, and the first target feature map may be a feature map C2 in FIG. 12*c*; the plurality of second feature maps include the second target feature map, and the second target feature map may be a feature map P3 in FIG. 12*c*; and the plurality of third feature maps include the third target feature map, and the third target feature map may be a feature map Q1 in FIG. 12*c*.

In this embodiment of this application, downsampling may be performed on the first target feature map, to obtain the fourth target feature map. As shown in FIG. 12*c*, downsampling may be performed on the feature map C2. Downsampling is performed, so that resolution of a feature map of each channel in the fourth target feature map is the same as resolution of the feature map P3. In the foregoing manner, the fourth target feature map and the second target feature map have same resolution, further, the fourth target feature map and the second target feature may be overlapped channel by channel, and then convolutional processing is performed, so that the obtained third target feature map and the feature map P3 have a same quantity of channels. Convolutional processing may be a concatenation operation.

In this embodiment of this application, the second feature pyramid includes the plurality of third feature maps with resolution on a plurality of scales, and a feature map (namely, resolution of the feature map is not the lowest) other than a bottom-most feature map in the plurality of third feature maps may be generated based on one first feature map generated by the trunk network, one second feature map generated by the first FPN, and one third feature map neighboring to a bottom layer.

In an embodiment, the plurality of first feature maps include a first target feature map, the plurality of second feature maps include a second target feature map, the plurality of third feature maps include a third target feature map and a fourth target feature map, resolution of the third target feature map is lower than resolution of the fourth target feature map, and the second feature map generation unit is configured to generate the fourth target feature map by performing the following step: performing downsampling on the third target feature map, to obtain a fifth target feature map, where the fifth target feature map and the second target feature map have a same quantity of channels and same resolution; performing downsampling and convolutional processing on the first target feature map, to obtain a sixth target feature map, where the sixth target feature map and the second target feature map have a same quantity of channels and same resolution; and overlapping the fifth target feature map, the second target feature map, and the sixth target feature map based on respective channels, to generate the fourth target feature map.

Figure 12D:
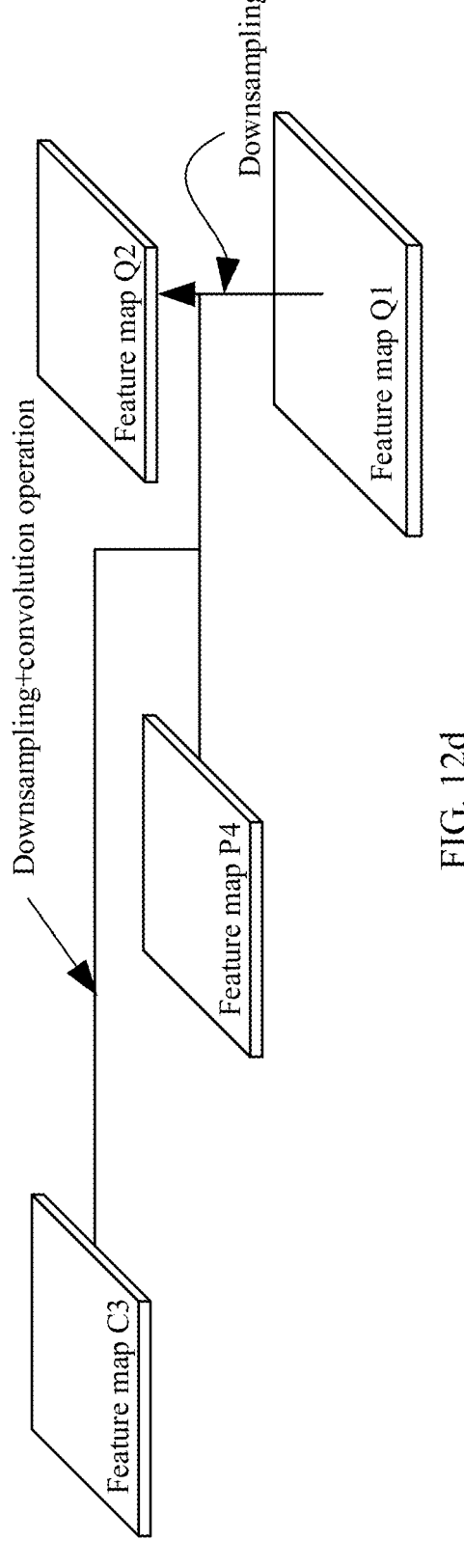
FIG. 12d is a diagram of a structure of a second FPN.

Refer to FIG. 12d. The plurality of first feature maps include the first target feature map, and the first target feature map may be a feature map C3 in FIG. 12d; the plurality of second feature maps include the second target feature map, and the second target feature map may be a feature map P4 in FIG. 12d; and the plurality of third feature maps include the third target feature map and the fourth target feature map, and the third target feature map may be a feature map Q2 in FIG. 12d.

In this embodiment of this application, downsampling may be performed on the third target feature map, to obtain the fifth target feature map. As shown in FIG. 12d, downsampling may be performed on a feature map Q1. Downsampling is performed, so that resolution of a feature map of each channel in the fifth target feature map is the same as resolution of the feature map P4.

In this embodiment of this application, downsampling and convolutional processing may be performed on the third target feature map, to obtain the fifth target feature map. Downsampling is performed, so that the resolution of the feature map of each channel in the fifth target feature map is the same as that of the second target feature map. Convolutional processing is performed, so that a quantity of channels of the fifth target feature map is the same as a quantity of channels of the second target feature map. In the foregoing manner, the fifth target feature map and the second target feature map have same resolution and a same quantity of channels, and further, the fifth target feature map, the sixth target feature map, and the second target feature map may be overlapped channel by channel, to obtain the fourth target feature map.

In another embodiment, downsampling may be performed on the third target feature map, to obtain a fifth target feature map, where the fifth target feature map and the second target feature map have a same quantity of channels and same resolution; downsampling is performed on the first target feature map, to obtain a sixth target feature map, where the sixth target feature map and the second target feature map have same resolution; and the fifth target feature map, the second target feature map, and the sixth target feature map are overlapped based on respective channels and convolutional processing is performed, to generate a fourth target feature map, where the fourth target feature map and the second target feature map have a same quantity of channels.

Figure 12E:
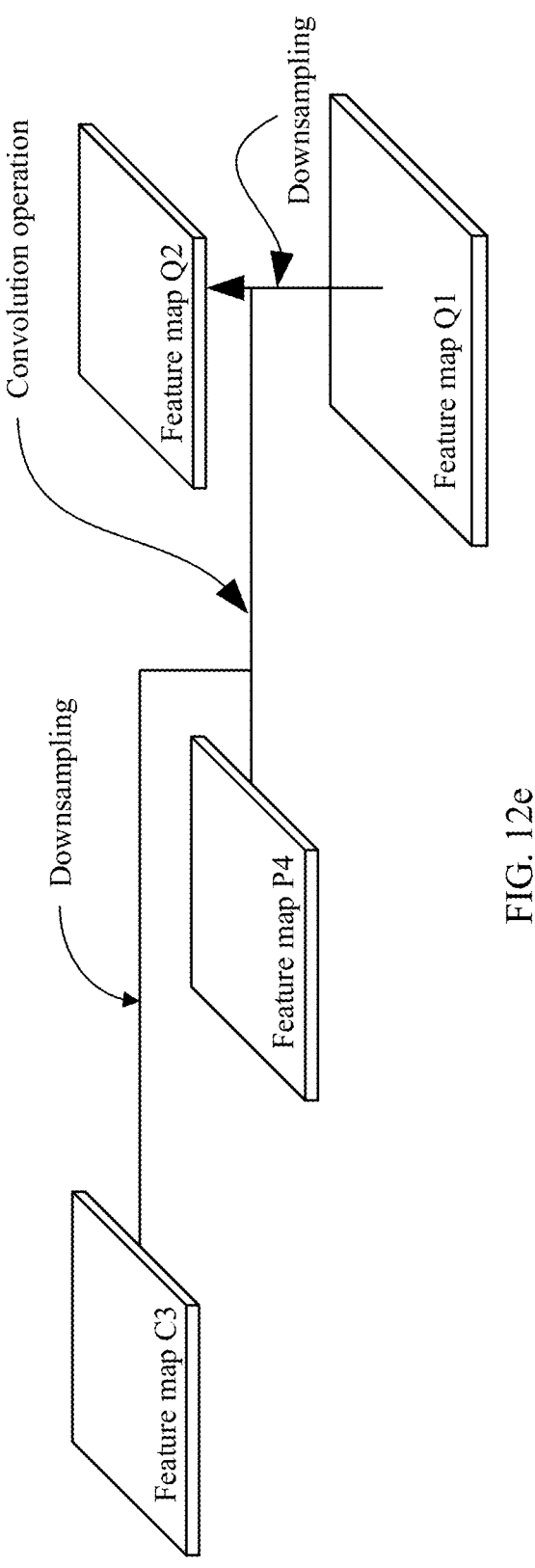
FIG. 12e is a diagram of a structure of a second FPN.

Refer to FIG. 12e. The plurality of first feature maps include the first target feature map, and the first target feature map may be a feature map C3 in FIG. 12e; the plurality of second feature maps include the second target feature map, and the second target feature map may be a feature map P4 in FIG. 12e; and the plurality of third feature maps include the third target feature map and the fourth target feature map, and the third target feature map may be a feature map Q2 in FIG. 12e.

In this embodiment of this application, downsampling may be performed on the third target feature map, to obtain the fifth target feature map. Downsampling is performed, so that resolution of a feature map of each channel in the fifth target feature map is the same as that of the second target feature map. In the foregoing manner, the fifth target feature map and the second target feature map have same resolution, and further, the fifth target feature map and the second target feature may be overlapped channel by channel. Downsampling may be performed on the first target feature map, to obtain the sixth target feature map. Downsampling is performed, so that resolution of a feature map of each channel in the sixth target feature map is the same as that of the second target feature map. In the foregoing manner, the fifth target feature map, the sixth target feature map, and the second target feature map have same resolution, and further, the fifth target feature map, the sixth target feature map, and the second target feature map may be overlapped channel by channel. Then, convolutional processing is performed, so that the obtained fourth target feature map and the second target feature map have a same quantity of channels. Convolutional processing may be a concatenation operation.

In this embodiment, the second feature map generation unit may generate the third target feature map and the fourth target feature map with different resolution, and resolution of the third target feature map is lower than resolution of the fourth target feature map. The fourth target feature map with higher resolution is generated based on one of the plurality of first feature maps, one of the plurality of second feature maps, and the third target feature map. In this case, the plurality of third feature maps generated by the second feature map generation unit retains an advantage of the feature pyramid network. The second feature map generation unit introduces rich texture detail information and/or position detail information of a shallow neural network into a deep convolutional layer from bottom to top (feature maps are sequentially generated in ascending order of resolution), and detection precision of a detection result that is of a small target in the plurality of third feature maps generated in this manner and that is of a detection network is higher.

An object detection task is different from image classification. In an image classification task, a model only needs to answer a question about a specific object in an image. Therefore, the image classification task has transformation invariance such as translation invariance and scale invariance. However, in the object detection task, the model needs to learn of two parallel tasks of a specific position of a target in an image and a specific category of the target. However, in an actually obtained light-visible image, a size and a position of the target constantly change, and there is a multi-scale target detection problem. Both original one stage and two stage models directly migrate, based on the image classification task, a part of an image classification network for detection, and usually selects a deep feature of the network for subsequent processing, to obtain a feature map with an expressive ability that is high enough and enough semantic information. To obtain a better expressive ability and a higher-precision result, a current deep neural network model is extended towards a deeper multi-branch topology. At a deeper network layer, a network degradation problem occurs accordingly. A ResNet network structure with identical mapping and a skip connection can be used to resolve the network degradation problem well. Currently, in a high-precision detection model, there are 10 to 100 network layers, so that a network can obtain a better expressive ability. However, there is a problem in the prior art that a deeper network layer, an obtained feature has a wider receptive field. Consequently, a small target is missed during detection.

In addition, only a feature obtained by a specific layer is used in a conventional detection algorithm, to generate a fixed receptive field. Although an anchor is introduced in subsequent processing, anchors with different sizes and length-width ratios are disposed, to map a feature map onto an original map for processing, so as to resolve a multi-scale problem. However, a problem in the prior art is that missing a detection target inevitably occurs. The feature pyramid network (FPN) is proposed, to resolve the multi-scale target detection problem well. A deep convolutional neural network is observed, and a deep network model includes a plurality of layers of feature maps on a plurality of scales. A shallow feature map has a narrower receptive field, and a deep feature map has a wide receptive field. Therefore, multi-scale information may be introduced by directly using a feature map with a pyramid hierarchical structure, but there is a problem that although the shallow feature map has a narrow receptive field, which helps detect a small target, the shallow feature map includes a small amount of semantic information. It can be understood as that a shallow feature is not abstract enough, and it is difficult to use the shallow feature to classify detected targets. A clever structural design is used for the feature pyramid network (FPN), to resolve a problem that the shallow feature has insufficient semantic information. For a basic deep convolutional neural network, there is a process of obtaining hierarchical feature maps through bottom-up forward calculation. In addition, a feature on each scale has a scale factor, and resolution of the feature maps gradually decreases. A top-down network structure is introduced into the feature pyramid network (FPN), to gradually increase the resolution of the feature maps. In addition, a lateral connection branch extracted from an original feature extraction network is introduced, to fuse a feature map corresponding to resolution of an original feature network and a deep feature map obtained after upsampling.

In this embodiment of this application, it is considered that shallow information generated by the trunk network is fused into each feature layer again, and a bottom-up skip-connected multi-scale feature layer design is created. The shallow feature map includes very rich edge, texture, and detail information. A skip connection is introduced between an original feature map and a bottom-up multi-scale network layer, and a downsampled original feature map and a laterally connected feature map with corresponding resolution in top-down feature layers on a plurality of scales are fused. Such a network layer improvement exerts a good detection effect on a small target and some obstructed targets, to introduce a feature with rich semantic information and detail information into a multi-scale feature pyramid.

In an existing embodiment, the second feature map generation unit (for example, a feature pyramid network) propagates rich semantic information included in a deep feature downwards by introducing a top-down path, so that a second feature map on each scale includes rich semantic information. In addition, the deep feature has a wide receptive field, to exert a good detection effect on a large target. However, in an existing embodiment, finer position detail information and texture detail information included in a shallower feature map are ignored. This greatly affects detection precision of large and small targets. In this embodiment of this application, the second feature map generation unit introduces shallow texture detail information of the original feature map (the plurality of first feature maps generated by the convolutional processing unit) into the deep feature map (the plurality of second feature maps generated by the first feature map generation unit), to generate a plurality of third feature maps, and the third feature map including the shallow rich texture detail information is used as entered data on which the detection unit is to perform target detection, to improve detection precision of subsequent object detection.

It should be noted that, in this embodiment, there is no higher detection precision in object detection of all images including a small target, but for a large quantity of samples, there may be higher comprehensive detection precision in this embodiment.

The detection unit 804 is configured to: perform target detection on the image based on at least one of the plurality of third feature maps, and output a detection result.

In this embodiment of this application, the detection unit 804 may be a header.

In this embodiment of this application, the head is configured to: detect a target object in the image based on the at least one of the plurality of third feature maps, and output the detection result.

Figure 13A:
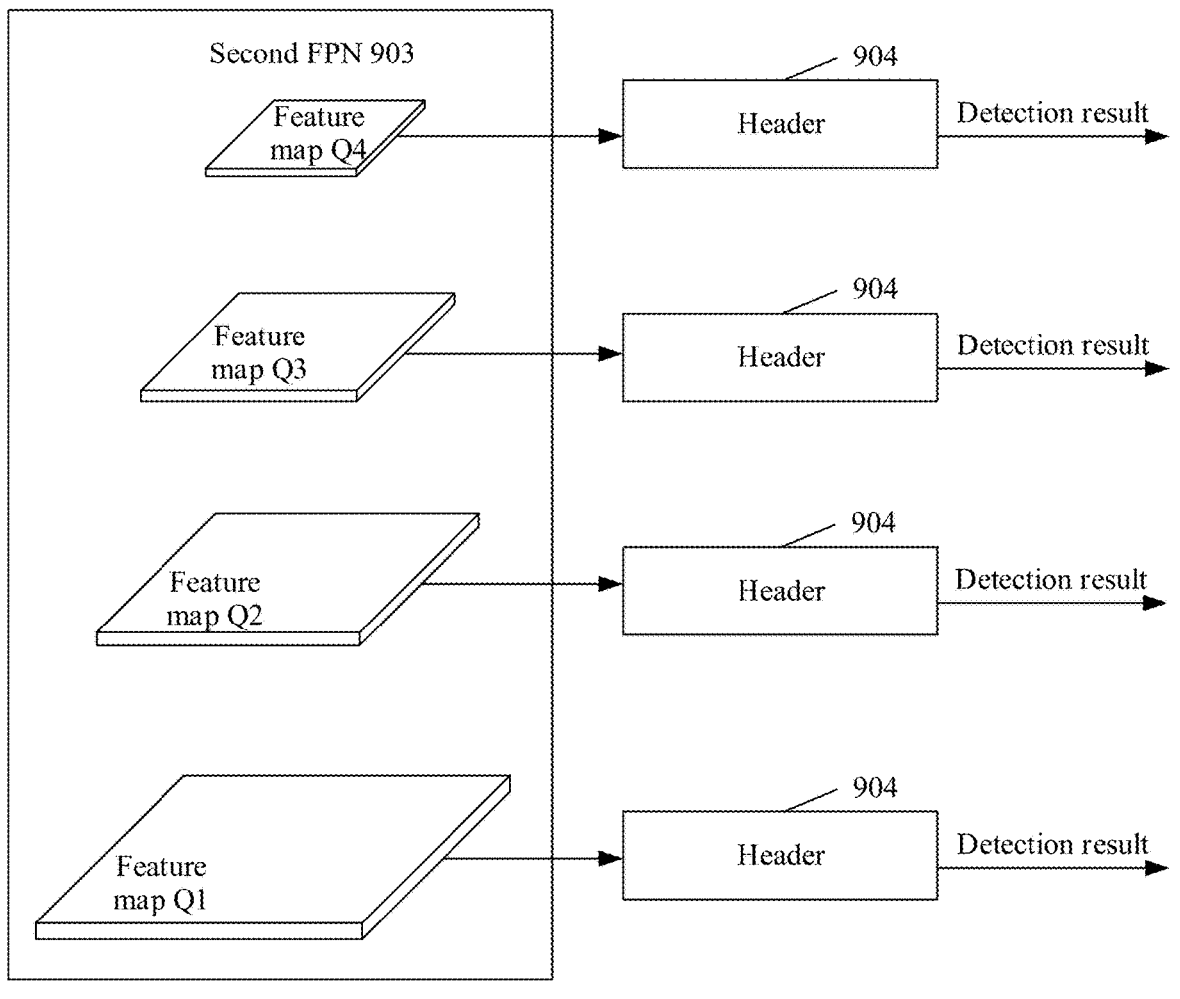
FIG. 13a is a diagram of a structure of a head.

In this embodiment of this application, the cognitive network may include one or more heads. As shown in FIG. 13a, each parallel header is configured to: detect a task object in a task based on a third feature map output by the second FPN, and output a 2D box of a region in which the task object is located and a confidence level corresponding to each 2D box. Each parallel head may complete detection of different task objects. The task object is an object that needs to be detected in the task. A higher confidence level indicates a higher probability that the object corresponding to the task exists in a 2D box corresponding to the confidence level.

In this embodiment of this application, different heads may complete different 2D detection tasks. For example, one of a plurality of heads may complete detection of a vehicle, and output a 2D box and a confidence level of a car/truck/bus. A head 1 in the plurality of heads may complete detection of a person, and output a 2D box and a confidence level of a pedestrian/cyclist/tricycle. A head in the plurality of heads may complete detection of a traffic light, and output a 2D box and a confidence level of a red traffic light/green traffic light/yellow traffic light/black traffic light.

In this embodiment of this application, the cognitive network may include a plurality of serial heads. The serial head is connected to a parallel head. It should be emphasized herein that, actually, the serial head is not necessary. In a scenario in which only a 2D box needs to be detected, the serial head does not need to be included.

The serial head may be configured to: extract, from one or more feature maps on the second FPN by using a 2D box that is of a task object of a task and that is provided by the parallel head connected to the serial head, a feature of a region in which the 2D box is located, and predict 3D information, mask information, or key point information of the task object of the task based on the feature of the region in which the 2D box is located. Optionally, the serial header is serially connected to the parallel header, and complete 3D/mask/key point detection of the object in the 2D box based on the 2D box of the task being detected. For example, serial 3D_head0 estimates a direction, a centroid, a length, a width, and a height of a vehicle, to output a 3D box of the vehicle. Serial Mask_head0 predicts a fine mask of the vehicle, to segment the vehicle. Serial Keypoint_head0 estimates a key point of the vehicle. The serial head is not necessary. If 3D/mask/key point detection does not need to be performed on some tasks, the serial head does not need to be connected in series. For example, during detection of a traffic light, only a 2D box needs to be detected, and the serial head does not need to be connected in series. In addition, for some tasks, one or more serial heads may be selected based on a requirement of the tasks, for example, detection of a parking lot detection. In addition to a 2D box, a key point of a parking space needs to be obtained.

Therefore, in this task, only one serial Keypoint_head needs to be connected in series, and a head that performs 3D and mask detection is not required.

Figure 13B:
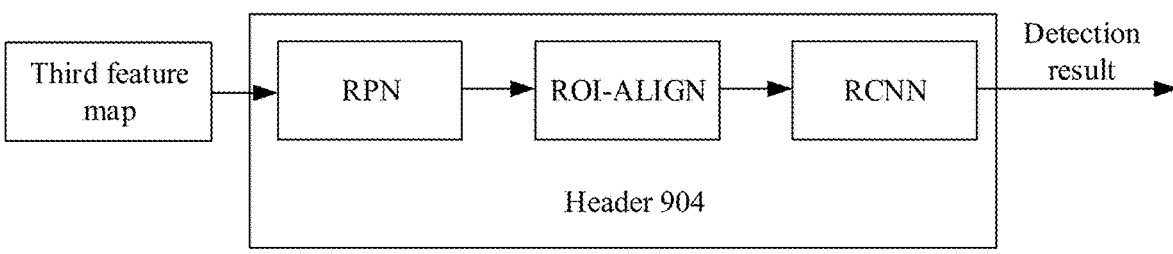
FIG. 13b is a diagram of a structure of a head.

In this embodiment of this application, the header is connected to the FPN, and the header may complete detection of a 2D box of a task based on a feature map provided by the FPN, and output a 2D box of an object of the task, a corresponding confidence level, and the like. A diagram of a structure of a header is described below. FIG. 13b is a diagram of a header. As shown in FIG. 13b, the head includes three modules: a region proposal network (RPN) module, an ROI-ALIGN module, and an RCNN module.

The RPN module may be configured to: predict, on one or more third feature maps provided by the second FPN, a region in which the task object is located, and output a proposal 2D box matching the region. Alternatively, it can be understood that the RPN predicts, on one or more third feature maps output by the FPN, a region in which the task object may exist, and provides boxes of these regions. These regions are referred to as proposal regions. For example, when the head is responsible for detecting a vehicle, an RPN layer of the header predicts a proposal box in which the vehicle may exist. When the head is responsible for detecting a person, an RPN layer of the head predicts a proposal box in which the person may exist. Certainly, these proposals are not accurate. On one hand, the proposals do not necessarily include an object of the task. On the other hand, these boxes are not compact.

A proposal 2D region prediction procedure may be implemented by the RPN module of the head. The RPN module predicts, based on a feature map provided by the FPN, the region in which the task object may exist, and provides a proposal box (which may also be referred to as proposal regions) of these regions. In this embodiment, if the head is responsible for detecting a vehicle, the RPN layer of the head predicts a proposal box in which the vehicle may exist.

The RPN layer may generate, for example, through one time of 3×3 convolution, a feature map on the third feature map provided by the second FPN. An RPN layer of a subsequent head predicts the proposal from the RPN Hidden. The RPN layer of the head predicts coordinates and a confidence level of a proposal at each position of the RPN Hidden through 1×1 convolution. Higher confidence indicates a higher probability that an object of the task exists in the proposal. For example, a higher score of a proposal in the head indicates a higher probability that the vehicle exists in the proposal. Proposals predicted at each RPN layer need to be combined by a proposal combination module. A redundant proposal is removed based on an overlap between the proposals (this process can be performed according to but not limited to an NMS algorithm). N (N<K) proposals with the highest scores are selected from remaining K proposals as proposals in which the object may exist. These proposals inaccurate. The proposals do not necessarily include an object of the task, and the proposals are not compact. Therefore, the RPN module only performs a coarse detection process, and an RCNN module needs to perform sub-classification subsequently. When the RPN module regresses the coordinates of the proposal, the RPN does not directly regress absolute values of the coordinates. Instead, the RPN regresses coordinates relative to an anchor. Higher matching between these anchors and actual objects indicates a higher probability that the RPN can detect the objects.

The ROI-ALIGN module is configured to extract, based on the region obtained through prediction by the RPN module and from a feature map provided by the FPN, the feature of the region in which the proposal 2D box is located.

In other words, the ROI-ALIGN module mainly obtains, from a feature map based on a proposal provided by the RPN module, a feature of a region in which each proposal is located, and resizes the feature to a fixed size, to obtain a feature of each proposal. It can be understood that the ROI-ALIGN module may use, without a limitation to, a feature extraction method such as ROI-POOLING (region of interest pooling)/ROI-ALIGN (region of interest alignment)/PS-ROIPOOLING (position sensitive region of interest pooling)/PS-ROIALIGN (position sensitive region of interest alignment).

The RCNN module is configured to: perform, by using a neural network, convolutional processing on the feature of the region in which the proposal 2D box is located, to obtain a confidence level of each object category of the proposal 2D box; adjust coordinates of the proposal 2D box by using the neural network, so that the adjusted proposal 2D box better matches a shape of an actual object than the proposal 2D box; and select, as the 2D box of the region, an adjusted proposal 2D box whose confidence level is greater than a preset threshold. In other words, the RCNN module mainly refines the feature, of each proposal, that is extracted by the ROI-ALIGN module, to obtain confidence that each proposal belongs to each category (for example, for a vehicle task, four scores of Background/Car/Truck/Bus are provided). In addition, coordinates of a 2D box of the proposal are adjusted to output a more compact 2D box. These 2D boxes are combined through non-maximum suppression (NMS), and then are output as a final 2D box.

Proposal 2D region sub-classification is mainly implemented by the RCNN module of the head in FIG. 13b. The RCNN module further obtains, through regression, coordinates of a more compact 2D box based on the feature of each proposal extracted by the ROI-ALIGN module, classifies the proposal, and outputs a confidence level of each category of the proposal. The RCNN may be implemented in many forms. A size of a feature output by the ROI-ALIGN module may be N×14×14×256 (Feature of proposals). The feature is first processed by a convolution module 4 (Res18-Conv5) of Resnet18 in the RCNN module. A size of an output feature is N×7×7×512. Then, Global Avg Pool (average pooling layer) is used for processing. 7×7 features on each channel in entered features are averaged, to obtain N×512 features. Each 1×512-dimensional feature vector represents a feature of each proposal. Next, precise coordinates of the box (a vector of N×4 is output, where the four values respectively indicate x/y coordinates of a center point of the box, a width and a height of the box) and confidence of a box category (In the head 0, scores that the box is Background/Car/Truck/Bu need to be provided) are respectively regressed through two full connection FC layers. Finally, several boxes with the highest scores are selected through a box combination operation, and duplicate boxes are removed through an NMS operation, to obtain an output of the compact box.

In some actual application scenarios, the cognitive network may further include another head, and 3D/mask/key point detection may be further performed when the 2D box is detected. For example, 3D detection is used as an example. The ROI-ALIGN module extracts, based on an accurate 2D box provided by the head and from the feature map output by the FPN, a feature of a region in which each 2D box is located. It is assumed that there are M 2D boxes. Then, the size of the feature output by the ROI-ALIGN module is M×14×14×256. The feature is first processed by Res18-Conv5 of Resnet18, and a size of an output feature is N×7×7×512. Then, Global Avg Pool (average pooling layer) is used for processing, and 7×7 features on each channel in entered features are averaged, to obtain M×512 features. Each 1×512-dimensional feature vector represents a feature of each 2D box. Then, an orientation (orientation, an M×1 vector) of an object in the box, coordinates of a centroid (centroid, and an M×2 vector, where the two values represent an x/y coordinate of the centroid), and a dimension are respectively obtained through regression at three fully connected FC layers.

It should be noted that the header shown in FIG. 13*a* and FIG. 13*b* is merely an embodiment, and does not constitute a limitation on this application.

In this embodiment of this application, the cognitive network may further include a dilated convolutional layer, configured to perform dilated convolution processing on at least one of the plurality of third feature maps. Correspondingly, the head is configured to: detect the target object in the image based on the at least one third feature map on which dilated convolution processing is performed, and output a detection result.

Figure 14A:
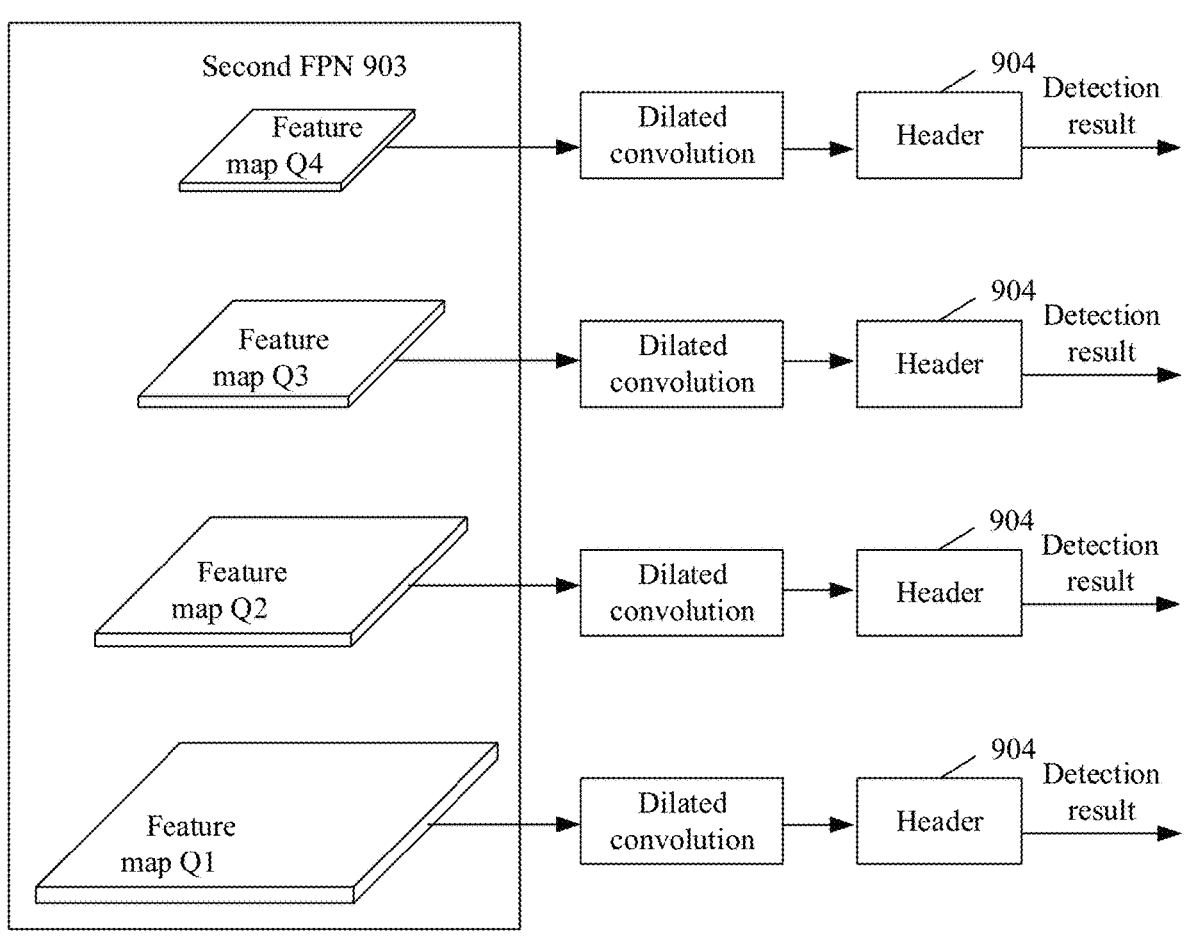
FIG. 14a is a diagram of a structure of a cognitive network according to an embodiment of this application.
Figure 14B:
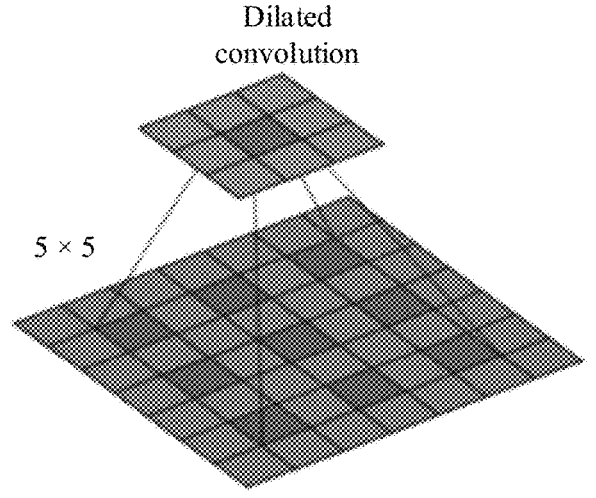
FIG. 14b is a diagram of a dilated convolution kernel according to an embodiment of this application.

FIG. 14*a* is a diagram of a structure of a cognitive network according to an embodiment of this application. FIG. 14*b* is a diagram of a dilated convolution kernel according to an embodiment of this application. In this embodiment of this application, one time of 3×3 convolution may be performed in a region proposal network (RPN), to perform a function of a sliding window. A convolution kernel is moved on at least one third feature map, and whether an object exists in each anchor bounding box and a difference between a predicted bounding box and a ground truth bounding box may be obtained by using a subsequent intermediate layer and a bounding box regression layer and through category determining. The region proposal network is trained, to obtain a good bounding box extraction result. In this embodiment, a 3×3 sliding window convolution kernel is replaced with a 3×3 dilated convolution kernel, dilated convolution processing is performed on at least one of the plurality of third feature maps, the target object in the image is detected based on the at least one third feature map on which dilated convolution processing is performed, and a detection result is output, to widen a receptive field and reduce an amount of missing detection of a large target and some obstructed targets without increasing a calculation amount. It is assumed that a space size of an original common convolution kernel is k×k, a new parameter d is introduced, and (d−1) spaces are stuffed into the original convolution kernel. A size of a new convolution kernel is:

$$n=k+(k-1)\times(d-1)$$

For example, for a 3×3 convolution kernel, d=2 is set, and a receptive field of the new convolution kernel is 5×5.

In an existing region proposal network (RPN), a 3×3 common convolution kernel is set as a sliding window, and slides on a feature map, to perform subsequent processing. In this embodiment, the 3×3 common convolution kernel is replaced with a 3×3 dilated convolution kernel, so that the network better resolve missing detection of the large target and the obstructed target. In this embodiment, after the feature extraction network and the region proposal network (RPN) are improved, a finally obtained annotation model can obtain a very good detection effect. In addition, after common convolution is replaced with 3×3 dilated convolution, a wider receptive field can be obtained without increasing a calculation amount. In addition, because of a wider receptive field, better context information can be obtained, to avoid determining a background as a foreground by mistake.

This application provides the data processing system. The data processing system includes the convolutional processing unit, the first feature map generation unit, the second feature map generation unit, and the detection unit. The convolutional processing unit is separately connected to the first feature map generation unit and the second feature map generation unit, the first feature map generation unit is connected to the second feature map generation unit, and the second feature map generation unit is connected to the detection unit. The convolutional processing unit is configured to: receive the entered image; and perform convolutional processing on the entered image, to generate the plurality of first feature maps. The first feature map generation unit is configured to generate the plurality of second feature maps based on the plurality of first feature maps. The plurality of first feature maps include more texture details in the entered image and/or position details in the entered image than the plurality of second feature maps. The second feature map generation unit is configured to generate the plurality of third feature maps based on the plurality of first feature maps and the plurality of second feature maps. The detection unit is configured to output, based on at least one of the plurality of third feature maps, the detection result of the object included in the image. In this embodiment of this application, the second feature map generation unit introduces the shallow texture detail information of the original feature map (the plurality of first feature maps generated by the convolutional processing unit) into the deep feature map (the plurality of second feature maps generated by the first feature map generation unit), to generate the plurality of third feature maps, and the third feature map including the shallow rich texture detail information is used as the entered data on which the detection unit is to perform target detection, to improve detection precision of subsequent object detection.

Optionally, the data processing system in this embodiment of this application may further include:

a middle feature extraction layer, configured to: convolute at least one of the plurality of third feature maps, to obtain at least one fourth feature map; and convolute at least one of the plurality of third feature maps, to obtain at least one fifth feature map, where a receptive field corresponding to the fourth feature map is wider than a receptive field corresponding to the fifth feature map, where the detection unit is configured to output, based on the at least one fourth feature map and the at least one fifth feature map, the detection result of the object included in the image.

Figure 14C:
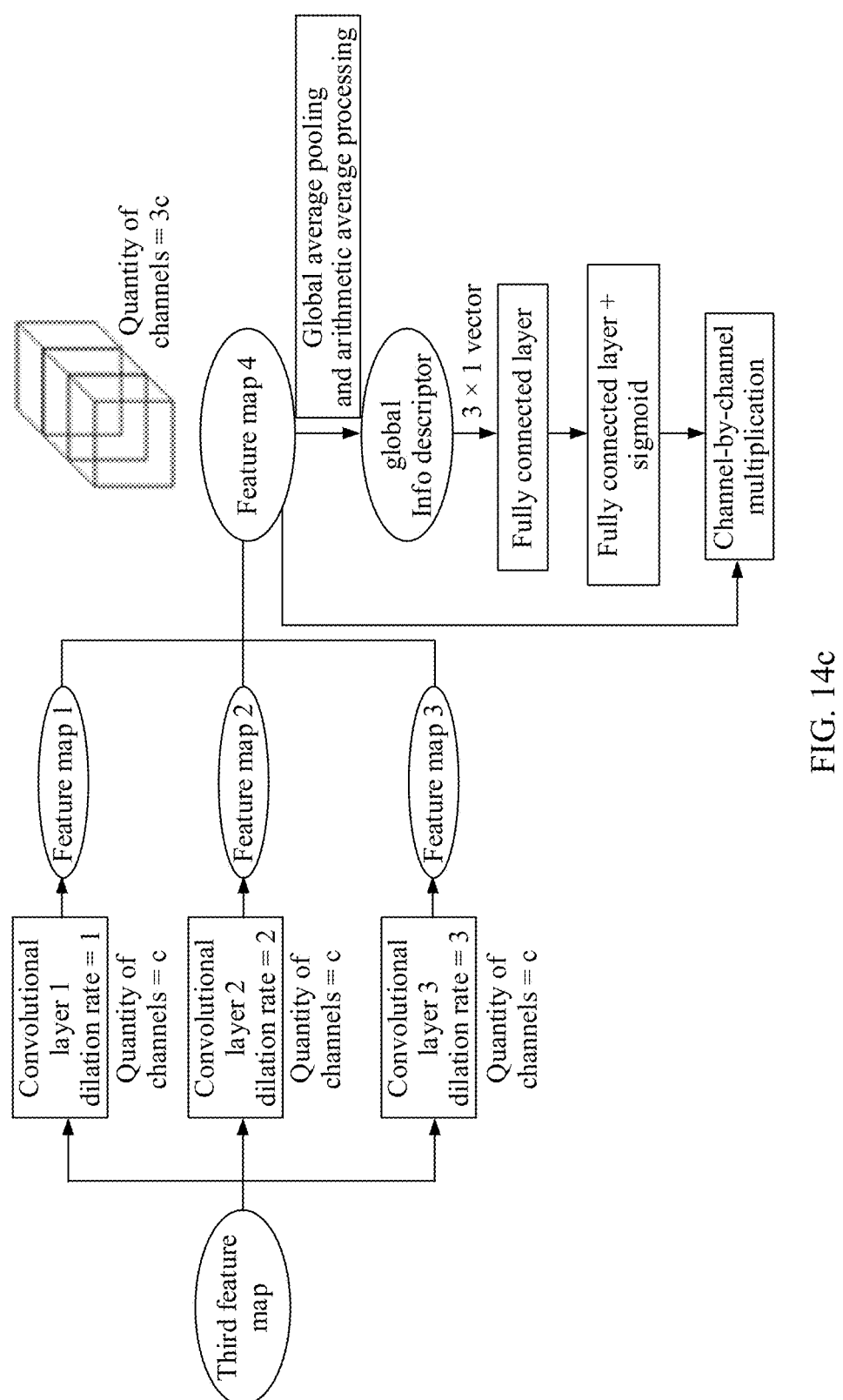
FIG. 14c is a flowchart of processing intermediate feature extraction.

FIG. 14*c* is a flowchart of processing intermediate feature extraction. As shown in FIG. 14*c*, convolutional layers with different dilation rates may be separately used to perform convolutional processing on the third feature map, to obtain a corresponding feature map (a quantity of channels of each feature map is c). A concatenation operation is performed, to obtain a feature map 4 (a quantity of channels is 3c). Then, a global Info descriptor is obtained through global average pooling and arithmetic average processing. A first fully connected layer provides a nonlinear feature, and each weight value is limited within a range of 0 to 1 by using a second fully connected layer and a sigmoid function. Then, the weight value and a corresponding feature map are multiplied channel by channel, to obtain a processed feature map.

In this embodiment, a first weight value is correspondingly greater than a second weight value if a to-be-detected object included in the fourth feature map is greater than a to-be-detected object included in the fifth feature map. Therefore, a processed fourth feature map obtains a higher gain than a processed fifth feature map. Because a receptive field corresponding to the fourth feature map is wider than a receptive field corresponding to the fifth feature map, a feature map with a wider receptive field includes more information about a large target, and correspondingly, detection precision of the large target in target detection performed by using the feature map with a wider receptive field is higher. In this embodiment, when the image includes a large target, the fourth feature map correspondingly obtains a higher gain than the fifth feature map. When the detection unit performs target detection on the image based on the processed fourth feature map and the processed fifth feature map, an overall receptive field is wider, and correspondingly, detection precision is higher.

In this embodiment, the middle feature extraction layer may learn of a weight value recognition rule through training: For a feature map including a large target, a first weight value of a first convolutional layer determined by the middle feature extraction layer is large, and a second weight value of a second convolutional layer determined by the middle feature extraction layer is small. For a feature map including a small target, a first weight value of a first convolutional layer determined by the middle feature extraction layer is small, and a second weight value of a second convolutional layer determined by the middle feature extraction layer is large.

FIG. 15 is a flowchart of an object detection method according to an embodiment of this application. As shown in FIG. 15, the object detection method includes the following steps.

1501: Receive an entered first image.

In this embodiment of this application, when object detection needs to be performed on the first image, the entered first image may be received.

1502: Perform object detection on the first image by using a first cognitive network, to obtain a first detection result, where the first detection result includes a first detection box.

In this embodiment of this application, after the entered first image is received, object detection may be performed on the first image by using the first cognitive network, to obtain the first detection result. The first detection result includes the first detection box, and the first detection box may indicate a pixel position of a detected object in the first image.

1503: Perform object detection on the first image by using a second cognitive network, to obtain a second detection result, where the second detection result includes a second detection box, and there is a first intersection of the second detection box and the first detection box.

In this embodiment of this application, object detection may be performed on the first image by using the second cognitive network, to obtain the second detection result. The second detection result includes the second detection box, and the first detection box may indicate the pixel position of the detected object in the first image.

In this embodiment of this application, there is a first intersection of the second detection box and the first detection box. In other words, in the first image, a pixel position in which the second detection box is located overlaps the pixel position in which the first detection box is located.

1504: If a ratio of an area of the first intersection to an area of the first detection box is less than a preset value, update the second detection result, so that an updated second detection result includes the first detection box.

In this embodiment of this application, if the ratio of the area of the first intersection to the area of the first detection box is less than the preset value, it may be considered that the first detection box is omitted in the second detection result, and the second detection result may be updated, so that the updated second detection result includes the first detection box.

In this embodiment of this application, the second detection result may further include a third detection box, there is a second intersection of the third detection box and the first detection box, and an area of the second intersection is less than the area of the first intersection.

In this embodiment of this application, the second detection result may include a plurality of detection boxes that have intersections with the first detection box, and the intersection of the second detection box and the first detection box has a largest size. In other words, if the ratio of the area of the intersection of the first detection box and the second detection box that has a largest intersection the first detection box to the area of the first detection box is less than the preset value, a ratio of an area of an intersection of the first detection box and a remaining detection box that has an intersection the first detection box to the area of the first detection box is also less than the preset value.

In this embodiment of this application, for a same image, object detection precision of the first cognitive network is higher than object detection precision of the second cognitive network, and the object detection precision is related to at least one of the following features: a shape or a position of a detection box, or a category of an object corresponding to a detection box.

In other words, in this embodiment of this application, the object detection precision of the first cognitive network is higher than the object detection precision of the second cognitive network. Therefore, a detection result of the first cognitive network may be used to update a detection result of the second cognitive network.

Optionally, the entered first image may be received, and convolutional processing may be performed on the first image, to generate a plurality of first feature maps. A plurality of second feature maps are generated based on the plurality of first feature maps. The plurality of first feature maps include more texture detail information and/or position detail information than the plurality of second feature maps. A plurality of third feature maps are generated based on the plurality of first feature maps and the plurality of second feature maps. Target detection is performed on the first image based on at least one of the plurality of third feature maps, and a first detection result is output.

Optionally, the plurality of second feature maps include more semantic information than the plurality of first feature maps.

Optionally, the plurality of first feature maps include a first target feature map, the plurality of second feature maps include a second target feature map, the plurality of third feature maps include a third target feature map and a fourth target feature map, and resolution of the third target feature map is lower than resolution of the fourth target feature map. Downsampling is performed on the third target feature map, to obtain a fifth target feature map, where the fifth target feature map and the second target feature map have a same quantity of channels and same resolution; downsampling and convolutional processing are performed on the first target feature map, to obtain a sixth target feature map, where the sixth target feature map and the second target feature map have a same quantity of channels and same resolution; and the fifth target feature map, the second target feature map, and the sixth target feature map are overlapped based on respective channels, to generate the fourth target feature map. Alternatively, downsampling is performed on the third target feature map, to obtain a fifth target feature map, where the fifth target feature map and the second target feature map have a same quantity of channels and same resolution; downsampling is performed on the first target feature map, to obtain a sixth target feature map, where the sixth target feature map and the second target feature map have same resolution; and the fifth target feature map, the second target feature map, and the sixth target feature map are overlapped based on respective channels and convolutional processing is performed, to generate the fourth target feature map, where the fourth target feature map and the second target feature map have a same quantity of channels.

Optionally, convolution may be performed on at least one of the plurality of third feature maps by using a first convolutional layer, to obtain at least one fourth feature map; convolution is performed on at least one of the plurality of third feature maps by using a second convolutional layer, to obtain at least one fifth feature map, where a receptive field corresponding to the fourth feature map is wider than a receptive field corresponding to the fifth feature map; and target detection is performed on the first image based on the fourth feature map and the fifth feature map, and the first detection result is output.

Optionally, a first weight value corresponding to the fourth feature map and a second weight value corresponding to the fifth feature map are determined; the fourth feature map is processed based on the first weight value, to obtain a processed fourth feature map; the fifth feature map is processed based on the second weight value, to obtain a processed fifth feature map, where the first weight value is greater than the second weight value when a to-be-detected object included in the fourth feature map is greater than a to-be-detected object included in the fifth feature map; and target detection is performed on the first image based on the processed fourth feature map and the processed fifth feature map, and the first detection result is output.

Optionally, the first detection result includes the first detection box. The second detection result of the first image may be obtained. The second detection result is obtained by performing object detection on the first image by using the second cognitive network, the object detection precision of the first cognitive network is higher than the object detection precision of the second cognitive network, the second detection result includes the second detection box, and there is an intersection of a region in which the second detection box is located and a region in which the first detection box is located.

If a ratio of an area of the intersection to an area of the first detection box is less than the preset value, the second detection result is updated, so that an updated second detection result includes the first detection box.

Optionally, the second detection result includes a plurality of detection boxes, there is an intersection of a region in which each of the plurality of detection boxes is located and the region in which the first detection box is located, the plurality of detection boxes include the second detection box, and the area of the intersection of the region in which the second detection box is located and the region in which the first detection box is located is the smallest in an area of the intersection of the region in which each of the plurality of detection boxes is located and the region in which the first detection box is located.

Optionally, the first image is an image frame in a video, a second image is an image frame in the video, and a frame spacing between the first image and the second image in the video is less than a preset value. A third detection result of the second image is obtained, where the third detection result includes a fourth detection box and an object category corresponding to the fourth detection box; and when a shape difference and a position difference between the fourth detection box and the first detection box fall within a preset range, the first detection box corresponds to the object category corresponding to the fourth detection box.

Optionally, a detection confidence level of the fourth detection box is greater than a preset threshold.

In this embodiment of this application, the first image is an image frame in the video, the second image is an image frame in the video, and the frame spacing between the first image and the second image in the video is less than the preset value. The third detection result of the second image may be further obtained. The third detection result is obtained by performing object detection on the second image by using the first cognitive network or the second cognitive network, and the third detection result includes the fourth detection box and the object category corresponding to the fourth detection box. If the shape difference and the position difference between the fourth detection box and the first detection box fall within the preset range, it is determined that the first detection box corresponds to the object category corresponding to the fourth detection box. Optionally, the detection confidence level of the fourth detection box is greater than the preset threshold.

In this embodiment of this application, a time sequence detection algorithm may be considered if the first image is obtained through video frame extraction. For a missing detection target detected by using a missing detection algorithm, several frames of images are selected from previous and subsequent frames of a current image, and whether a target whose area, length-width ratio, and center coordinates are similar to that of the missing detection target exists in a region near a center of the missing detection target in the previous and subsequent frames is determined through comparison. A specific quantity of similar target boxes are selected, then whether a target box similar to another target box in a suspected missing detection image exists in the similar target boxes is determined through comparison, and the target box similar to the another target box is removed from the detected similar target boxes. A most similar target box in each of the previous and subsequent frames is obtained based on content similarity and feature similarity algorithms, and a most similar target box of a suspected missing detection target box is obtained. If a confidence level of the most similar target box is greater than a specific threshold, a category of the missing detection target may be determined; or if a confidence level is less than a specific threshold, a category of a suspected missing detection target and a category of the most similar target box are compared. If the categories are the same, missing detection is determined. If the categories are different, manual verification may be performed.

This embodiment of this application provides the object detection method. The method comprises: receiving the entered first image; performing object detection on the first image by using the first cognitive network, to obtain the first detection result, where the first detection result includes the first detection box; performing object detection on the first image by using the second cognitive network, to obtain the second detection result, where the second detection result includes the second detection box, and there is the first intersection of the second detection box and the first detection box; and if the ratio of the area of the first intersection to the area of the first detection box is less than the preset value, updating the second detection result, where the updated second detection result includes the first detection box. In the foregoing manner, a time sequence feature is introduced into a model, to help determine whether a suspected missing detection result is a real missing detection result, and determine a category of the missing detection result, so as to improve verification efficiency.

FIG. 16 is a flowchart of a cognitive network training method according to an embodiment of this application. The cognitive network training method may be used to train the cognitive network in the foregoing embodiments. It should be noted that a first cognitive network in this embodiment may be an initial network of the cognitive network in the foregoing embodiments, and a second cognitive network obtained by training the first cognitive network may be the cognitive network in the foregoing embodiments.

As shown in FIG. 16, the cognitive network training method includes the following steps.

1601: Obtain a pre-annotated detection box of a target object in an image.

1602: Obtain a target detection box corresponding to the image and a first cognitive network, where the target detection box is used to identify the target object.

In this embodiment of this application, a detection result of the image may be obtained. The detection result is obtained by performing object detection on the image by using the first cognitive network, and the detection result includes a target detection box corresponding to a first object.

1603: Perform iterative training on the first cognitive network based on a loss function, to output a second cognitive network, where the loss function is related to intersection-over-union IoU between the pre-annotated detection box and the target detection box.

In this embodiment of this application, a preset loss function is further related to a shape difference between the target detection box and the pre-annotated detection box, and the shape difference is negatively related to an area of the pre-annotated detection box.

In this embodiment of this application, a rectangular detection box includes a first edge and a second edge that are connected, the rectangular detection box includes a third edge corresponding to the first edge and a fourth edge corresponding to the second edge, and an area difference is further positively related to a length difference between the first edge and the third edge and is positively related to a length difference between the second edge and the fourth edge.

In this embodiment of this application, the preset loss function is further related to a position difference between the target detection box and the pre-annotated detection box in the image, and the position difference is negatively related to the area of the pre-annotated detection box; or the position difference is negatively related to an area of a minimum bounding rectangle of a convex hull of the pre-annotated detection box and the target detection box.

In this embodiment of this application, the target detection box includes a first corner point and a first center point, the pre-annotated detection box includes a second corner point and a second center point, the first corner point and the second corner point are two endpoints of a diagonal of the rectangular, and the position difference is further positively related to a position difference between the first center point and the second center point in the image and is negatively related to a length between the first corner point and the second corner point.

For example, the loss function may be as follows:

$$loss_{loc} =$$

$$\alpha(1 - IoU) + \beta\left(1 - \frac{w_p}{w_g}\right)^2\left(1 - \frac{h_p}{h_9}\right)^2 + \gamma\frac{\text{distance}\,(o_p, o_g)}{\text{distance}\,\left(x_g^{top\_left}, x_p^{bottom\_right}\right)};$$

$$\beta \propto \frac{1}{w_g h_g}; \text{ and } \gamma \propto \frac{1}{w_g h_g}.$$

In this embodiment of this application, a newly designed bounding box regression loss function includes an IoU loss term that has scale invariance and is applied to a target detection measurement method, a loss term in which a length-width ratio of a predicted bounding box and a length-width ratio of a ground truth bounding box are considered, and a loss term of a ratio of a distance between center coordinates of the predicted bounding box and center coordinates of the ground truth bounding box to a distance between lower right corner coordinates of the predicted bounding box and upper left corner coordinates of the ground truth bounding box. A scale-invariant bounding box prediction quality evaluation index is naturally introduced into the IoU loss term. The loss term of the length-width ratios of the two bounding boxes measures a shape fitting degree between the two bounding boxes. The third term for measuring a distance ratio is used to resolve a problem that when IoU=0, a relative position relationship between the predicted bounding box and the ground truth bounding box cannot be learned of, it is difficult to perform back propagation, and the loss function is minimized. After a distance ratio is introduced, to make the distance ratio lower, a distance between $o_p$ and $o_g$ is naturally narrowed, and a distance between $x_g^{top\_left}$ and $x_p^{bottom\_right}$ is extended. Different weights are allocated to the three terms of the loss function, to balance impact of each term. The length-width ratio and the distance ratio are used to introduce a weight coefficient directly proportional to $$\frac{1}{w_g h_g},$$

to reduce impact of a scale of a bounding box. A larger-scale bounding box has a smaller weight, and a smaller-scale bounding box has a larger weight. The bounding box regression loss function proposed in this patent is applicable to various algorithms such as a two-stage algorithm and a one-stage algorithm, is very universal, and promotes a target scale, bounding box fitting, and fitting between a center point and a corner point of a bounding box.

In this embodiment of this application, IoU for measuring the fitting degree between the detection bounding box and the ground truth bounding box during target detection is used as the bounding box regression loss function. Because of scale invariance of the IoU, a problem that another prior bounding box regression function is sensitive to scale variance is resolved. The loss term of length-width ratios of the predicted bounding box and the ground truth bounding box is introduced, so that the predicted bounding box better fits the ground truth bounding box in a training process. In addition, impact of the scale variance is reduced by introducing the weight coefficient directly proportional to $$\frac{1}{w_g h_g}.$$

The ratio of the distance between the center coordinates of the predicted bounding box and the center coordinates of the ground truth bounding box to the distance between the lower right corner coordinates of the predicted bounding box and the upper left corner coordinates of the ground truth bounding box is introduced, to resolve a problem that when IoU=0, relative positions of the two bounding boxes and a distance between the two bounding boxes cannot be learned of, and back propagation cannot be performed. After the distance ratio is introduced, to make the distance ratio lower, the distance between $o_p$ and $o_g$ is naturally be narrowed, and the distance between $x_g^{top\_left}$ and $x_p^{bottom\_right}$ is extended, so that a bounding box changes in a correct direction.

The preset loss function includes a target loss term related to the position difference, and the target loss term changes with the position difference; and a change rate of the target loss term is greater than a first preset change rate when the position difference is greater than a preset value; and/or the change rate of the target loss term is less than a second preset change rate when the position difference is less than the preset value.

Optionally, the bounding box regression loss function may alternatively be the following loss function:

$$loss_{loc} = (1 - IoU) + \left(1 - \frac{w_p}{w_g}\right)^2 \left(1 - \frac{h_v}{h_g}\right)^2 - $$

$$\ln(1 - distance\_IoU) distance\_IoU = \frac{area1}{area2}$$

The bounding box regression loss function includes an IoU loss term that has scale invariance and that is widely applied to a detection measurement method, a loss term in which a length-width ratio of a predicted bounding box and a length-width ratio of a ground truth bounding box are considered, and a pull loss term for which a distance between the predicted bounding box and the ground truth bounding box is narrowed. A scale-invariant bounding box prediction quality evaluation index is naturally introduced into the IoU loss term. The loss term of the length-width ratios of the two bounding boxes measures a shape fitting degree between the two bounding boxes. The third term for measuring a distance ratio is used to resolve a problem that when IoU=0, a relative position relationship between the predicted bounding box and the ground truth bounding box cannot be learned of, it is difficult to perform back propagation, and the loss function is minimized. Therefore, the third term, namely, the pull loss term is introduced to narrow the distance between the predicted bounding box and the ground truth bounding box. A ratio of an area (area 1) of a rectangle whose diagonal includes a center of the predicted bounding box and a center of the ground truth bounding box to an area (area 2) of a minimum bounding rectangle of a convex hull of the predicted bounding box and the ground truth bounding box is used as a distance_IoU term, and $f(x)=-\ln(1-x)$ is used as a calculation term of the loss function. It can be learned that a variation interval of distance_IoU is [0, 1). It can be learned, from a curve of $f(x)=-\ln(1-x)$, that there is a fast convergence trend in [0, 1). Therefore, x is set to x=distance_IoU, to obtain the third loss item, so as to quickly narrow the distance between the predicted bounding box and the ground truth bounding box.

FIG. 17 is a flowchart of an object detection method according to an embodiment of this application. As shown in FIG. 17, the object detection method includes the following steps.

1701: Receive an entered first image.

1702: Perform convolutional processing on the first image, to generate a plurality of first feature maps.

It should be noted that the "performing convolutional processing on the entered image" herein should not be understood as only performing convolutional processing on the entered image. In some embodiments, convolutional processing, a pooling operation, and the like may be performed on the entered image.

It should be noted that the "performing convolutional processing on the first image, to generate a plurality of first feature maps" herein should not be only understood as performing convolutional processing on the first image for a plurality of times, to generate one first feature map in each time of convolutional processing. In other words, it should not be understood that each first feature map is obtained by performing convolutional processing on the first image. Instead, from an overall perspective, the first image is a source of the plurality of first feature maps. In an embodiment, convolutional processing may be performed on the first image, to obtain one first feature map, and then convolutional processing may be performed on the generated first feature map, to obtain another first feature map. By analogy, the plurality of first feature maps may be obtained.

It should be noted that, a series of convolutional processing may be performed on the entered image. During each time of convolutional processing, convolutional processing may be performed on a first feature map obtained after a previous time of convolutional processing, to further obtain one first feature map. In the foregoing manner, the plurality of first feature maps may be obtained.

It should be noted that, the plurality of first feature maps may be feature maps with resolution on a plurality of scales. In other words, the plurality of first feature maps are not feature maps with same resolution. In an optional embodiment, the plurality of first feature maps may form one feature pyramid.

The entered image may be received, and convolutional processing is performed on the entered image, to generate the plurality of first feature maps with resolution on a plurality of scales. A convolutional processing unit may perform a series of convolutional processing on the entered image, to obtain feature maps on different scales (with different resolution). The convolutional processing unit may be in a plurality of forms, for example, a visual geometry group (VGG), a residual neural network (resnet), and a core structure (Inception-net) of GoogLeNet.

1703: Generate a plurality of second feature maps based on the plurality of first feature maps, where the plurality of first feature maps include more texture details in the entered image and/or position details in the entered image than the plurality of second feature maps.

It should be noted that the "generating a plurality of second feature maps based on the plurality of first feature maps" herein should not be understood as that a source of each of the plurality of second feature maps is the plurality of first feature maps. In an embodiment, some of the plurality of second feature maps are directly generated based on one or more of the plurality of first feature maps. In an embodiment, some of the plurality of second feature maps are directly generated based on one or more of the plurality of first feature maps and a second feature map other than the some second feature maps. In an embodiment, some of the plurality of second feature maps are directly generated based on a second feature map other than the some second feature maps. In this case, because "the second feature map other than the some second feature maps is generated based on one or more of the plurality of first feature maps", it may be understood that the plurality of second feature maps are generated based on the plurality of first feature maps.

It should be noted that, the plurality of second feature maps may be feature maps with resolution on a plurality of scales. In other words, the plurality of second feature maps are not feature maps with same resolution. In an optional embodiment, the plurality of second feature maps may form one feature pyramid.

A convolution operation may be performed on a topmost-layer feature map C4 in the plurality of first feature maps generated by the convolutional processing unit. For example, a quantity of channels of the topmost-layer feature map C4 may be reduced to 256 through dilated convolution and 1×1 convolution, and an obtained feature map is used as a topmost-layer feature map P4 of the feature pyramid. After an output result of a feature map C3 at a next layer of a topmost layer is laterally connected, and a quantity of channels is reduced to 256 through 1×1 convolution, an obtained feature map and the feature map P4 are overlapped channel by channel and pixel by pixel, to obtain a feature map P3. By analogy, a first feature pyramid is constructed from top to bottom. The first feature pyramid may include a plurality of second feature maps.

The texture detail may be used to indicate detail information of a small target and an edge feature, and the first feature map includes more texture detail information than the second feature map, so that detection precision of a detection result of detecting a small target in the first feature map is higher. A position detail may be information used to indicate a position of an object in the image and relative positions of objects.

The plurality of second feature maps may include more deep features than the first feature map. The deep feature includes rich semantic information, which exerts a very good effect on a classification task. In addition, the deep feature has a wide receptive field, to exert a good detection effect on a large target. In an embodiment, the plurality of second feature maps are generated by introducing a top-down path, so that the rich semantic information included in the deep feature can be naturally propagated downwards. In this way, a second feature map on each scale includes rich semantic information.

1704: Generate a plurality of third feature maps based on the plurality of first feature maps and the plurality of second feature maps.

1705: Output, based on at least one of the plurality of third feature maps, a first detection result of an object included in the image.

In an existing embodiment, the second feature map generation unit (for example, a feature pyramid network) propagates rich semantic information included in a deep feature downwards by introducing a top-down path, so that a second feature map on each scale includes rich semantic information. In addition, the deep feature has a wide receptive field, to exert a good detection effect on a large target. However, in an existing embodiment, finer position detail information and texture detail information included in a shallower feature map are ignored. This greatly affects detection precision of large and small targets. In this embodiment of this application, the second feature map generation unit introduces shallow texture detail information of an original feature map (the plurality of first feature maps generated by the convolutional processing unit) into a deep feature map (the plurality of second feature maps generated by the first feature map generation unit), to generate a plurality of third feature maps, and the third feature map including the shallow rich texture detail information is used as entered data on which the detection unit is to perform target detection, to improve detection precision of subsequent object detection.

It should be noted that, in this embodiment, there is no higher detection precision in object detection of all images including a small target, but for a large quantity of samples, there may be higher comprehensive detection precision in this embodiment.

Optionally, the plurality of second feature maps include more semantic information than the plurality of first feature maps.

Optionally, the plurality of first feature maps, the plurality of second feature maps, and the plurality of third feature maps are feature maps with resolution on a plurality of scales.

Optionally, the plurality of first feature maps include a first target feature map, the plurality of second feature maps include a second target feature map, the plurality of third feature maps include a third target feature map and a fourth target feature map, resolution of the third target feature map is lower than resolution of the fourth target feature map, and the generating a plurality of third feature maps based on the plurality of first feature maps and the plurality of second feature maps includes: performing downsampling on the third target feature map, to obtain a fifth target feature map, where the fifth target feature map and the second target feature map have a same quantity of channels and same resolution; performing downsampling and convolutional processing on the first target feature map, to obtain a sixth target feature map, where the sixth target feature map and the second target feature map have a same quantity of channels and same resolution; and performing channel overlapping on the fifth target feature map, the second target feature map, and the sixth target feature map, to generate the fourth target feature map; or performing downsampling on the third target feature map, to obtain a fifth target feature map, where the fifth target feature map and the second target feature map have a same quantity of channels and same resolution; performing downsampling on the first target feature map, to obtain a sixth target feature map, where the sixth target feature map and the second target feature map have same resolution; and performing channel overlapping and convolutional processing on the fifth target feature map, the second target feature map, and the sixth target feature map, to generate the fourth target feature map, where the fourth target feature map and the second target feature map have a same quantity of channels.

Optionally, the method further includes: convoluting at least one of the plurality of third feature maps by using a first convolutional layer, to obtain at least one fourth feature map; and convoluting at least one of the plurality of third feature maps, to obtain at least one fifth feature map, where a receptive field corresponding to the fourth feature map is wider than a receptive field corresponding to the fifth feature map.

Correspondingly, the outputting, based on at least one of the plurality of third feature maps, a first detection result of an object included in the image includes: outputting, based on the at least one fourth feature map and the at least one fifth feature map, the first detection result of the object included in the image.

Optionally, the method further includes: processing the fourth feature map based on a first weight value, to obtain a processed fourth feature map; and processing the fifth feature map based on a second weight value, to obtain a processed fifth feature map, where the first weight value is greater than the second weight value when a to-be-detected object included in the fourth feature map is greater than a to-be-detected object included in the fifth feature map.

Correspondingly, the outputting, based on at least one of the plurality of third feature maps, a first detection result of an object included in the image includes: outputting, based on the processed fourth feature map and the processed fifth feature map, the first detection result of the object included in the image.

Optionally, the first detection result includes a first detection box, and the method further includes: obtaining a second detection result of the first image, where the second detection result is obtained by performing object detection on the first image by using a second cognitive network, object detection precision of the first cognitive network is higher than object detection precision of the second cognitive network, the second detection result includes a second detection box, and there is an intersection of a region in which the second detection box is located and a region in which the first detection box is located; and if a ratio of an area of the intersection to an area of the first detection box is less than a preset value, updating the second detection result, so that an updated second detection result includes the first detection box.

Optionally, the second detection result includes a plurality of detection boxes, there is an intersection of a region in which each of the plurality of detection boxes is located and the region in which the first detection box is located, the plurality of detection boxes include the second detection box, and the area of the intersection of the region in which the second detection box is located and the region in which the first detection box is located is the smallest in an area of the intersection of the region in which each of the plurality of detection boxes is located and the region in which the first detection box is located.

Optionally, the first image is an image frame in a video, a second image is an image frame in the video, a frame spacing between the first image and the second image in the video is less than a preset value, and the method further includes: obtaining a third detection result of the second image, where the third detection result includes a fourth detection box and an object category corresponding to the fourth detection box, where when a shape difference and a position difference between the fourth detection box and the first detection box fall within a preset range, the first detection box corresponds to the object category corresponding to the fourth detection box.

Optionally, a detection confidence level of the fourth detection box is greater than a preset threshold.

FIG. 18 is a diagram of a cognitive network training apparatus according to an embodiment of this application. As shown in FIG. 18, a cognitive network training apparatus 1800 includes: an obtaining module 1801, configured to: obtain a pre-annotated detection box of a target object in an image, and obtain a target detection box corresponding to the image and a first cognitive network, where the target detection box is used to identify the target object; and an iterative training module 1802, configured to perform iterative training on the first cognitive network based on a loss function, to output a second cognitive network, where the loss function is related to intersection-over-union IoU between the pre-annotated detection box and the target detection box.

Optionally, a preset loss function is further related to a shape difference between the target detection box and the pre-annotated detection box, and the shape difference is negatively related to an area of the pre-annotated detection box.

Optionally, the preset loss function is further related to a position difference between the target detection box and the pre-annotated detection box in the image, and the position difference is negatively related to the area of the pre-annotated detection box; or the position difference is negatively related to an area of a minimum bounding rectangle of a convex hull of the pre-annotated detection box and the target detection box.

Optionally, the target detection box includes a first corner point and a first center point, the pre-annotated detection box includes a second corner point and a second center point, the first corner point and the second corner point are two endpoints of a diagonal of the rectangular, and the position difference is further positively related to a position difference between the first center point and the second center point in the image and is negatively related to a length between the first corner point and the second corner point.

Optionally, the preset loss function includes a target loss term related to the position difference, and the target loss term changes with the position difference; and a change rate of the target loss term is greater than a first preset change rate when the position difference is greater than a preset value; and/or the change rate of the target loss term is less than a second preset change rate when the position difference is less than the preset value.

Figure 19:
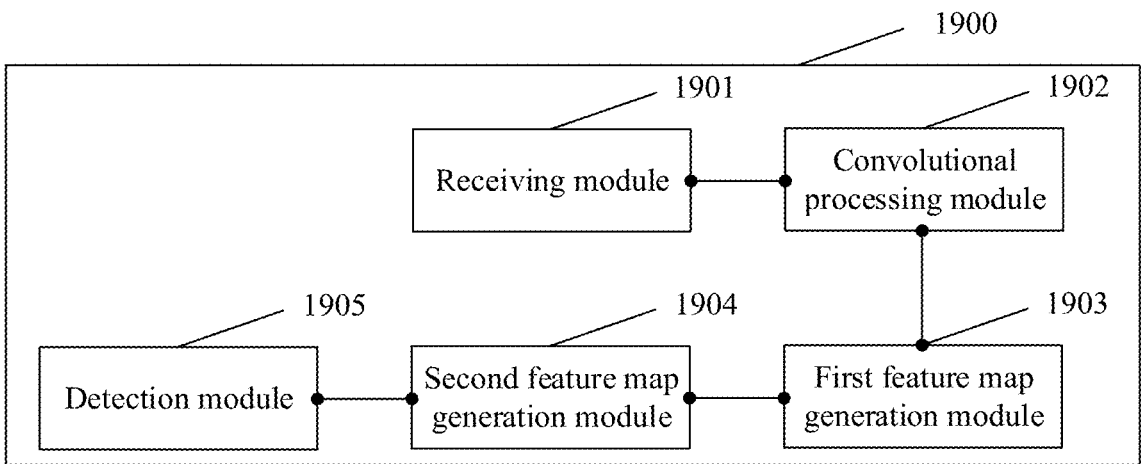
FIG. 19 is a diagram of an object detection apparatus according to an embodiment of this application.

FIG. 19 is a diagram of an object detection apparatus according to an embodiment of this application. As shown in FIG. 19, an object detection apparatus 1900 includes: a receiving module 1901, configured to: receive an entered first image, and perform convolutional processing on the first image, to generate a plurality of first feature maps; a convolutional processing module 1902, configured to perform convolutional processing on the first image, to generate the plurality of first feature maps; a first feature map generation module 1903, configured to generate a plurality of second feature maps based on the plurality of first feature maps, where the plurality of first feature maps include more texture details in the entered image and/or position details in the entered image than the plurality of second feature maps; a second feature map generation module 1904, configured to generate a plurality of third feature maps based on the plurality of first feature maps and the plurality of second feature maps; and a detection module 1905, configured to output, based on at least one of the plurality of third feature maps, a detection result of an object included in the image.

Optionally, the plurality of second feature maps include more semantic information than the plurality of first feature maps.

Optionally, the plurality of first feature maps, the plurality of second feature maps, and the plurality of third feature maps are feature maps with resolution on a plurality of scales.

Optionally, the plurality of first feature maps include a first target feature map, the plurality of second feature maps include a second target feature map, the plurality of third feature maps include a third target feature map and a fourth target feature map, resolution of the third target feature map is lower than resolution of the fourth target feature map, and the second feature map generation module is configured to: perform downsampling on the third target feature map, to obtain a fifth target feature map, where the fifth target feature map and the second target feature map have a same quantity of channels and same resolution; perform downsampling and convolutional processing on the first target feature map, to obtain a sixth target feature map, where the sixth target feature map and the second target feature map have a same quantity of channels and same resolution; and perform channel overlapping on the fifth target feature map, the second target feature map, and the sixth target feature map, to generate the fourth target feature map; or perform downsampling on the third target feature map, to obtain a fifth target feature map, where the fifth target feature map and the second target feature map have a same quantity of channels and same resolution; perform downsampling on the first target feature map, to obtain a sixth target feature map, where the sixth target feature map and the second target feature map have same resolution; and perform channel overlapping and convolutional processing on the fifth target feature map, the second target feature map, and the sixth target feature map, to generate the fourth target feature map, where the fourth target feature map and the second target feature map have a same quantity of channels.

Optionally, the apparatus further includes: a middle feature extraction module, configured to: convolute at least one of the plurality of third feature maps by using a first convolutional layer, to obtain at least one fourth feature map; and convolute at least one of the plurality of third feature maps, to obtain at least one fifth feature map, where a receptive field corresponding to the fourth feature map is wider than a receptive field corresponding to the fifth feature map.

Correspondingly, the detection module is configured to: output, based on the at least one fourth feature map and the at least one fifth feature map, the first detection result of the object included in the image.

Optionally, the middle feature extraction module is configured to: process the fourth feature map based on a first weight value, to obtain a processed fourth feature map; and process the fifth feature map based on a second weight value, to obtain a processed fifth feature map, where the first weight value is greater than the second weight value when a to-be-detected object included in the fourth feature map is greater than a to-be-detected object included in the fifth feature map.

Correspondingly, the detection module is configured to: output, based on the processed fourth feature map and the processed fifth feature map, the first detection result of the object included in the image.

Optionally, the first detection result includes a first detection box, and an obtaining module is further configured to: obtain a second detection result of the first image, where the second detection result is obtained by performing object detection on the first image by using a second cognitive network, object detection precision of the first cognitive network is higher than object detection precision of the second cognitive network, the second detection result includes a second detection box, and there is an intersection of a region in which the second detection box is located and a region in which the first detection box is located.

An updating module is configured to: if a ratio of an area of the intersection to an area of the first detection box is less than a preset value, update the second detection result, so that an updated second detection result includes the first detection box.

Optionally, the first image is an image frame in a video, a second image is an image frame in the video, a frame spacing between the first image and the second image in the video is less than a preset value, and the obtaining module is further configured to: obtain a third detection result of the second image, where the third detection result includes a fourth detection box and an object category corresponding to the fourth detection box.

When a shape difference and a position difference between the fourth detection box and the first detection box fall within a preset range, the first detection box corresponds to the object category corresponding to the fourth detection box.

Optionally, a detection confidence level of the fourth detection box is greater than a preset threshold.

Figure 20:
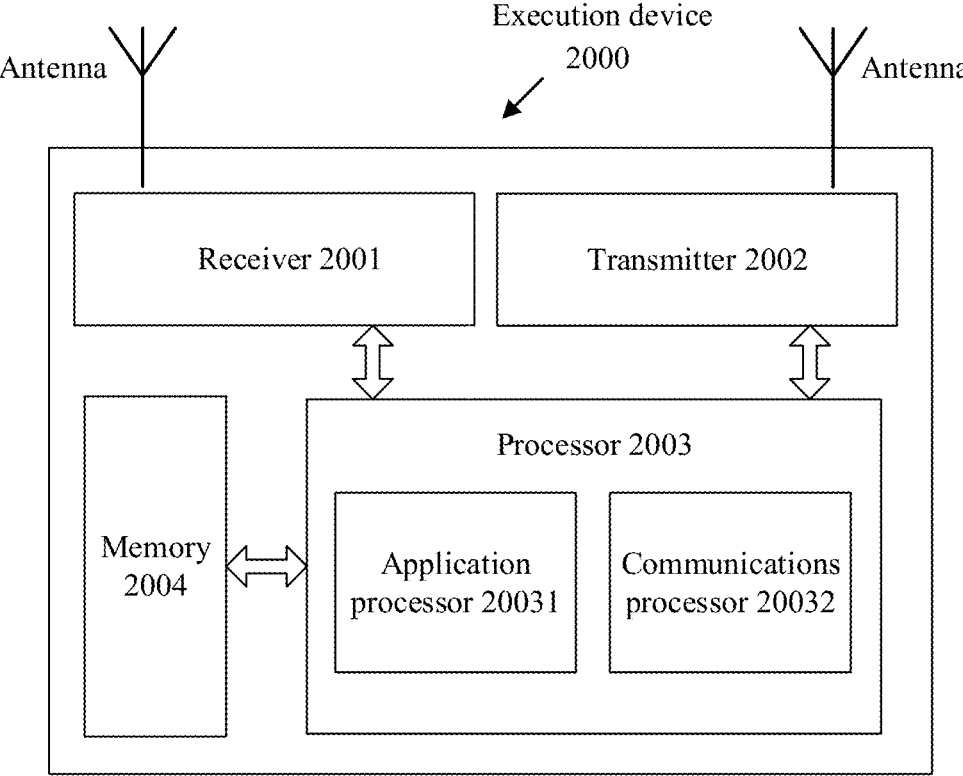
FIG. 20 is a diagram of a structure of an execution device according to an embodiment of this application.

The following describes an execution device provided in an embodiment of this application. FIG. 20 is a diagram of a structure of an execution device according to an embodiment of this application. An execution device 2000 may be represented as a virtual reality VR device, a mobile phone, a tablet, a notebook computer, an intelligent wearable device, a monitoring data processing device, or the like. This is not limited herein. An object detection apparatus described in the embodiment corresponding to FIG. 19 may be deployed on the execution device 2000, to implement an object detection function in the embodiment corresponding to FIG. 19. The execution device 2000 includes a receiver 2001, a transmitter 2002, a processor 2003, and a memory 2004 (there may be one or more processors 2003 in the execution device 2000, and that there is one processor is used as an example in FIG. 20). The processor 2003 may include an application processor 20031 and a communications processor 20032. In some embodiments of this application, the receiver 2001, the transmitter 2002, the processor 2003, and the memory 2004 may be connected by using a bus or in another manner.

The memory 2004 may include a read-only memory and a random access memory, and provide instructions and data for the processor 2003. A part of the memory 2004 may further include a non-volatile random access memory (NVRAM). The memory 2004 stores a processor and operation instructions, an executable module or a data structure, a subset thereof, or an extended set thereof. The operation instructions may include various operation instructions to implement various operations.

The processor 2003 controls an operation of the execution device. During application, the components of the execution device are coupled together through a bus system. In addition to a data bus, the bus system may further include a power bus, a control bus, a status signal bus, and the like. However, for clear description, various buses in the figure are referred to as the bus system.

The methods disclosed in the foregoing embodiments of this application may be applied to the processor 2003, or may be implemented by the processor 2003. The processor 2003 may be an integrated circuit chip and has a signal processing capability. In an embodiment process, steps in the foregoing methods may be implemented by using a hardware integrated logic circuit in the processor 2003, or by using instructions in a form of software. The processor 2003 may be a general-purpose processor, a digital signal processor (DSP), a microprocessor, or a microcontroller; or may further include an application-specific integrated circuit (ASIC), a field-programmable gate array (FPGA) or another programmable logic device, a discrete gate or transistor logic device, or a discrete hardware component. The processor 2003 may implement or perform the methods, steps, and logic block diagrams disclosed in embodiments of this application. The general-purpose processor may be a microprocessor, or the processor may be any conventional processor, or the like. Steps of the methods disclosed with reference to embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 2004, and the processor 2003 reads information in the memory 2004, and completes steps of the foregoing methods in combination with hardware of the processor 2003.

The receiver 2001 may be configured to: receive input digital or character information, and generate a signal input related to a related setting and function control of the execution device. The transmitter 2002 may be configured to output digital or character information through a first interface. The transmitter 2002 may be further configured to send instructions to a disk group through the first interface, to modify data in the disk group. The transmitter 2002 may further include a display device such as a display.

In this embodiment of this application, in a case, the processor 2003 is configured to perform the object detection method performed by the execution device in embodiments corresponding to FIG. 9 to FIG. 11. The application processor 20031 is configured to perform the object detection method in the foregoing embodiments.

Figure 21:
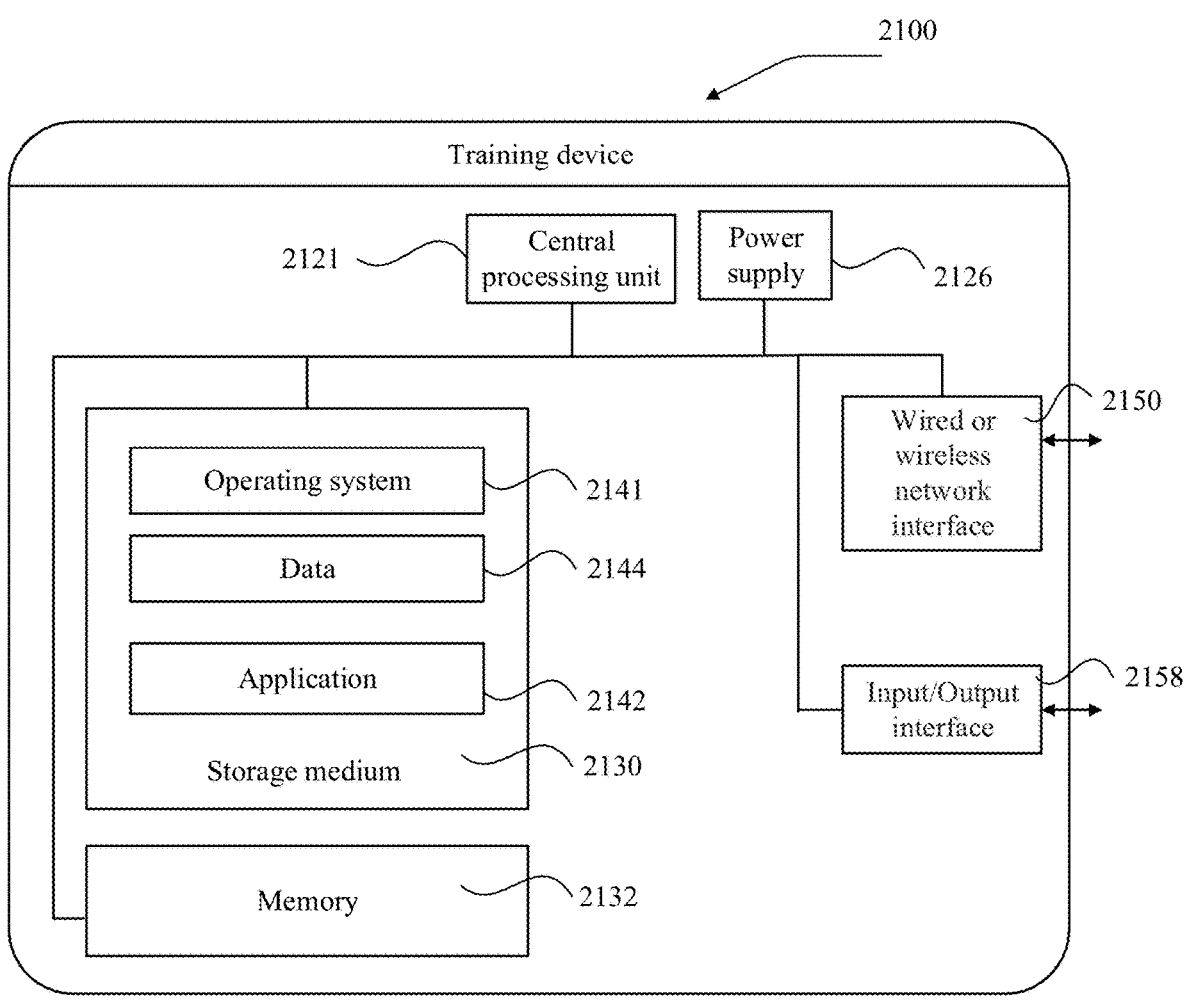
FIG. 21 is a diagram of a structure of a training device according to an embodiment of this application.

An embodiment of this application further provides a training device. FIG. 21 is a diagram of a structure of a training device according to an embodiment of this application. The cognitive network training apparatus described in the embodiment corresponding to FIG. 18 may be deployed on a training device 2100, to implement a function of the cognitive network training apparatus in the embodiment corresponding to FIG. 18. The training device 2100 is implemented by using one or more servers. The training device 2100 may have a large difference due to a different configuration or different performance, and may include one or more central processing units (CPU) 2121 (for example, one or more processors), a memory 2132, and one or more storage media 2130 (for example, one or more mass storage devices) that store an application program 2142 or data 2144. The memory 2132 and the storage medium 2130 may be a transient storage or a persistent storage. Programs stored in the storage media 2130 may include one or more modules (not marked in the figure), and each module may include a series of instruction operations on the training device. Further, the central processing unit 2121 may be configured to: communicate with the storage medium 2130, and perform, on the training device 2100, the series of instruction operations on the storage medium 2130.

The training device 2100 may further include one or more power supplies 2126, one or more wired or wireless network interfaces 2150, one or more input/output interfaces 2158, or one or more operating systems 2141 such as Windows Server™, Mac OS X™, Unix™, Linux™, or FreeBSD™.

In this embodiment of this application, the central processing unit 2121 is configured to perform steps related to the cognitive network training method in the foregoing embodiments.

An embodiment of this application further provides a computer program product. When the computer program product runs on a computer, the computer is enabled to perform steps performed by the foregoing execution device, or the computer is enabled to perform steps performed by the foregoing training device.

An embodiment of this application further provides a computer-readable storage medium. The computer-readable storage medium stores a program used to process a signal, and when the program runs on a computer, the computer is enabled to perform steps performed by the foregoing execution device; or the computer is enabled to perform steps performed by the foregoing training device.

The execution device, the training device, or a terminal device provided in embodiments of this application may be a chip. The chip includes a processing unit and a communications unit. The processing unit may be, for example, a processor. The communications unit may be, for example, an input/output interface, a pin, a circuit, or the like. The processing unit may execute computer-executable instructions stored in a storage unit, so that a chip in the execution device performs the method described in the foregoing embodiments, or a chip in the training device performs the data processing method described in the foregoing embodiments. Optionally, the storage unit may be a storage unit in the chip, such as a register or a cache, or the storage unit may be a storage unit in the radio access device end and that is located outside the chip, such as a read-only memory (ROM) or another type of static storage device capable of storing static information and instructions, or a random access memory (RAM).

Figure 22:
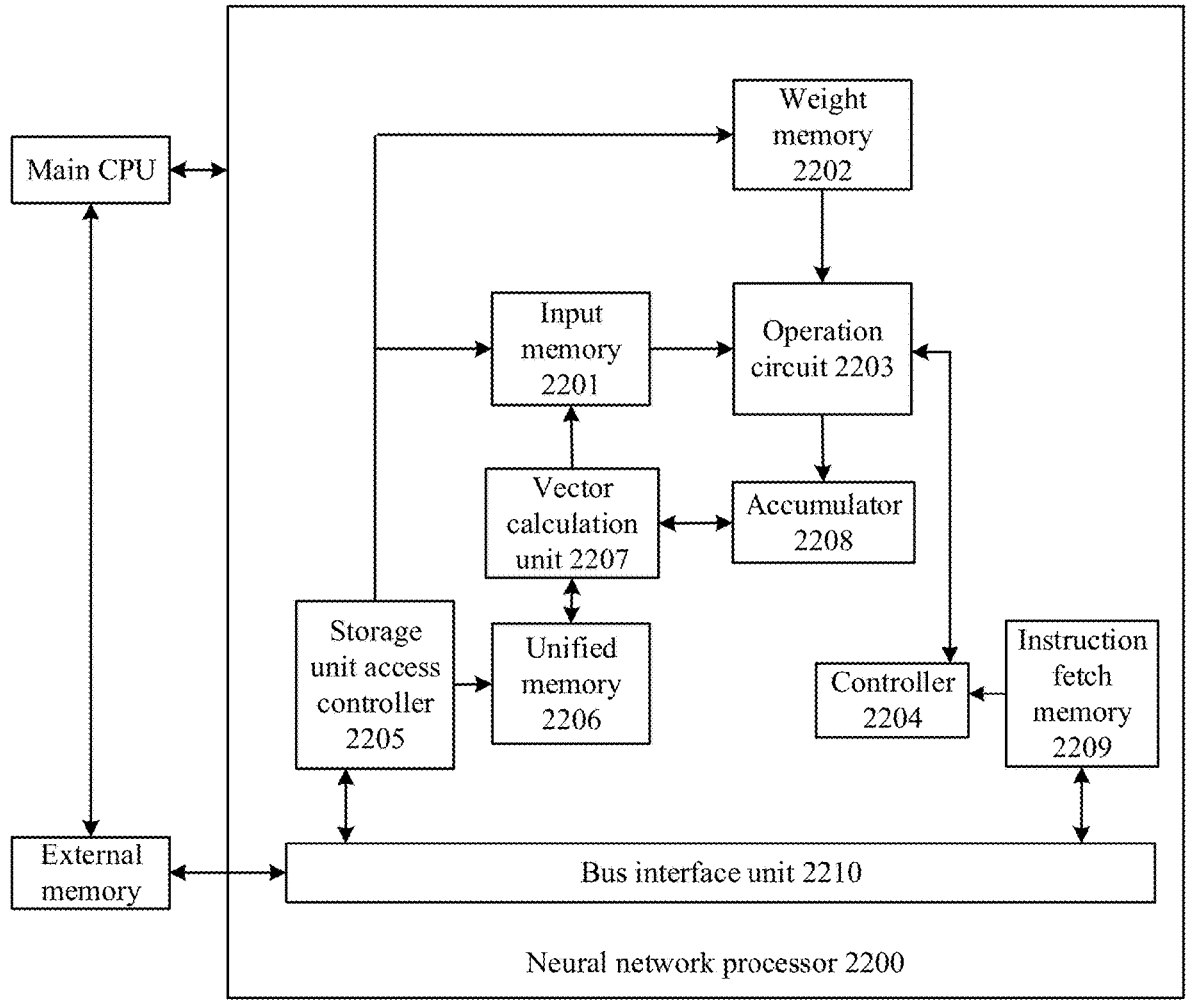
FIG. 22 is a diagram of a structure of a chip according to an embodiment of this application.

FIG. 22 is a diagram of a structure of a chip according to an embodiment of this application. The chip may be represented as a neural network processor NPU 2200. The NPU 2200 is mounted to a host CPU as a coprocessor, and the host CPU allocates a task. A core part of the NPU is an operation circuit 2203, and a controller 2204 is used to control the operation circuit 2203 to extract matrix data in a memory and perform a multiplication operation.

In some embodiments, the operation circuit 2203 internally includes a plurality of process engines (PE). In some embodiments, the operation circuit 2203 is a two-dimensional pulsating array. The operation circuit 2203 may alternatively be a one-dimensional systolic array or another electronic circuit that can perform mathematical operations such as multiplication and addition. In some embodiments, the operation circuit 2203 is a general-purpose matrix processor.

For example, it is assumed that there are an input matrix A, a weight matrix B, and an output matrix C. The operation circuit fetches data corresponding to the matrix B from a weight memory 2202, and caches the data on each PE in the operation circuit. The operation circuit fetches data of the matrix A from an input memory 2201, to perform a matrix operation with the matrix B to obtain a partial result or a final result of a matrix, and stores the result into an accumulator 2208.

A unified memory 2206 is configured to store input data and output data. Weight data is directly transferred to the weight memory 2202 by using a storage unit access controller (DMAC) 2205. The entered data is also transferred to the unified memory 2206 by using the DMAC.

A BIU is a bus interface unit. In other words, the bus interface unit 2210 is used for interaction performed between the DMAC and an instruction fetch buffer (IFB) 2209 by using an AXI bus.

The bus interface unit 2210 (BIU) is configured for the instruction fetch buffer 2209 to obtain an instruction from an external memory, and is further configured for the storage unit access controller 2205 to obtain raw data of the input matrix A or the weight matrix B from the external memory.

The DMAC is mainly configured to: transfer input data in the external memory DDR to the unified memory 2206, transfer the weight data to the weight memory 2202, or transfer the input data to the input memory 2201.

A vector calculation unit 2207 includes a plurality of operation processing units. When necessary, further processing is performed on an output of the operation circuit 2203, such as vector multiplication, vector addition, an exponential operation, a logarithmic operation, or value comparison. The vector calculation unit 2207 is mainly configured to perform network computing at a non-convolutional/fully connected layer in a neural network, for example, batch normalization, pixel-level summation, and upsampling on a feature plane.

In some embodiments, the vector calculation unit 2207 can store a processed output vector in the unified memory 2206. For example, the vector calculation unit 2207 may apply a linear function or a nonlinear function to output of the operation circuit 2203. For example, linear interpolation is performed on a feature vector extracted by a convolutional layer. For another example, vectors of values are accumulated, to generate an activation value. In some embodiments, the vector calculation unit 2207 generates a normalized value, a value obtained after pixel-level summation, or a combination thereof. In some embodiments, the processed output vector can be used as an activated input to the operation circuit 2203, for example, can be used at a subsequent layer in the neural network.

The controller 2204 is connected to the instruction fetch buffer 2209, and is configured to store instructions used by the controller 2204.

The unified memory 2206, the input memory 2201, the weight memory 2202, and the instruction fetch buffer 2209 are all on-chip memories. The external memory is private for a hardware architecture of the NPU.

Any one of the foregoing mentioned processors may be a general-purpose central processing unit, a microprocessor, an ASIC, or one or more integrated circuits configured to control execution of the foregoing program.

In addition, it should be noted that the described apparatus embodiment is merely an example. The units described as separate parts may or may not be physically separate, and parts displayed as units may or may not be physical units, that is, may be located in one place, or may be distributed on a plurality of network units. A part or all of the modules may be selected according to an actual need to achieve the objectives of the solutions of embodiments. In addition, in the accompanying drawings of the apparatus embodiments provided by this application, connection relationships between modules indicate that the modules have communication connections with each other, which may be implemented as one or more communications buses or signal cables.

Based on the description of the foregoing embodiments, a person skilled in the art may clearly understand that this application may be implemented by using software in combination with necessary universal hardware, or certainly, may be implemented by using dedicated hardware, including a dedicated integrated circuit, a dedicated CPU, a dedicated memory, a dedicated component, or the like. Generally, any function that can be completed by using a computer program can be very easily implemented by using corresponding hardware. Moreover, a hardware structure used to implement a same function may be in various forms, for example, in a form of an analog circuit, a digital circuit, a dedicated circuit, or the like. However, as for this application, software program embodiment is a better embodiment in most cases. Based on such an understanding, the technical solutions of this application essentially or the part contributing to a conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this application.

All or a part of the foregoing embodiments may be implemented by using software, hardware, firmware, or any combination thereof. When the software is used to implement embodiments, all or a part of embodiments may be implemented in a form of a computer program product.

The computer program product includes one or more computer instructions. When the computer program instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, training device, or data center to another web site, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A cognitive network training method, the method comprising:

obtaining a pre-annotated detection box of a target object in an image;

obtaining a target detection box corresponding to the image and a first cognitive network, the target detection box identifying the target object, the target detection box comprising a first corner point and a first center point, the pre-annotated detection box comprising a second corner point and a second center point, the first corner point and the second corner point are two endpoints of a diagonal of a rectangle, and the position difference is further positively related to a center point position difference between the first center point and the second center point in the image and is negatively related to a length between the first corner point and the second corner point; and performing iterative training on the first cognitive network based on a loss function and outputting a second cognitive network, the loss function relating to an intersection-over-union (IoU) between the pre-annotated detection box and the target detection box.

2. The method according to claim 1, wherein the loss function is further related to a shape difference between the target detection box and the pre-annotated detection box, and the shape difference is negatively related to an area of the pre-annotated detection box.

3. The method according to claim 1, wherein the loss function is further related to a position difference between the target detection box and the pre-annotated detection box in the image, and the position difference is negatively related to the area of the pre-annotated detection box; or the position difference is negatively related to an area of a minimum bounding rectangle of a convex hull of the pre-annotated detection box and the target detection box.

4. The method according to claim 1, wherein the loss function comprises a target loss term related to the position difference, and the target loss term changes with the position difference; and a change rate of the target loss term is greater than a first preset change rate when the position difference is greater than a preset value; and/or the change rate of the target loss term is less than a second preset change rate when the position difference is less than the preset value.

* * * * *